US012676759B2

(12) United States Patent
Huo et al.

(10) Patent No.: US 12,676,759 B2
(45) Date of Patent: Jul. 7, 2026

(54) METHOD AND APPARATUS FOR MANAGING DIGITAL CERTIFICATE

(71) Applicant: Digital Currency Institute, The People's Bank of China, Beijing (CN)

(72) Inventors: Yun Huo, Beijing (CN); Gang Di, Beijing (CN)

(73) Assignee: DIGITAL CURRENCY INSTITUTE, THE PEOPLE'S BANK OF CHINA, Beijing (CN)

( * ) Notice: Subject to any disclaimer, the term of this patent is extended or adjusted under 35 U.S.C. 154(b) by 286 days.

(21) Appl. No.: 18/288,811

(22) PCT Filed: Apr. 26, 2022

(86) PCT No.: PCT/CN2022/089242
§ 371 (c)(1),
(2) Date: Oct. 28, 2023

(87) PCT Pub. No.: WO2022/228423
PCT Pub. Date: Nov. 3, 2022

(65) Prior Publication Data
US 2024/0372733 A1      Nov. 7, 2024

(30) Foreign Application Priority Data

Apr. 29, 2021    (CN) .......................... 202110474081.9
Apr. 29, 2021    (CN) .......................... 202110474125.8
(Continued)

(51) Int. Cl.
*H04L 9/32*         (2006.01)
*H04L 9/30*         (2006.01)

(52) U.S. Cl.
CPC .............. *H04L 9/3263* (2013.01); *H04L 9/30* (2013.01)

(58) Field of Classification Search
CPC ..................................................... H04L 9/3263
See application file for complete search history.

(56) References Cited

U.S. PATENT DOCUMENTS 10,708,068 B2 *   7/2020   Cheng ..................... G06F 21/64
10,848,325 B1    11/2020   Duccini et al.
(Continued)

FOREIGN PATENT DOCUMENTS

CN      108712261 A      10/2018
CN      108900310 A      11/2018
(Continued)

OTHER PUBLICATIONS

The search report of counterpart EP application No. 22794893.2 issued on Mar. 14, 2025.
(Continued)

*Primary Examiner* — Simon P Kanaan
(74) *Attorney, Agent, or Firm* — The Sun IP Law

(57)          ABSTRACT

Provided are a method and apparatus for managing a digital certificate. A specific implementation of the method includes: receiving a digital certificate generation request sent by a user; according to a digital certificate application scenario, determining a preset threshold value corresponding to the digital certificate application scenario; broadcasting first user information to a blockchain, to enable a blockchain node, which knows an aggregated public key corresponding to the threshold value, to sign the first user information by using a private key component of the blockchain node, so as to generate first signature information, where the aggregated public key corresponding to the threshold value is generated by means of aggregating public key components of the blockchain node on the basis of a
(Continued)

┌─ S101
A digital certificate generation request sent by a user is received, wherein the digital certificate generation request indicates first user information of the user and a digital certificate application scenario ┌─ S102
A preset threshold value corresponding to the digital certificate application scenario is determined according to the digital certificate application scenario, wherein the threshold value indicates a number of blockchain nodes, which participate in digital certificate generation, in all blockchain nodes ┌─ S103
The first user information is broadcast to a blockchain, to enable a blockchain node, which knows a aggregated public key corresponding to the threshold value, to sign the first user information by using a private key component of the blockchain node, so as to generate first signature information, wherein the aggregated public key corresponding to the threshold value is generated by means of aggregating apublic key component of the blockchain node on the basis of the signature generation algorithm ┌─ S104
The first signature information is aggregated to generate the digital certificate for the user signature generation algorithm; and aggregating the first signature information to generate a digital certificate for the user.

13 Claims, 22 Drawing Sheets

(30)          Foreign Application Priority Data

| Apr. 29, 2021 | (CN) | ......................... | 202110474136.6 |
| Apr. 29, 2021 | (CN) | ......................... | 202110474167.1 |
| Apr. 29, 2021 | (CN) | ......................... | 202110475858.3 |
| Apr. 29, 2021 | (CN) | ......................... | 202110475946.3 |
| Apr. 29, 2021 | (CN) | ......................... | 202110488948.6 |

(56)                References Cited

U.S. PATENT DOCUMENTS

| 10,938,578 | B2 * | 3/2021 | Finlow-Bates | ....... H04L 9/3263 |
| 11,722,318 | B2 * | 8/2023 | Sun | ....................... H04L 9/3263 |
| | | | | 713/156 |
| 11,863,692 | B2 * | 1/2024 | Yan | ..................... H04L 63/0823 |
| 12,309,296 | B2 * | 5/2025 | Duccini | ................... H04L 9/006 |
| 2020/0082399 | A1 | 3/2020 | Deshpande et al. | |
| 2020/0327537 | A1 | 10/2020 | Garg et al. | |
| 2021/0083882 | A1 | 3/2021 | Venable, Sr. | |
| 2021/0167973 | A1 * | 6/2021 | Yan | ....................... H04L 9/3239 |
| 2021/0328816 | A1 * | 10/2021 | Wei | ...................... H04L 9/0897 |

FOREIGN PATENT DOCUMENTS

| CN | 109495478 | A | 3/2019 |
| CN | 109714165 | A | 5/2019 |
| CN | 109992953 | A | 7/2019 |
| CN | 110266482 | A | 9/2019 |
| CN | 110365488 | A | 10/2019 |
| CN | 111047324 | A | 4/2020 |
| CN | 111104686 | A | 5/2020 |
| CN | 111277417 | A | 6/2020 |
| CN | 111340485 | A | 6/2020 |
| CN | 111639361 | A | 9/2020 |
| CN | 111819827 | A | 10/2020 |
| CN | 111934889 | A | 11/2020 |
| CN | 112132560 | A | 12/2020 |
| CN | 112671541 | A | 4/2021 |
| CN | 113179169 | A | 7/2021 |
| CN | 113193961 | A | 7/2021 |
| CN | 113206738 | A | 8/2021 |
| CN | 113206745 | A | 8/2021 |
| CN | 113206746 | A | 8/2021 |
| CN | 113242132 | A | 8/2021 |
| CN | 113242133 | A | 8/2021 |
| WO | 2020143470 | A1 | 7/2020 |

OTHER PUBLICATIONS

Harn L et al: "Strong (n,t,n) verifiable 1-36secret sharing scheme", Information Sciences, Elsevier, Amsterdam, NL, vol. 180, No. 16, Aug. 15, 2010 (Aug. 15, 2010), pp. 3059-3064, XP027066561.

The Partial search report of counterpart EP application No. 22794893.2 issued on Sep. 25, 2024.

Reis Miguel Reis Egidio, "Blockchain-Enabled DPKI Framework", Dissertation submitted in partial fulfillment of the requirements for the degree of Master of Science in Computer Science and Informatics Engineering,Sep. 1, 2019,XP055816425.

Murat Yasin Kubilay et al: "KORGAN: An Efficient PKI Architecture Based on Permissioned-Blockchain by Modifying PBFT Through Dynamic Threshold Signatures", IACR, International Association for Cryptologic Research,Oct. 3, 2019,XP061033467.

Dykcik Lukasz et al:"BlockPKI:An Automated, Resilient, and Transparent Public-Key Infrastructure", 2018 IEEE International Conference on Data Mining Workshops(ICDMW), IEEE,Nov. 17, 2018, XP033516256.

Shao J et al:"A traceable threshold signature scheme with multiple signing policies", Computers &Security, Elsevier Science Publishers. Amsterdam, NL,May 1, 2006,XP027896428.

Anonymous: "Multi-signature", Bitcoin Wiki, Mar. 21, 2021,XP093204830.

Han Kyunghyun et al: "A PKI without TTP based on conditional trust in blockchain", Neural Computing and Applications, Springer London, London,Aug. 6, 2019,XP037221044.

\* cited by examiner

Figure 1:
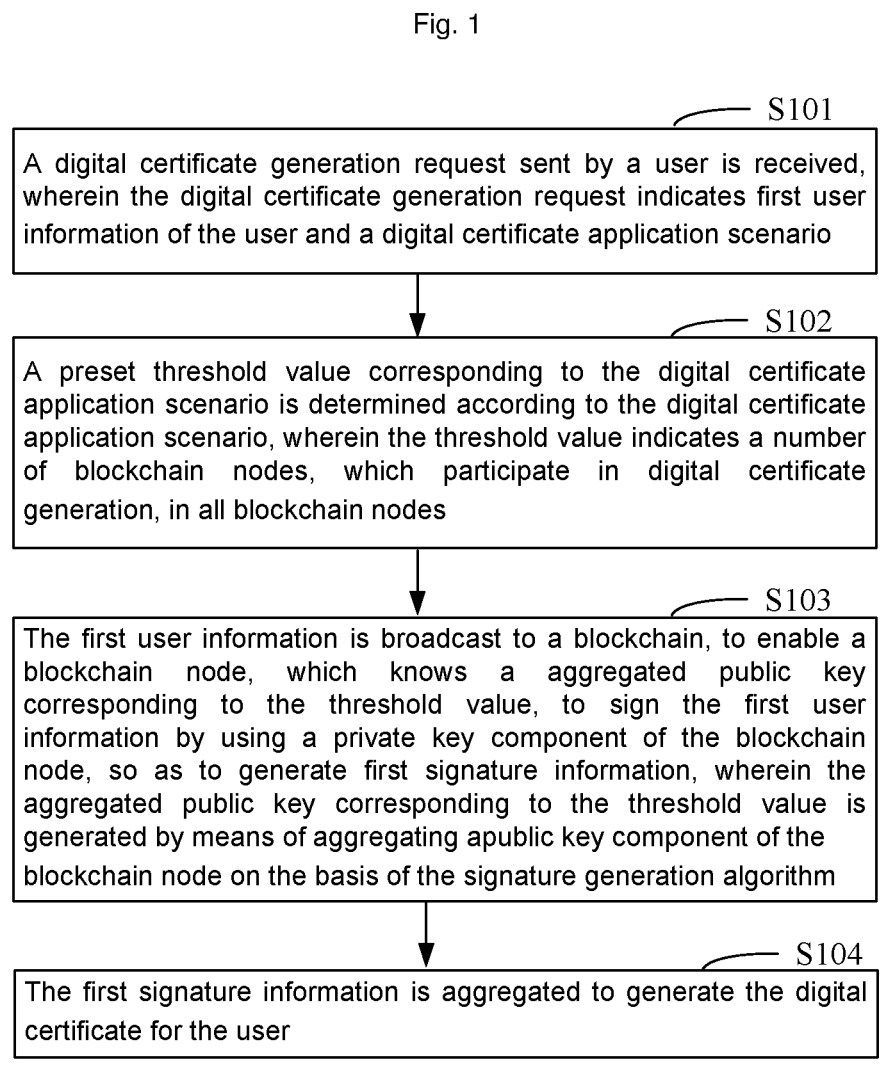

A digital certificate generation request sent by a user is received, wherein the digital certificate generation request indicates first user information of the user and a digital certificate application scenario

S102

A preset threshold value corresponding to the digital certificate application scenario is determined according to the digital certificate application scenario, wherein the threshold value indicates a number of blockchain nodes, which participate in digital certificate generation, in all blockchain nodes

S103

The first user information is broadcast to a blockchain, to enable a blockchain node, which knows a aggregated public key corresponding to the threshold value, to sign the first user information by using a private key component of the blockchain node, so as to generate first signature information, wherein the aggregated public key corresponding to the threshold value is generated by means of aggregating apublic key component of the blockchain node on the basis of the signature generation algorithm

S104

The first signature information is aggregated to generate the digital certificate for the user

Figure 3:
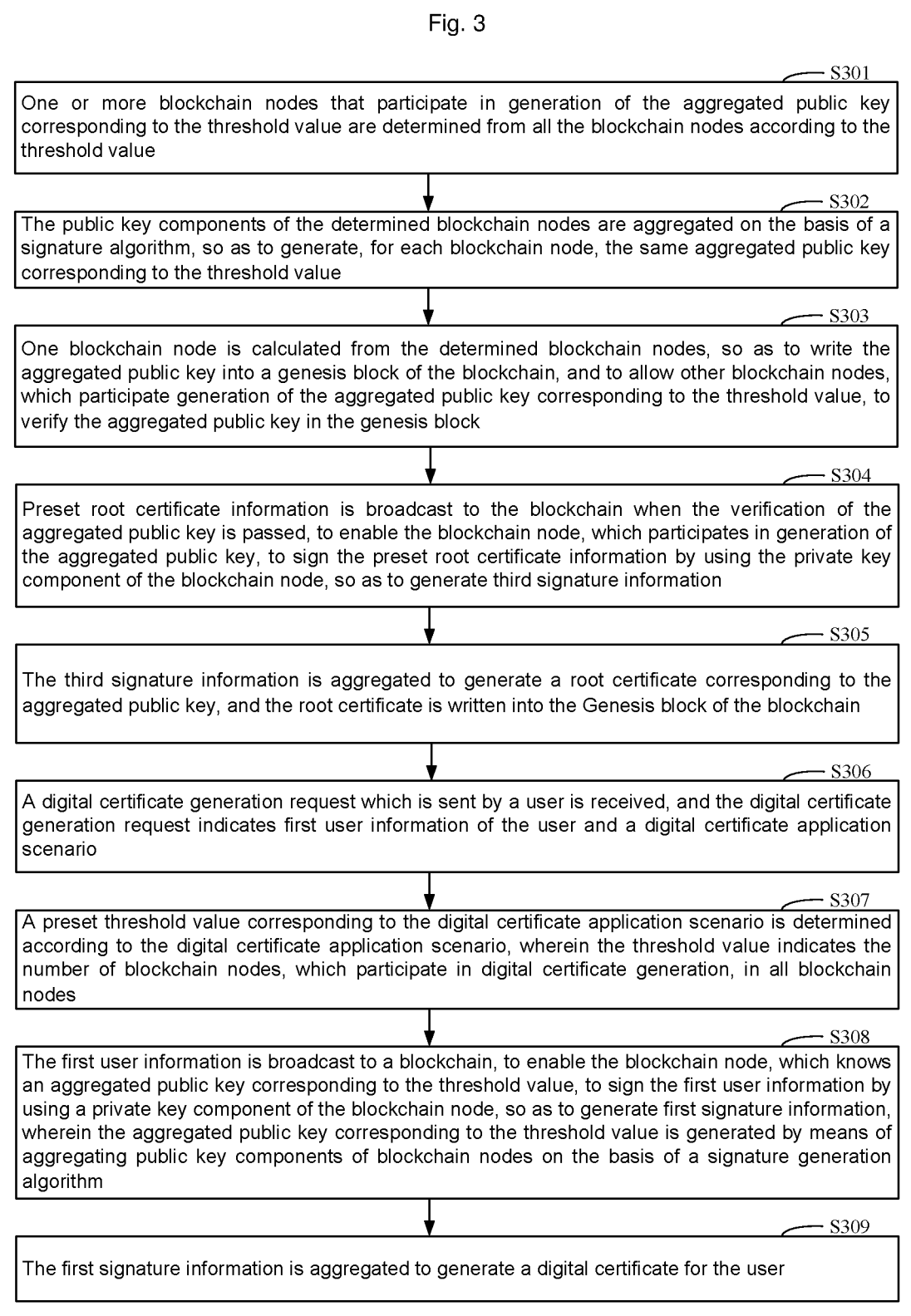

One or more blockchain nodes that participate in generation of the aggregated public key corresponding to the threshold value are determined from all the blockchain nodes according to the threshold value

S302

The public key components of the determined blockchain nodes are aggregated on the basis of a signature algorithm, so as to generate, for each blockchain node, the same aggregated public key corresponding to the threshold value

S303

One blockchain node is calculated from the determined blockchain nodes, so as to write the aggregated public key into a genesis block of the blockchain, and to allow other blockchain nodes, which participate generation of the aggregated public key corresponding to the threshold value, to verify the aggregated public key in the genesis block

S304

Preset root certificate information is broadcast to the blockchain when the verification of the aggregated public key is passed, to enable the blockchain node, which participates in generation of the aggregated public key, to sign the preset root certificate information by using the private key component of the blockchain node, so as to generate third signature information

S305

The third signature information is aggregated to generate a root certificate corresponding to the aggregated public key, and the root certificate is written into the Genesis block of the blockchain

S306

A digital certificate generation request which is sent by a user is received, and the digital certificate generation request indicates first user information of the user and a digital certificate application scenario

S307

A preset threshold value corresponding to the digital certificate application scenario is determined according to the digital certificate application scenario, wherein the threshold value indicates the number of blockchain nodes, which participate in digital certificate generation, in all blockchain nodes

S308

The first user information is broadcast to a blockchain, to enable the blockchain node, which knows an aggregated public key corresponding to the threshold value, to sign the first user information by using a private key component of the blockchain node, so as to generate first signature information, wherein the aggregated public key corresponding to the threshold value is generated by means of aggregating public key components of blockchain nodes on the basis of a signature generation algorithm

S309

The first signature information is aggregated to generate a digital certificate for the user

Fig. 4

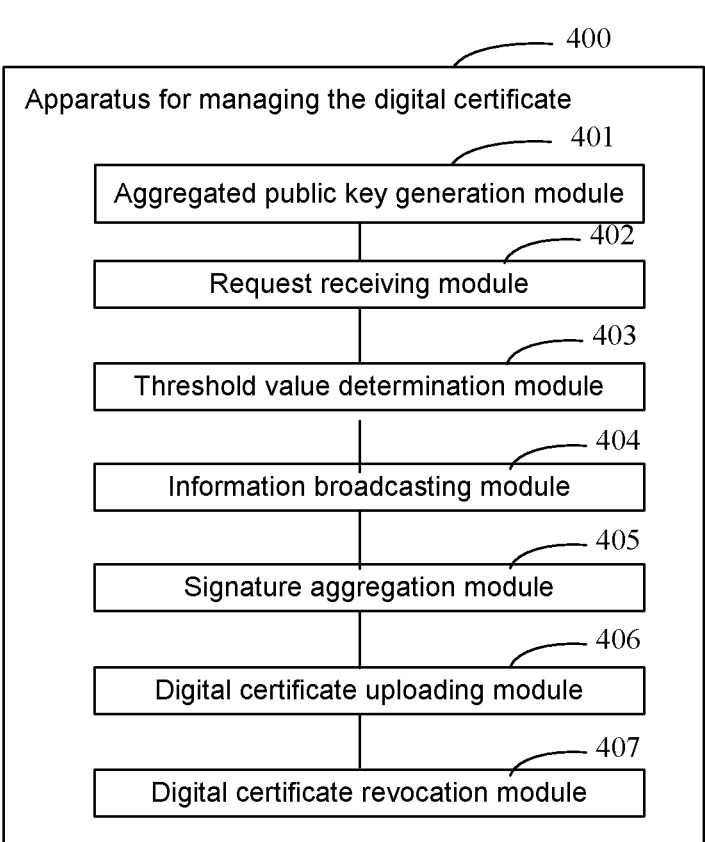

A digital certificate generation request sent by a user is received, wherein the digital certificate generation request indicates first user information of the user

S502

The first user information is broadcast to a blockchain, to enable a blockchain node, which knows a global public key, to sign the first user information by using a private key component of the blockchain node, so as to generate first signature information, wherein the global public key is generated by means of aggregating public key components of blockchain nodes on the basis of a signature generation algorithm

S503

The first signature information is aggregated to generate the digital certificate for the user

Figure 6:
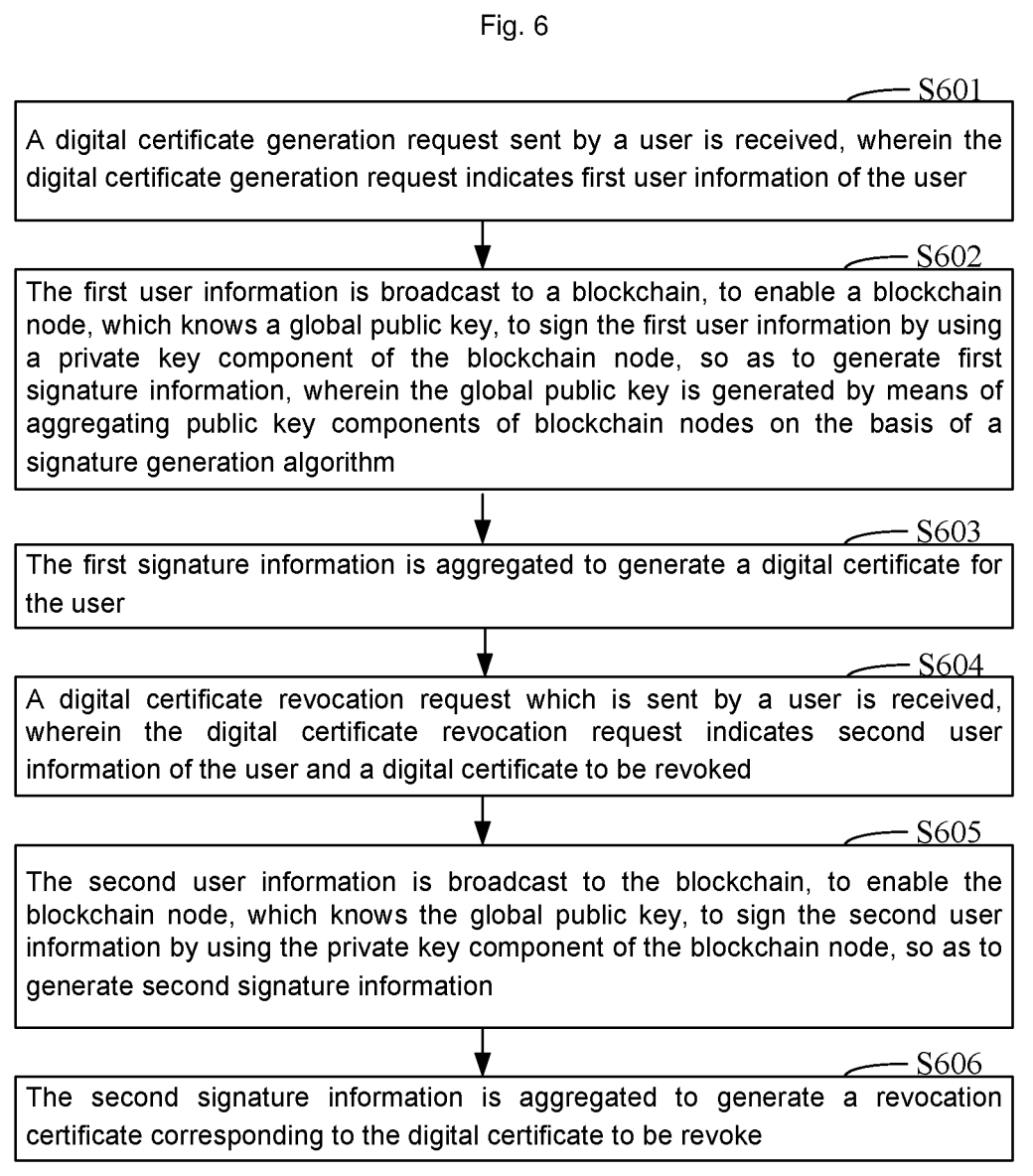

A digital certificate generation request sent by a user is received, wherein the digital certificate generation request indicates first user information of the user

S602

The first user information is broadcast to a blockchain, to enable a blockchain node, which knows a global public key, to sign the first user information by using a private key component of the blockchain node, so as to generate first signature information, wherein the global public key is generated by means of aggregating public key components of blockchain nodes on the basis of a signature generation algorithm

S603

The first signature information is aggregated to generate a digital certificate for the user

S604

A digital certificate revocation request which is sent by a user is received, wherein the digital certificate revocation request indicates second user information of the user and a digital certificate to be revoked

S605

The second user information is broadcast to the blockchain, to enable the blockchain node, which knows the global public key, to sign the second user information by using the private key component of the blockchain node, so as to generate second signature information

S606

The second signature information is aggregated to generate a revocation certificate corresponding to the digital certificate to be revoke

Fig. 7

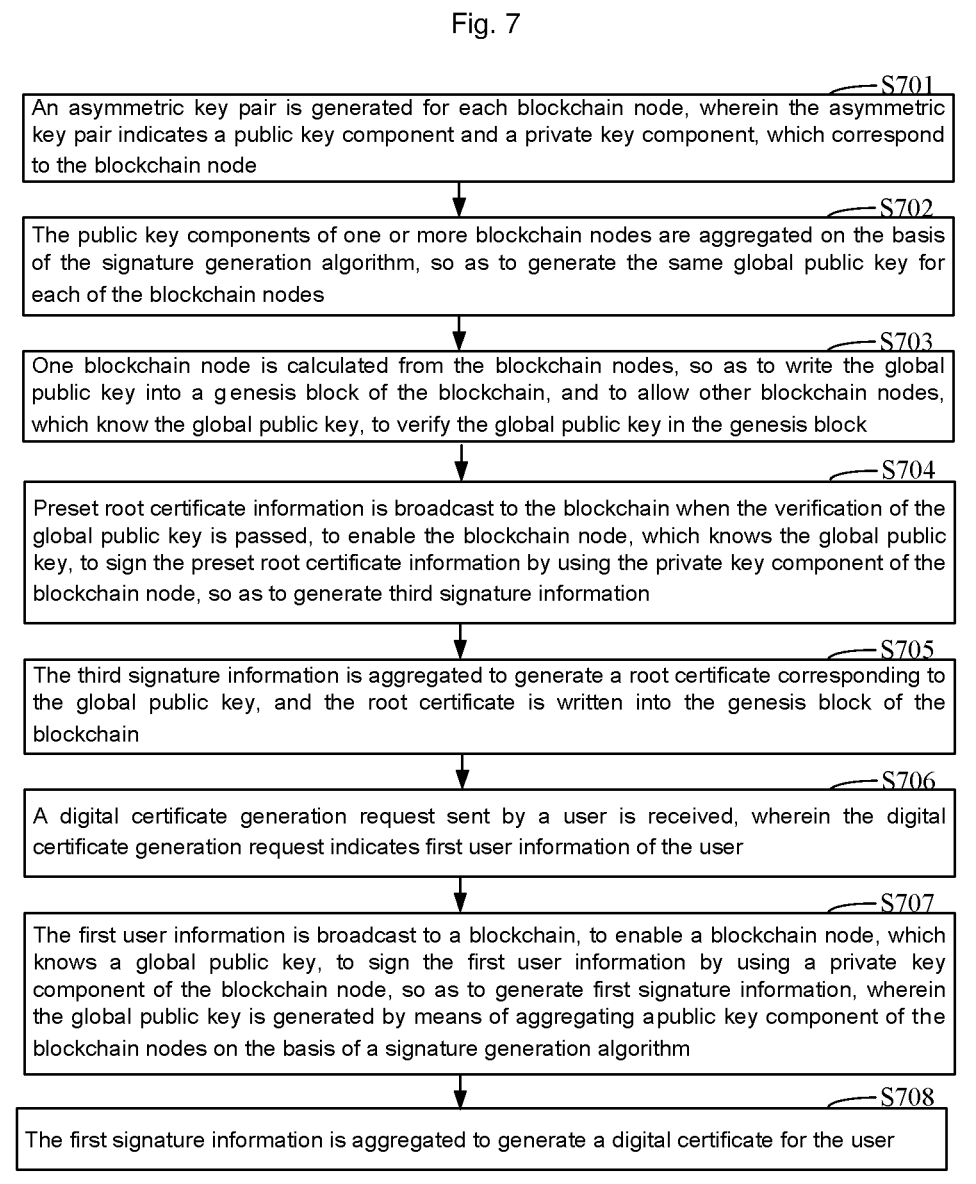

S701
An asymmetric key pair is generated for each blockchain node, wherein the asymmetric key pair indicates a public key component and a private key component, which correspond to the blockchain node S702
The public key components of one or more blockchain nodes are aggregated on the basis of the signature generation algorithm, so as to generate the same global public key for each of the blockchain nodes S703
One blockchain node is calculated from the blockchain nodes, so as to write the global public key into a genesis block of the blockchain, and to allow other blockchain nodes, which know the global public key, to verify the global public key in the genesis block S704
Preset root certificate information is broadcast to the blockchain when the verification of the global public key is passed, to enable the blockchain node, which knows the global public key, to sign the preset root certificate information by using the private key component of the blockchain node, so as to generate third signature information S705
The third signature information is aggregated to generate a root certificate corresponding to the global public key, and the root certificate is written into the genesis block of the blockchain S706
A digital certificate generation request sent by a user is received, wherein the digital certificate generation request indicates first user information of the user S707
The first user information is broadcast to a blockchain, to enable a blockchain node, which knows a global public key, to sign the first user information by using a private key component of the blockchain node, so as to generate first signature information, wherein the global public key is generated by means of aggregating a public key component of the blockchain nodes on the basis of a signature generation algorithm S708
The first signature information is aggregated to generate a digital certificate for the user

Fig. 8

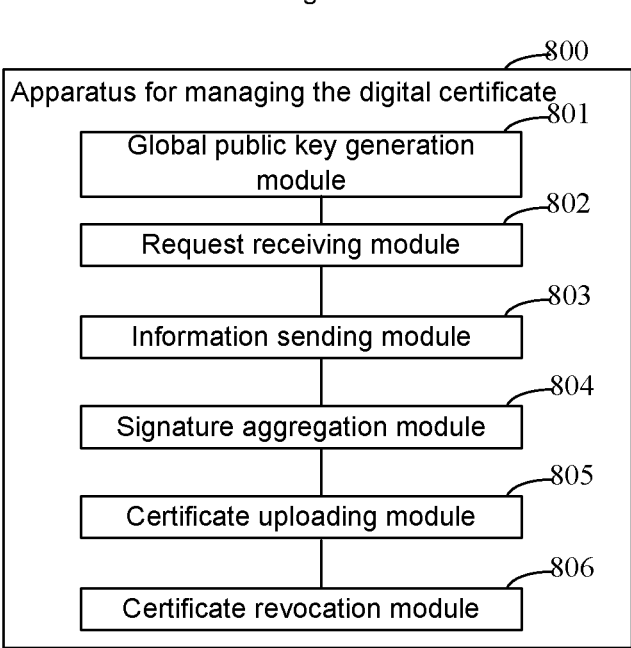

A digital certificate generation request sent by a user is received, wherein the digital certificate generation request indicates first user information of the user

S902

The first user information is broadcast to the blockchain, to enable any one or more blockchain nodes on the blockchain to sign the first user information by using a corresponding private key component, so as to generate first signature information

S903

The first signature information is aggregated to generate a digital certificate for the user, wherein the digital certificate indicates identifier information of the one or more blockchain nodes

Figure 10:
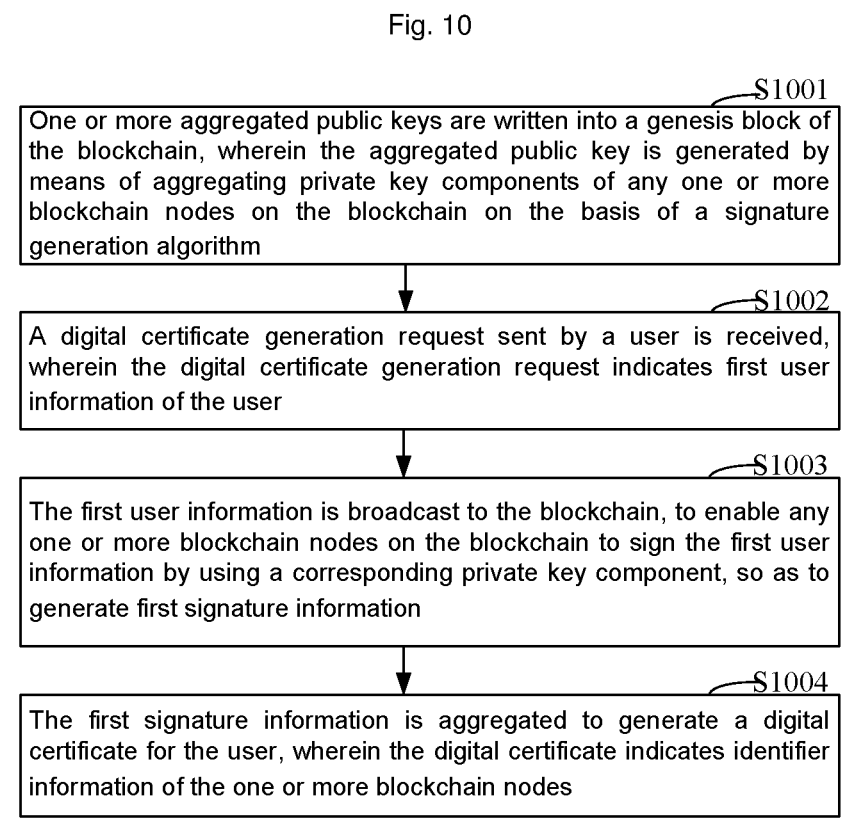

One or more aggregated public keys are written into a genesis block of the blockchain, wherein the aggregated public key is generated by means of aggregating private key components of any one or more blockchain nodes on the blockchain on the basis of a signature generation algorithm

S1002

A digital certificate generation request sent by a user is received, wherein the digital certificate generation request indicates first user information of the user

S1003

The first user information is broadcast to the blockchain, to enable any one or more blockchain nodes on the blockchain to sign the first user information by using a corresponding private key component, so as to generate first signature information

S1004

The first signature information is aggregated to generate a digital certificate for the user, wherein the digital certificate indicates identifier information of the one or more blockchain nodes

Figure 11:
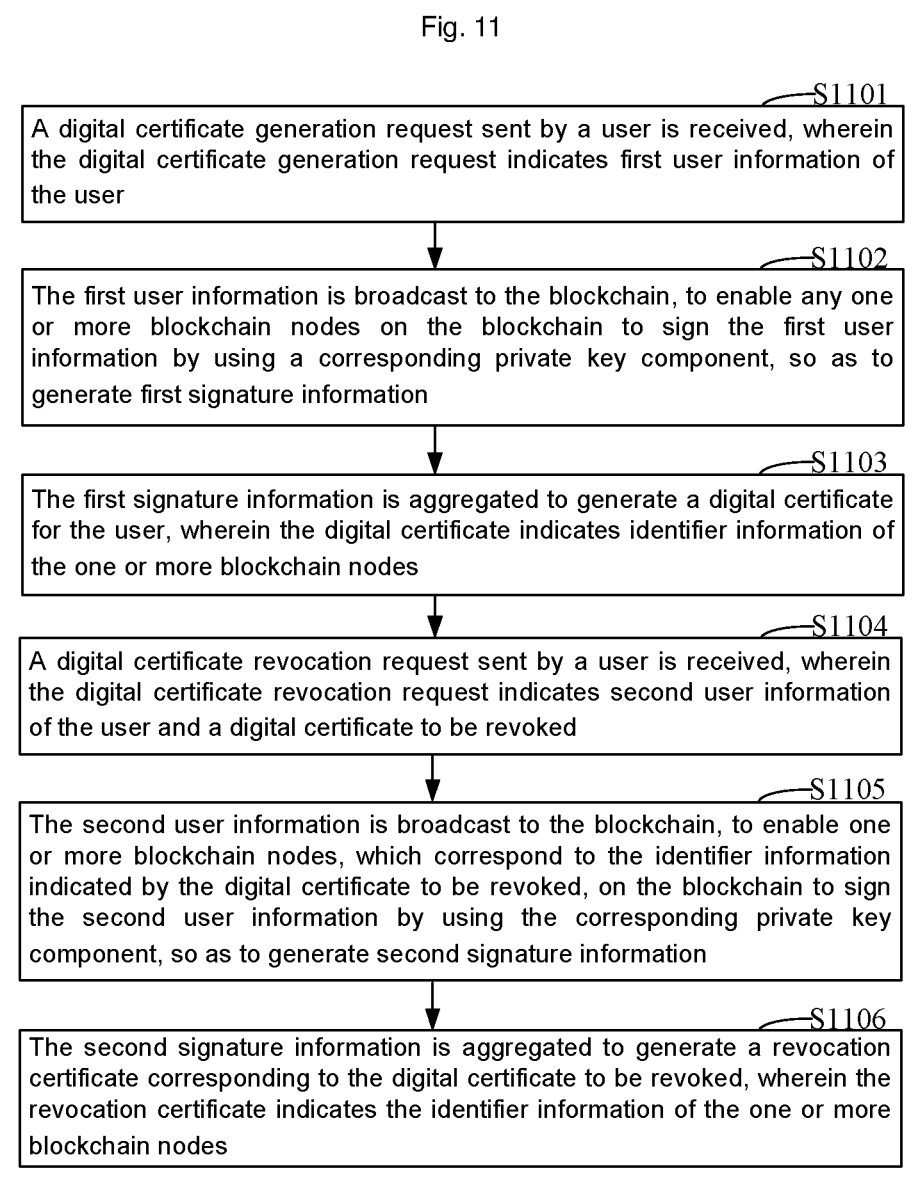

A digital certificate generation request sent by a user is received, wherein the digital certificate generation request indicates first user information of the user

S1102

The first user information is broadcast to the blockchain, to enable any one or more blockchain nodes on the blockchain to sign the first user information by using a corresponding private key component, so as to generate first signature information

S1103

The first signature information is aggregated to generate a digital certificate for the user, wherein the digital certificate indicates identifier information of the one or more blockchain nodes

S1104

A digital certificate revocation request sent by a user is received, wherein the digital certificate revocation request indicates second user information of the user and a digital certificate to be revoked

S1105

The second user information is broadcast to the blockchain, to enable one or more blockchain nodes, which correspond to the identifier information indicated by the digital certificate to be revoked, on the blockchain to sign the second user information by using the corresponding private key component, so as to generate second signature information

S1106

The second signature information is aggregated to generate a revocation certificate corresponding to the digital certificate to be revoked, wherein the revocation certificate indicates the identifier information of the one or more blockchain nodes

Fig. 12

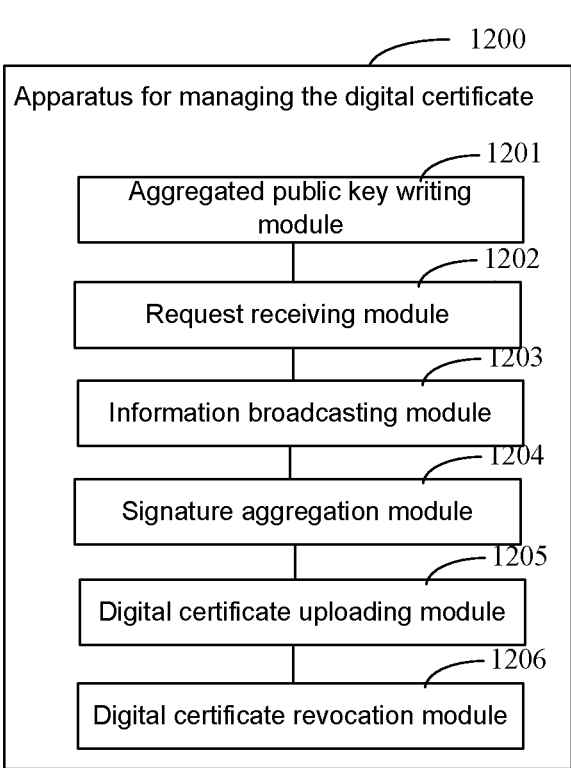

— 1200

Apparatus for managing the digital certificate

— 1201
Aggregated public key writing module

— 1202
Request receiving module

— 1203
Information broadcasting module

— 1204
Signature aggregation module

— 1205
Digital certificate uploading module

— 1206
Digital certificate revocation module

Fig. 13

— S1301
An asymmetric key pair is generated for each blockchain node, wherein the asymmetric key pair indicates a public key component and a private key component, corresponding to the blockchain node — S1302
A global key pair is generated, whrein the global key pair indicates a global public key and a global private key. The global private key is used to sign preset root certificate information, so as to generate a root certificate — S1303
The private key components of one or more blockchain nodes are aggregated on the basis of a signature generation algorithm, so as to generate one or more aggregated public keys — S1304
The one or more aggregated public keys, the global public key, and the root certificate are written into a genesis block of a blockchain

Fig. 14

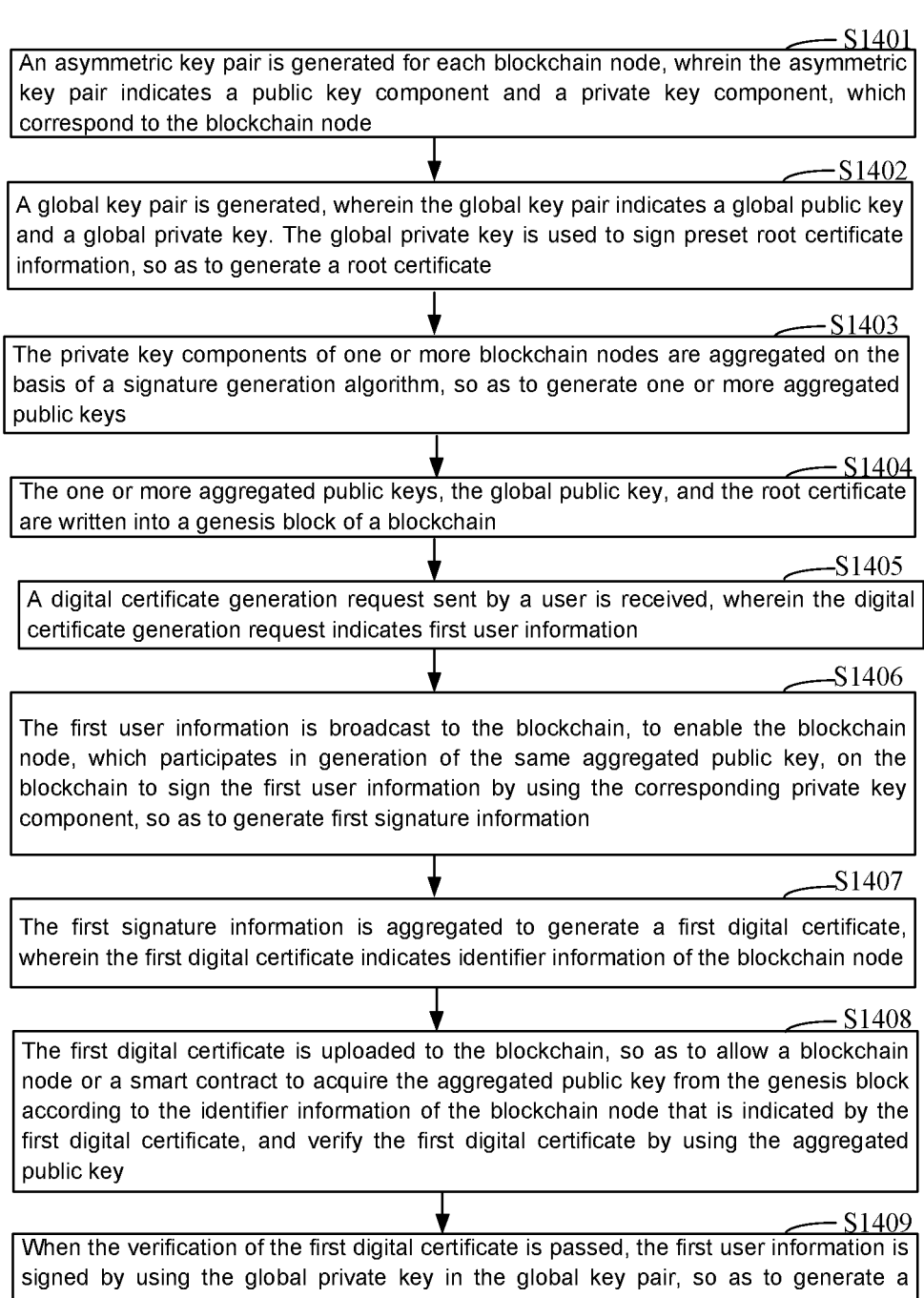

S1401
An asymmetric key pair is generated for each blockchain node, whrein the asymmetric key pair indicates a public key component and a private key component, which correspond to the blockchain node S1402
A global key pair is generated, wherein the global key pair indicates a global public key and a global private key. The global private key is used to sign preset root certificate information, so as to generate a root certificate S1403
The private key components of one or more blockchain nodes are aggregated on the basis of a signature generation algorithm, so as to generate one or more aggregated public keys S1404
The one or more aggregated public keys, the global public key, and the root certificate are written into a genesis block of a blockchain S1405
A digital certificate generation request sent by a user is received, wherein the digital certificate generation request indicates first user information S1406
The first user information is broadcast to the blockchain, to enable the blockchain node, which participates in generation of the same aggregated public key, on the blockchain to sign the first user information by using the corresponding private key component, so as to generate first signature information S1407
The first signature information is aggregated to generate a first digital certificate, wherein the first digital certificate indicates identifier information of the blockchain node S1408
The first digital certificate is uploaded to the blockchain, so as to allow a blockchain node or a smart contract to acquire the aggregated public key from the genesis block according to the identifier information of the blockchain node that is indicated by the first digital certificate, and verify the first digital certificate by using the aggregated public key S1409
When the verification of the first digital certificate is passed, the first user information is signed by using the global private key in the global key pair, so as to generate a second digital certificate for the user

Fig. 15

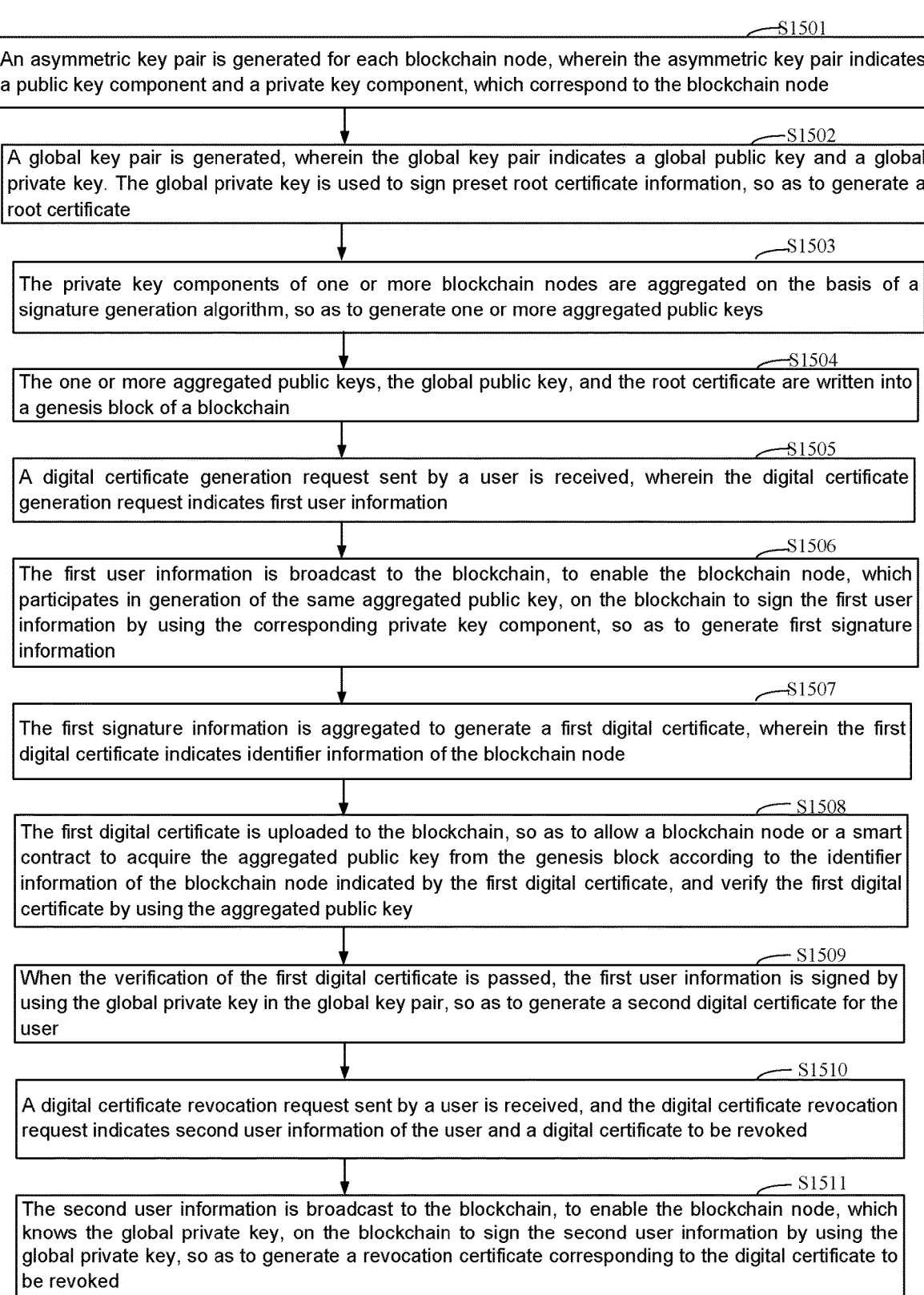

S1501

An asymmetric key pair is generated for each blockchain node, wherein the asymmetric key pair indicates a public key component and a private key component, which correspond to the blockchain node

S1502

A global key pair is generated, wherein the global key pair indicates a global public key and a global private key. The global private key is used to sign preset root certificate information, so as to generate a root certificate

S1503

The private key components of one or more blockchain nodes are aggregated on the basis of a signature generation algorithm, so as to generate one or more aggregated public keys

S1504

The one or more aggregated public keys, the global public key, and the root certificate are written into a genesis block of a blockchain

S1505

A digital certificate generation request sent by a user is received, wherein the digital certificate generation request indicates first user information

S1506

The first user information is broadcast to the blockchain, to enable the blockchain node, which participates in generation of the same aggregated public key, on the blockchain to sign the first user information by using the corresponding private key component, so as to generate first signature information

S1507

The first signature information is aggregated to generate a first digital certificate, wherein the first digital certificate indicates identifier information of the blockchain node

S1508

The first digital certificate is uploaded to the blockchain, so as to allow a blockchain node or a smart contract to acquire the aggregated public key from the genesis block according to the identifier information of the blockchain node indicated by the first digital certificate, and verify the first digital certificate by using the aggregated public key

S1509

When the verification of the first digital certificate is passed, the first user information is signed by using the global private key in the global key pair, so as to generate a second digital certificate for the user

S1510

A digital certificate revocation request sent by a user is received, and the digital certificate revocation request indicates second user information of the user and a digital certificate to be revoked

S1511

The second user information is broadcast to the blockchain, to enable the blockchain node, which knows the global private key, on the blockchain to sign the second user information by using the global private key, so as to generate a revocation certificate corresponding to the digital certificate to be revoked

Fig. 16

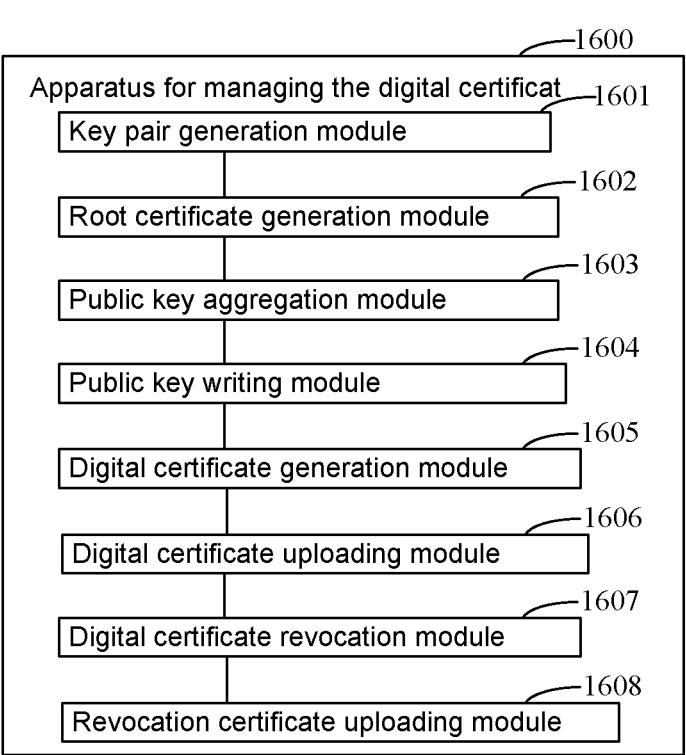

An asymmetric key pair is generated for a newly-added blockchain node when there is one or more newly-added blockchain nodes on a blockchain, wherein the asymmetric key pair indicates a public key component and a private key component, which correspond to the newly-added blockchain node

S1702

The public key components of the one or more blockchain nodes on the blockchain are aggregated on the basis of a signature generation algorithm, so as to generate one or more first aggregated public keys

S1703

One or more second aggregated public keys already present in a genesis block of the blockchain are updated according to the one or more first aggregated public keys, wherein the second aggregated public key is generated by means of aggregating the public key components of the one or more blockchain nodes on the blockchain on the basis of the signature generation algorithm before the one or more nodes are newly added to the blockchain

Figure 18:
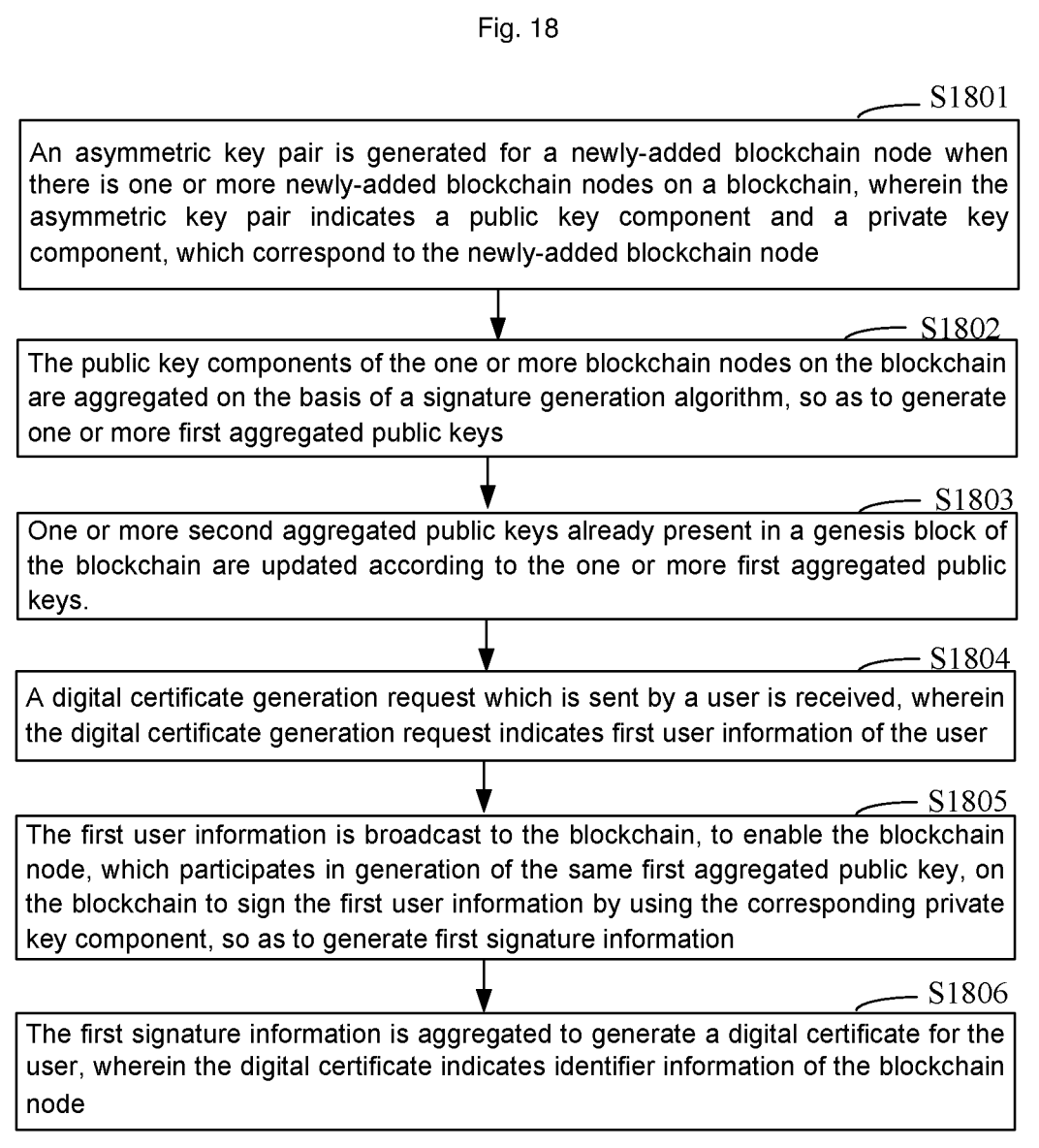

An asymmetric key pair is generated for a newly-added blockchain node when there is one or more newly-added blockchain nodes on a blockchain, wherein the asymmetric key pair indicates a public key component and a private key component, which correspond to the newly-added blockchain node

S1802

The public key components of the one or more blockchain nodes on the blockchain are aggregated on the basis of a signature generation algorithm, so as to generate one or more first aggregated public keys

S1803

One or more second aggregated public keys already present in a genesis block of the blockchain are updated according to the one or more first aggregated public keys.

S1804

A digital certificate generation request which is sent by a user is received, wherein the digital certificate generation request indicates first user information of the user

S1805

The first user information is broadcast to the blockchain, to enable the blockchain node, which participates in generation of the same first aggregated public key, on the blockchain to sign the first user information by using the corresponding private key component, so as to generate first signature information

S1806

The first signature information is aggregated to generate a digital certificate for the user, wherein the digital certificate indicates identifier information of the blockchain node

Figure 19:
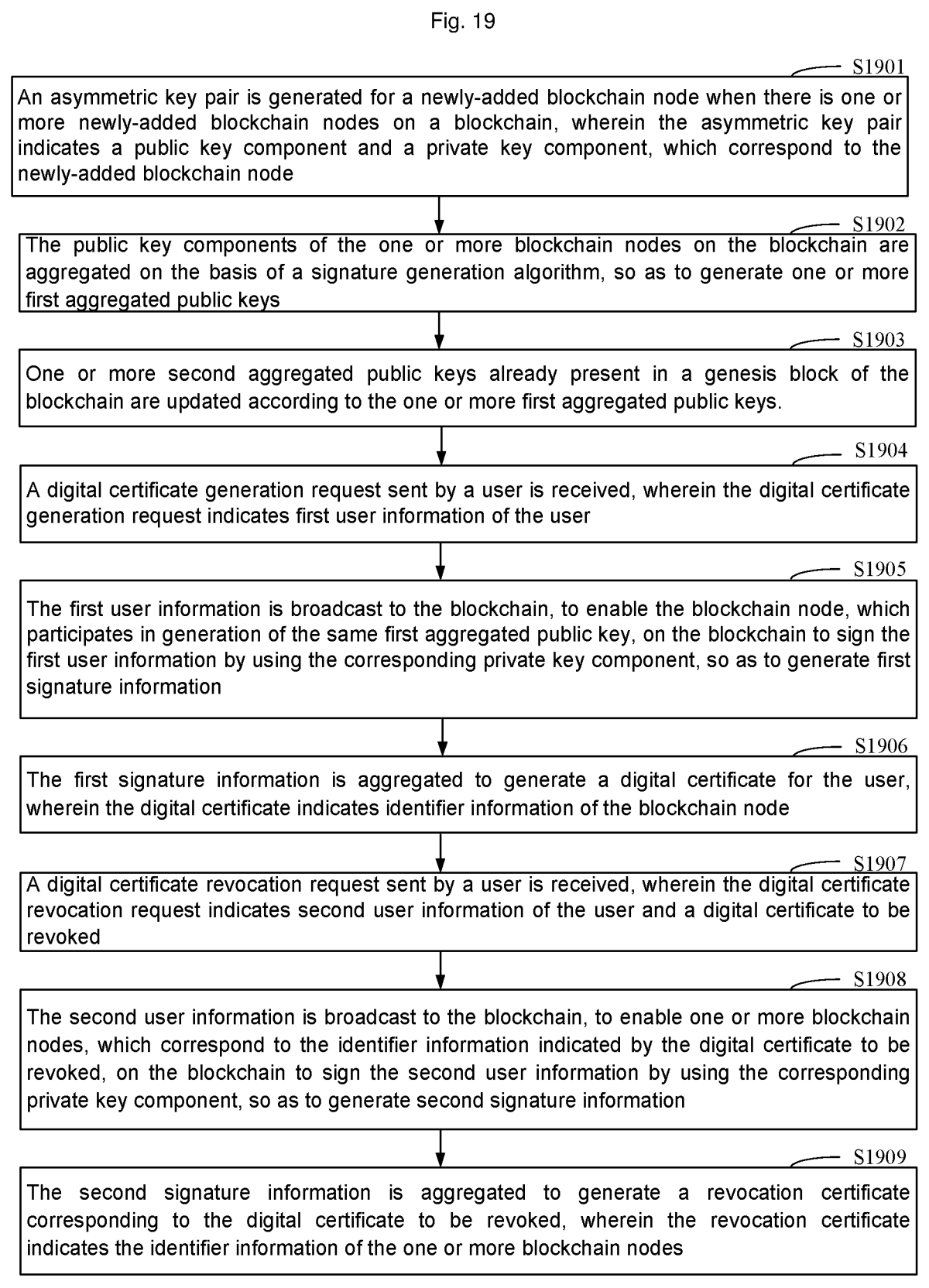

An asymmetric key pair is generated for a newly-added blockchain node when there is one or more newly-added blockchain nodes on a blockchain, wherein the asymmetric key pair indicates a public key component and a private key component, which correspond to the newly-added blockchain node

S1902

The public key components of the one or more blockchain nodes on the blockchain are aggregated on the basis of a signature generation algorithm, so as to generate one or more first aggregated public keys

S1903

One or more second aggregated public keys already present in a genesis block of the blockchain are updated according to the one or more first aggregated public keys.

S1904

A digital certificate generation request sent by a user is received, wherein the digital certificate generation request indicates first user information of the user

S1905

The first user information is broadcast to the blockchain, to enable the blockchain node, which participates in generation of the same first aggregated public key, on the blockchain to sign the first user information by using the corresponding private key component, so as to generate first signature information

S1906

The first signature information is aggregated to generate a digital certificate for the user, wherein the digital certificate indicates identifier information of the blockchain node

S1907

A digital certificate revocation request sent by a user is received, wherein the digital certificate revocation request indicates second user information of the user and a digital certificate to be revoked

S1908

The second user information is broadcast to the blockchain, to enable one or more blockchain nodes, which correspond to the identifier information indicated by the digital certificate to be revoked, on the blockchain to sign the second user information by using the corresponding private key component, so as to generate second signature information

S1909

The second signature information is aggregated to generate a revocation certificate corresponding to the digital certificate to be revoked, wherein the revocation certificate indicates the identifier information of the one or more blockchain nodes

Fig. 20

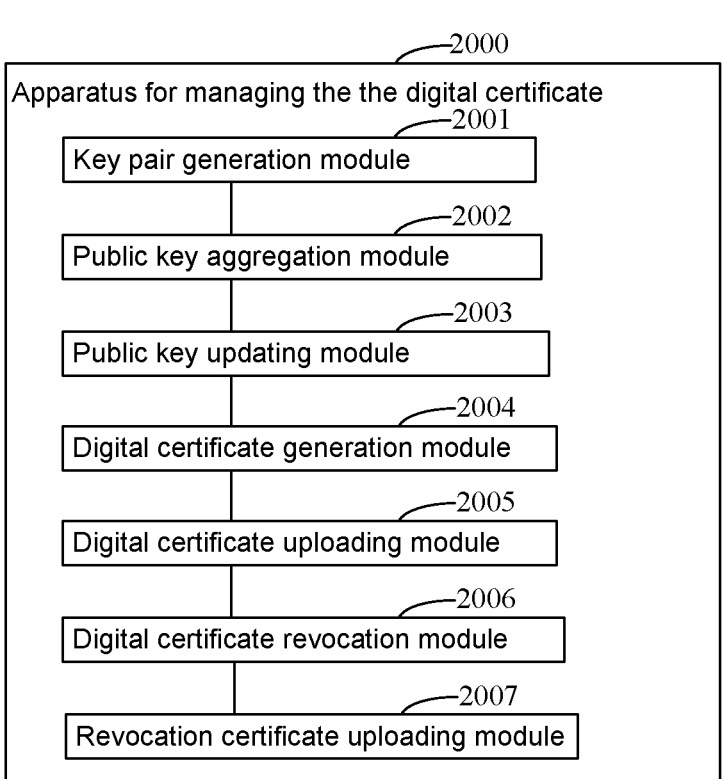

2000

Apparatus for managing the the digital certificate

2001
Key pair generation module

2002
Public key aggregation module

2003
Public key updating module

2004
Digital certificate generation module

2005
Digital certificate uploading module

2006
Digital certificate revocation module

2007
Revocation certificate uploading module

Fig. 21

S2101
When one or more blockchain nodes are deleted from a blockchain, public key components of the one or more blockchain nodes on the blockchain are aggregated on the basis of a signature generation algorithm, so as to generate one or more first aggregated public keys S2102
One or more second aggregated public keys already present in a Genesis block of the blockchain are updated according to the one or more first aggregated public keys, wherein the second aggregated public key is generated by means of aggregating the public key components of one or more blockchain nodes on the blockchain on the basis of the signature generation algorithm before the one or more blockchain nodes are deleted

Figure 22:
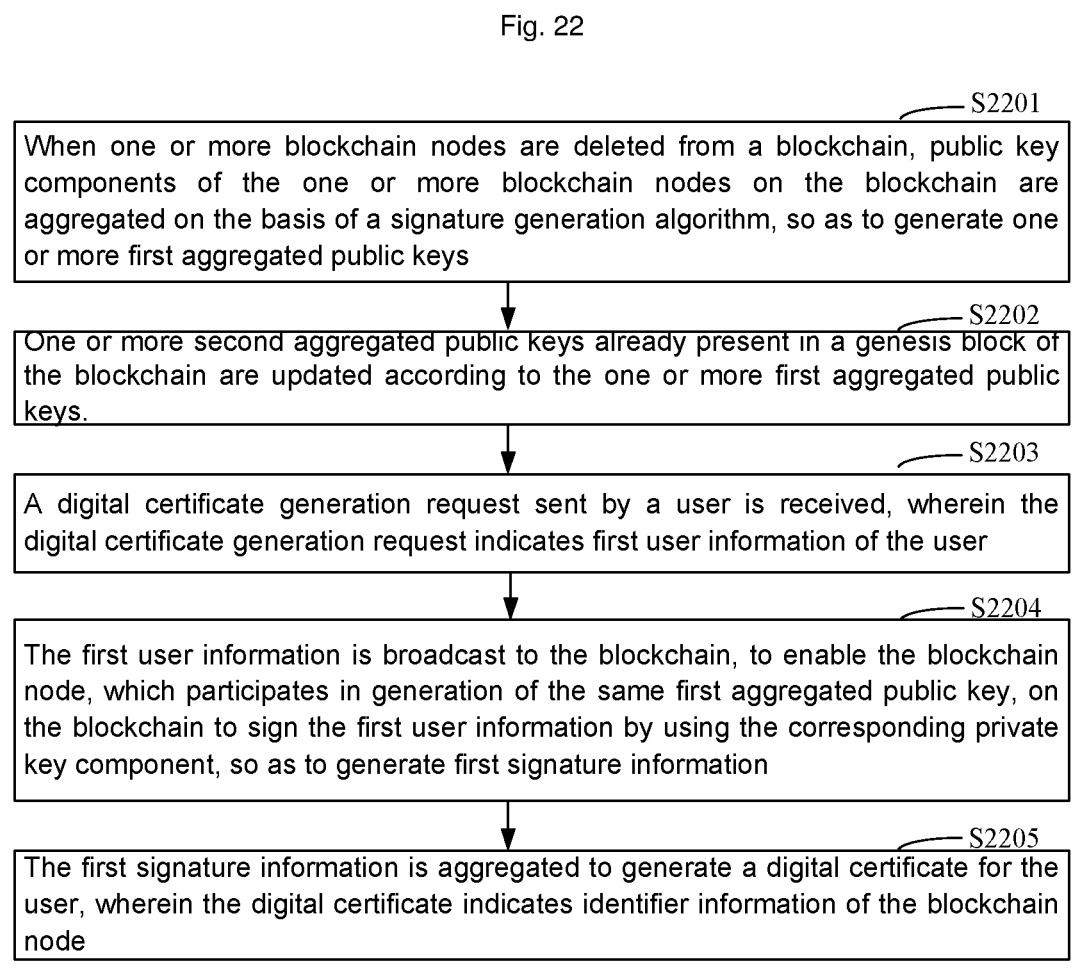

When one or more blockchain nodes are deleted from a blockchain, public key components of the one or more blockchain nodes on the blockchain are aggregated on the basis of a signature generation algorithm, so as to generate one or more first aggregated public keys

S2202

One or more second aggregated public keys already present in a genesis block of the blockchain are updated according to the one or more first aggregated public keys.

S2203

A digital certificate generation request sent by a user is received, wherein the digital certificate generation request indicates first user information of the user

S2204

The first user information is broadcast to the blockchain, to enable the blockchain node, which participates in generation of the same first aggregated public key, on the blockchain to sign the first user information by using the corresponding private key component, so as to generate first signature information

S2205

The first signature information is aggregated to generate a digital certificate for the user, wherein the digital certificate indicates identifier information of the blockchain node

Fig. 23

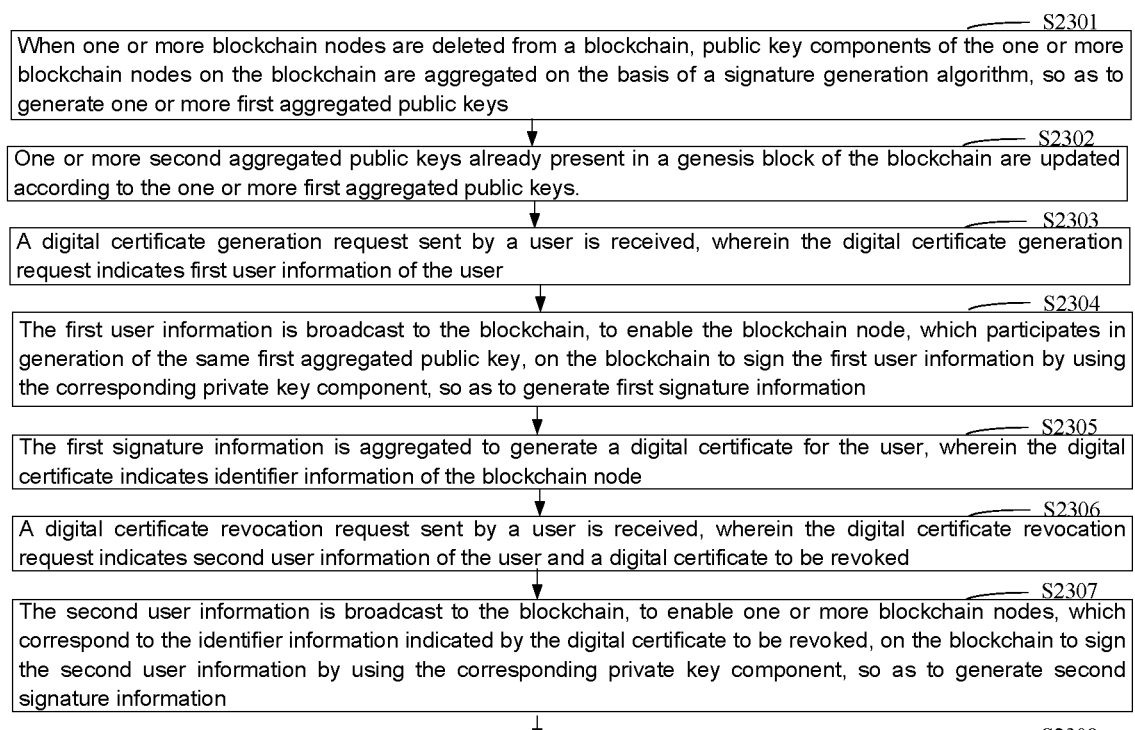

S2301
When one or more blockchain nodes are deleted from a blockchain, public key components of the one or more blockchain nodes on the blockchain are aggregated on the basis of a signature generation algorithm, so as to generate one or more first aggregated public keys S2302
One or more second aggregated public keys already present in a genesis block of the blockchain are updated according to the one or more first aggregated public keys.

S2303
A digital certificate generation request sent by a user is received, wherein the digital certificate generation request indicates first user information of the user S2304
The first user information is broadcast to the blockchain, to enable the blockchain node, which participates in generation of the same first aggregated public key, on the blockchain to sign the first user information by using the corresponding private key component, so as to generate first signature information S2305
The first signature information is aggregated to generate a digital certificate for the user, wherein the digital certificate indicates identifier information of the blockchain node S2306
A digital certificate revocation request sent by a user is received, wherein the digital certificate revocation request indicates second user information of the user and a digital certificate to be revoked S2307
The second user information is broadcast to the blockchain, to enable one or more blockchain nodes, which correspond to the identifier information indicated by the digital certificate to be revoked, on the blockchain to sign the second user information by using the corresponding private key component, so as to generate second signature information S2308
The second signature information is aggregated to generate a revocation certificate corresponding to the digital certificate to be revoked, wherein the revocation certificate indicates the identifier information of the one or more blockchain nodes

Fig. 24

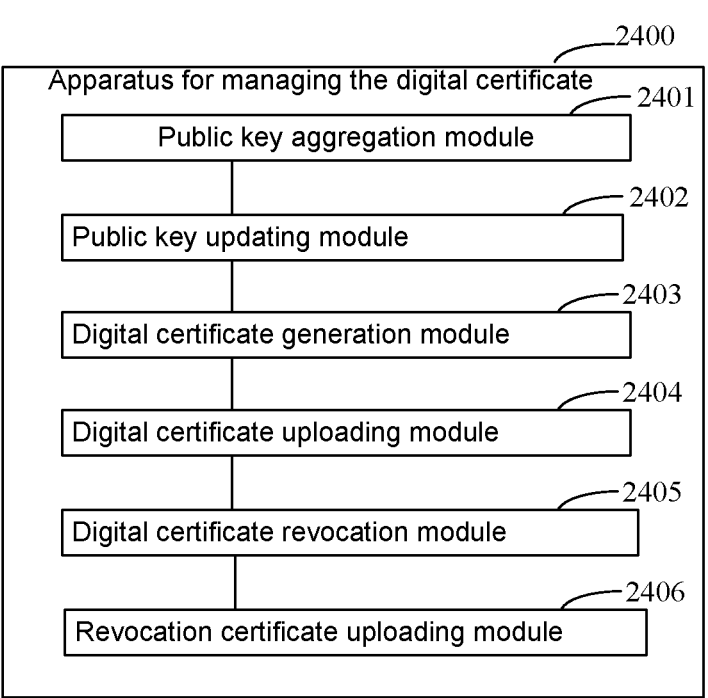

2400
Apparatus for managing the digital certificate

2401
Public key aggregation module

2402
Public key updating module

2403
Digital certificate generation module

2404
Digital certificate uploading module

2405
Digital certificate revocation module

2406
Revocation certificate uploading module

Fig. 25

S2501

A corresponding polynomial is generated for each blockchain node, so as to generate a sub collaborative private key corresponding to the blockchain node according to the polynomial and identifier information of all the blockchain nodes

S2502

The sub collaborative private key is exchanged between the blockchain nodes, so as to enable each blockchain node to generate the same collaborative private key according to the sub collaborative private keys corresponding to all the blockchain nodes, wherein the collaborative private key is configured to manage a digital certificate

Fig. 26

S2601

A corresponding polynomial and an asymmetric key pair are generated for each blockchain node, so as to generate a sub collaborative private key corresponding to the blockchain node according to the polynomial and identifier information of all the blockchain nodes

S2602

The sub collaborative private key is exchanged between the blockchain nodes, so as to enable each blockchain node to generate the same collaborative private key according to the sub collaborative private keys corresponding to all the blockchain nodes, whrein the collaborative private key is configured to manage a digital certificate

S2603

A collaborative public key corresponding to the collaborative private key is generated, and the collaborative public key is written into a genesis block of a blockchain

S2604

A digital certificate generation request sent by a user is received, wherein the digital certificate generation request indicates first user information of the user

S2605

The first user information is broadcast to the blockchain, to enable one or more blockchain nodes on the blockchain to sign the first user information by respectively using the collaborative private key, so as to generate first signature information

S2606

The first signature information is collected, and the first signature information is verified, so as to generate a digital certificate for the user according to the first signature information when the verification of the first signature information is passed

Fig. 27

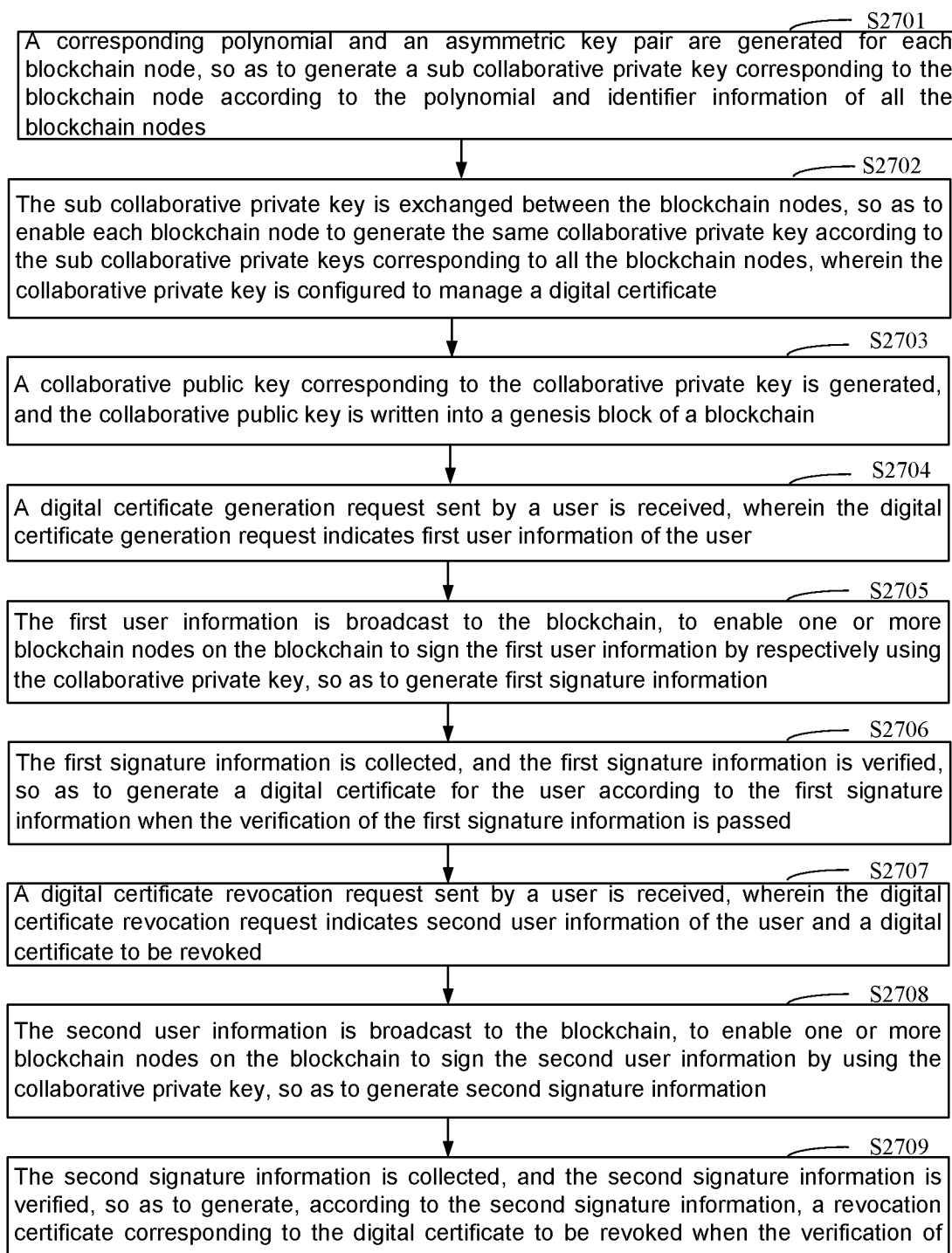

S2701
A corresponding polynomial and an asymmetric key pair are generated for each blockchain node, so as to generate a sub collaborative private key corresponding to the blockchain node according to the polynomial and identifier information of all the blockchain nodes S2702
The sub collaborative private key is exchanged between the blockchain nodes, so as to enable each blockchain node to generate the same collaborative private key according to the sub collaborative private keys corresponding to all the blockchain nodes, wherein the collaborative private key is configured to manage a digital certificate S2703
A collaborative public key corresponding to the collaborative private key is generated, and the collaborative public key is written into a genesis block of a blockchain S2704
A digital certificate generation request sent by a user is received, wherein the digital certificate generation request indicates first user information of the user S2705
The first user information is broadcast to the blockchain, to enable one or more blockchain nodes on the blockchain to sign the first user information by respectively using the collaborative private key, so as to generate first signature information S2706
The first signature information is collected, and the first signature information is verified, so as to generate a digital certificate for the user according to the first signature information when the verification of the first signature information is passed S2707
A digital certificate revocation request sent by a user is received, wherein the digital certificate revocation request indicates second user information of the user and a digital certificate to be revoked S2708
The second user information is broadcast to the blockchain, to enable one or more blockchain nodes on the blockchain to sign the second user information by using the collaborative private key, so as to generate second signature information S2709
The second signature information is collected, and the second signature information is verified, so as to generate, according to the second signature information, a revocation certificate corresponding to the digital certificate to be revoked when the verification of the second signature information is passed

3000

3100

METHOD AND APPARATUS FOR MANAGING DIGITAL CERTIFICATE

CROSS-REFERENCE TO RELATED APPLICATION

This application claims priority to Chinese Patent Application No. 202110474136.6 filed on Apr. 29, 2021 and entitled "Method and Apparatus for Managing Digital Certificate", Chinese Patent Application No. 202110475946.3 filed on Apr. 29, 2021 and entitled "Method and Apparatus for Managing Digital Certificate", Chinese Patent Application No. 202110474167.1 filed on Apr. 29, 2021 and entitled "Method and Apparatus for Managing Digital Certificate", Chinese Patent Application No. 202110474125.8 filed on Apr. 29, 2021 and entitled "Method and Apparatus for Managing Digital Certificate", Chinese Patent Application No. 202110488948.6 filed on Apr. 29, 2021 and entitled "Method and Apparatus for Managing Digital Certificate", Chinese Patent Application No. 202110474081.9 filed on Apr. 29, 2021 and entitled "Method and Apparatus for Managing Digital Certificate", and Chinese Patent Application No. 202110475858.3 filed on Apr. 29, 2021 and entitled "Method and Apparatus for Managing Digital Certificate", the disclosures of which are hereby incorporated by reference in their entireties as part or all of this application.

TECHNICAL FIELD

The present disclosure relates to technical field of computers, and in particular, to a method and apparatus for managing a digital certificate.

BACKGROUND

As an important component of a Public Key Infrastructure (PKI), a Certificate Authority (CA) is responsible for issuing a digital certificate that may identify a user identity. Once a CA private key for issuing the digital certificate is leaked, all digital certificates issued by the CA all lose the validity, such that guaranteeing the security of the CA private key is the core of entire PKI security.

In order to improve the security of the CA private key, a solution of managing the CA by a plurality of parties is proposed. However, in the current implemented scenario where the plurality of parties jointly manage the CA, each management member may issue the digital certificate according to own needs. Due to the lack of supervision of other management members or a unified coordination and supervision mechanism, uncontrollable external risks may be introduced if any party uses the CA private key improperly. In addition, the management members actually responsible for operating and maintaining the CA or an introduced third party CA manager has a high degree of control over the CA, such that it is easy to cause leakage of the CA private key due to mismanagement, resulting in untrustworthiness of the whole CA.

SUMMARY

In view of this, embodiments of the present application provide a method and apparatus for managing a digital certificate, which are able to implement joint control over the issuance of a private key to a digital certificate by a plurality of management members, and avoid private key leakage caused by mismanagement of any one of the management members. In addition, a management member involved in the digital certificate may be determined according to an application scenario of the digital certificate, such that the security of digital certificate issuance is further improved.

In order to achieve the above objectives, a first aspect of the present disclosure provides a method for managing a digital certificate, which includes the following operations.

A digital certificate generation request sent by a user is received, wherein the digital certificate generation request indicates first user information of the user and a digital certificate application scenario.

A preset threshold value corresponding to the digital certificate application scenario is determined according to the digital certificate application scenario, wherein the threshold value indicates a number of blockchain nodes, which participate in digital certificate generation, in all blockchain nodes.

The first user information is broadcast to a blockchain, to enable the blockchain node, which knows an aggregated public key corresponding to the threshold value, to sign the first user information by using a private key component of the blockchain node, so as to generate first signature information, wherein the aggregated public key corresponding to the threshold value is generated by means of aggregating a public key component of the blockchain node on the basis of a signature generation algorithm.

The first signature information is aggregated to generate the digital certificate for the user.

According to a second aspect of the present disclosure, an embodiment of the present application provides a method for managing a digital certificate, which includes the following operations.

A digital certificate generation request sent by a user is received, wherein the digital certificate generation request indicates first user information of the user.

The first user information is broadcast to a blockchain, to enable a blockchain node, which knows a global public key, to sign the first user information by using a private key component of the blockchain node, so as to generate first signature information, wherein the global public key is generated by means of aggregating public key components of blockchain nodes on the basis of a signature generation algorithm.

The first signature information is aggregated to generate a digital certificate for the user.

According to a third aspect of the present disclosure, an embodiment of the present application provides a method for managing a digital certificate, which includes the following operations.

A digital certificate generation request sent by a user is received, wherein the digital certificate generation request indicates first user information of the user.

The first user information is broadcast to the blockchain, to enable any one or more blockchain nodes on the blockchain to sign the first user information by using a corresponding private key component, so as to generate first signature information.

The first signature information is aggregated to generate a digital certificate for the user, wherein the digital certificate indicates identifier information of the one or more blockchain nodes.

According to a fourth aspect of the present disclosure, an embodiment of the present application provides a method for managing a digital certificate, which includes the following operations.

An asymmetric key pair is generated for each blockchain node, wherein the asymmetric key pair indicates a public key component and a private key component, corresponding to the blockchain node.

A global key pair is generated, wherein the global key pair indicates a global public key and a global private key. The global private key is used to sign preset root certificate information, so as to generate a root certificate.

Private key components of one or more blockchain nodes are aggregated on the basis of a signature generation algorithm, so as to generate one or more aggregated public keys.

The one or more aggregated public keys, the global public key, and the root certificate are written into a genesis block of a blockchain.

According to a fifth aspect of the present disclosure, an embodiment of the present application provides a method for managing a digital certificate, which includes the following operations.

An asymmetric key pair is generated for a newly-added blockchain node when there is one or more newly-added blockchain nodes on a blockchain, wherein the asymmetric key pair indicates a public key component and a private key component, corresponding to the newly-added blockchain node.

The public key components of one or more blockchain nodes on the blockchain are aggregated on the basis of a signature generation algorithm, so as to generate one or more first aggregated public keys.

One or more second aggregated public keys already present in a genesis block of the blockchain are updated according to the one or more first aggregated public keys, wherein the second aggregated public key is generated by means of aggregating public key components of one or more blockchain nodes on the blockchain on the basis of the signature generation algorithm before the one or more nodes are newly added to the blockchain.

According to a sixth aspect of the present disclosure, an embodiment of the present application provides a method for managing a digital certificate, which includes the following operations.

When one or more blockchain nodes are deleted from a blockchain, public key components of one or more blockchain nodes on the blockchain are aggregated on the basis of a signature generation algorithm, so as to generate one or more first aggregated public keys.

One or more second aggregated public keys already present in a genesis block of the blockchain are updated according to the one or more first aggregated public keys, wherein the second aggregated public key is generated by means of aggregating public key components of one or more blockchain nodes on the blockchain on the basis of the signature generation algorithm before the one or more blockchain nodes are deleted.

As at least one alternative embodiment, updating, according to the one or more first aggregated public keys, the one or more second aggregated public keys already present in the genesis block of the blockchain includes the following operation.

The one or more first aggregated public keys are written in the genesis block of the blockchain, and the one or more second aggregated public keys already present in the genesis block are reserved.

According to a seventh aspect of the present disclosure, an embodiment of the present application provides a method for managing a digital certificate, which includes the following operations.

A corresponding polynomial is generated for each blockchain node, so as to generate a sub collaborative private key corresponding to the blockchain node according to the polynomial and identifier information of all the blockchain nodes.

The sub collaborative private key is exchanged between the blockchain nodes, so as to enable each blockchain node to generate the same collaborative private key according to sub collaborative private keys corresponding to all the blockchain nodes, wherein the collaborative private key is configured to manage a digital certificate.

According to an eighth aspect of the present disclosure, an embodiment of the present application provides an apparatus for managing a digital certificate, which includes a request receiving module, a threshold value determination module, an information broadcasting module, and a signature aggregation module.

The request receiving module is configured to receive a digital certificate generation request sent by a user, wherein the digital certificate generation request indicates first user information of the user and a digital certificate application scenario.

The threshold value determination module is configured to, according to the digital certificate application scenario, determine a preset threshold value corresponding to the digital certificate application scenario, wherein the threshold value indicates a number of blockchain nodes, which participate in digital certificate generation, in all blockchain nodes.

The information broadcasting module is configured to broadcast the first user information to a blockchain, to enable a blockchain node, which knows an aggregated public key corresponding to the threshold value, to sign the first user information by using a private key component of the blockchain node, so as to generate first signature information, wherein the aggregated public key corresponding to the threshold value is generated by means of aggregating public key components of the blockchain node on the basis of a signature generation algorithm.

The signature aggregation module is configured to aggregate the first signature information to generate the digital certificate for the user.

According to a ninth aspect of the present disclosure, an embodiment of the present application provides an apparatus for managing a digital certificate, which includes: a request receiving module, an information sending module, and a signature aggregation module.

The request receiving module is configured to receive a digital certificate generation request sent by a user, wherein the digital certificate generation request indicates first user information of the user.

The information sending module is configured to broadcast the first user information to a blockchain, to enable a blockchain node, which knows a global public key, to sign the first user information by using a private key component of the blockchain node, so as to generate first signature information, wherein the global public key is generated by means of aggregating public key components of blockchain nodes on the basis of a signature generation algorithm.

The signature aggregation module is configured to aggregate the first signature information to generate a digital certificate for the user.

According to a tenth aspect of the present disclosure, an embodiment of the present application provides an apparatus for managing a digital certificate, which includes: a request receiving module, an information broadcasting module, and a signature aggregation module.

The request receiving module is configured to receive a digital certificate generation request sent by a user, wherein the digital certificate generation request indicates first user information of the user.

The information broadcasting module is configured to broadcast the first user information to the blockchain, to enable any one or more blockchain nodes on the blockchain to sign the first user information by using a corresponding private key component, so as to generate first signature information.

The signature aggregation module is configured to aggregate the first signature information to generate a digital certificate for the user, wherein the digital certificate indicates identifier information of the one or more blockchain nodes.

According to an eleventh aspect of the present disclosure, an embodiment of the present application provides an apparatus for managing a digital certificate, which includes: a key pair generation module, a root certificate generation module, a public key aggregation module, and a public key writing module.

The key pair generation module is configured to generate an asymmetric key pair for each blockchain node, wherein the asymmetric key pair indicates a public key component and a private key component, corresponding to the blockchain node.

The root certificate generation module is configured to generate a global key pair, where the global key pair indicates a global public key and a global private key, and use the global private key to sign preset root certificate information, so as to generate a root certificate.

The public key aggregation module is configured to aggregate private key components of one or more blockchain nodes on the basis of a signature generation algorithm, so as to generate one or more aggregated public keys.

The public key writing module is configured to write the one or more aggregated public keys, the global public key, and the root certificate into a genesis block of a blockchain.

According to a twelfth aspect of the present disclosure, an embodiment of the present application provides an apparatus for managing a digital certificate, which includes: a key pair generation module, a public key aggregation module, and a public key updating module.

The key pair generation module is configured to generate an asymmetric key pair for a newly-added blockchain node when there is one or more newly-added blockchain nodes on a blockchain, wherein the asymmetric key pair indicates a public key component and a private key component, corresponding to the newly-added blockchain node.

The public key aggregation module is configured to aggregate the public key components of one or more blockchain nodes on the blockchain on the basis of a signature generation algorithm, so as to generate one or more first aggregated public keys.

The public key updating module is configured to update, according to the one or more first aggregated public keys, one or more second aggregated public keys already present in a genesis block of the blockchain, wherein the second aggregated public key is generated by means of aggregating public key components of one or more blockchain nodes on the blockchain on the basis of the signature generation algorithm before the one or more nodes are newly added to the blockchain.

According to a thirteenth aspect of the present disclosure, an embodiment of the present application provides an apparatus for managing a digital certificate, which includes: a public key aggregation module and a public key updating module.

The public key aggregation module is configured to, when one or more blockchain nodes are deleted from a blockchain, aggregate public key components of one or more blockchain nodes on the blockchain on the basis of a signature generation algorithm, so as to generate one or more first aggregated public keys.

The public key updating module is configured to update, according to the one or more first aggregated public keys, one or more second aggregated public keys already present in a genesis block of the blockchain, wherein the second aggregated public key is generated by means of aggregating public key components of one or more blockchain nodes on the blockchain on the basis of the signature generation algorithm before the one or more blockchain nodes are deleted.

According to a fourteenth aspect of the present disclosure, an embodiment of the present application provides an apparatus for managing a digital certificate, which includes: a polynomial generation module and a collaborative private key generation module.

The polynomial generation module is configured to generate a corresponding polynomial for each blockchain node, so as to generate a sub collaborative private key corresponding to the blockchain node according to the polynomial and identifier information of all the blockchain nodes.

The collaborative private key generation module is configured to exchange the sub collaborative private key between the blockchain nodes, so as to enable each blockchain node to generate the same collaborative private key according to sub collaborative private keys corresponding to all the blockchain nodes, wherein the collaborative private key is configured to manage a digital certificate.

Further effects of non-customary optional methods are described below in combination with specific implementations.

BRIEF DESCRIPTION OF THE DRAWINGS

Drawings are used to better understand the present application, and are not intended to improperly limit the present application. Where:

FIG. 1 is a schematic diagram of main processes of a method for managing a digital certificate according to a first aspect of an embodiment of the present application.

FIG. 3 is a schematic diagram of main processes of still another method for managing a digital certificate according to a first aspect of an embodiment of the present application.

FIG. 4 is a schematic diagram of main modules of an apparatus for managing a digital certificate according to a first aspect of an embodiment of the present application.

FIG. 5 is a schematic diagram of main processes of a method for managing a digital certificate according to a second aspect of an embodiment of the present application.

FIG. 6 is a schematic diagram of main processes of another method for managing a digital certificate according to a second aspect of an embodiment of the present application.

FIG. 7 is a schematic diagram of main processes of still another method for managing a digital certificate according to a second aspect of an embodiment of the present application.

FIG. 8 is a schematic diagram of main modules of an apparatus for managing a digital certificate according to a second aspect of an embodiment of the present application.

FIG. 9 is a schematic diagram of main processes of a method for managing a digital certificate according to a third aspect of an embodiment of the present application.

FIG. 10 is a schematic diagram of main processes of another method for managing a digital certificate according to a third aspect of an embodiment of the present application.

FIG. 11 is a schematic diagram of main processes of still another method for managing a digital certificate according to a third aspect of an embodiment of the present application.

FIG. 12 is a schematic diagram of main modules of an apparatus for managing a digital certificate according to a third aspect of an embodiment of the present application.

FIG. 13 is a schematic diagram of main processes of a method for managing a digital certificate according to a fourth aspect of an embodiment of the present application.

FIG. 14 is a schematic diagram of main processes of another method for managing a digital certificate according to a fourth aspect of an embodiment of the present application.

FIG. 15 is a schematic diagram of main processes of still another method for managing a digital certificate according to a fourth aspect of an embodiment of the present application.

FIG. 16 is a schematic diagram of main modules of an apparatus for managing a digital certificate according to a fourth aspect of an embodiment of the present application.

FIG. 17 is a schematic diagram of main processes of a method for managing a digital certificate according to a fifth aspect of an embodiment of the present application.

FIG. 18 is a schematic diagram of main processes of another method for managing a digital certificate according to a fifth aspect of an embodiment of the present application.

FIG. 19 is a schematic diagram of main processes of still another method for managing a digital certificate according to a fifth aspect of an embodiment of the present application.

FIG. 20 is a schematic diagram of main modules of an apparatus for managing a digital certificate according to a fifth aspect of an embodiment of the present application.

FIG. 21 is a schematic diagram of main processes of a method for managing a digital certificate according to a sixth aspect of an embodiment of the present application.

FIG. 22 is a schematic diagram of main processes of another method for managing a digital certificate according to a sixth aspect of an embodiment of the present application.

FIG. 23 is a schematic diagram of main processes of still another method for managing a digital certificate according to a sixth aspect of an embodiment of the present application.

FIG. 24 is a schematic diagram of main modules of an apparatus for managing a digital certificate according to a sixth aspect of an embodiment of the present application.

FIG. 25 is a schematic diagram of main processes of a method for managing a digital certificate according to a seventh aspect of an embodiment of the present application.

FIG. 26 is a schematic diagram of main processes of another method for managing a digital certificate according to a seventh aspect of an embodiment of the present application.

FIG. 27 is a schematic diagram of main processes of still another method for managing a digital certificate according to a seventh aspect of an embodiment of the present application.

DETAILED DESCRIPTION OF THE EMBODIMENTS

Figure 2:
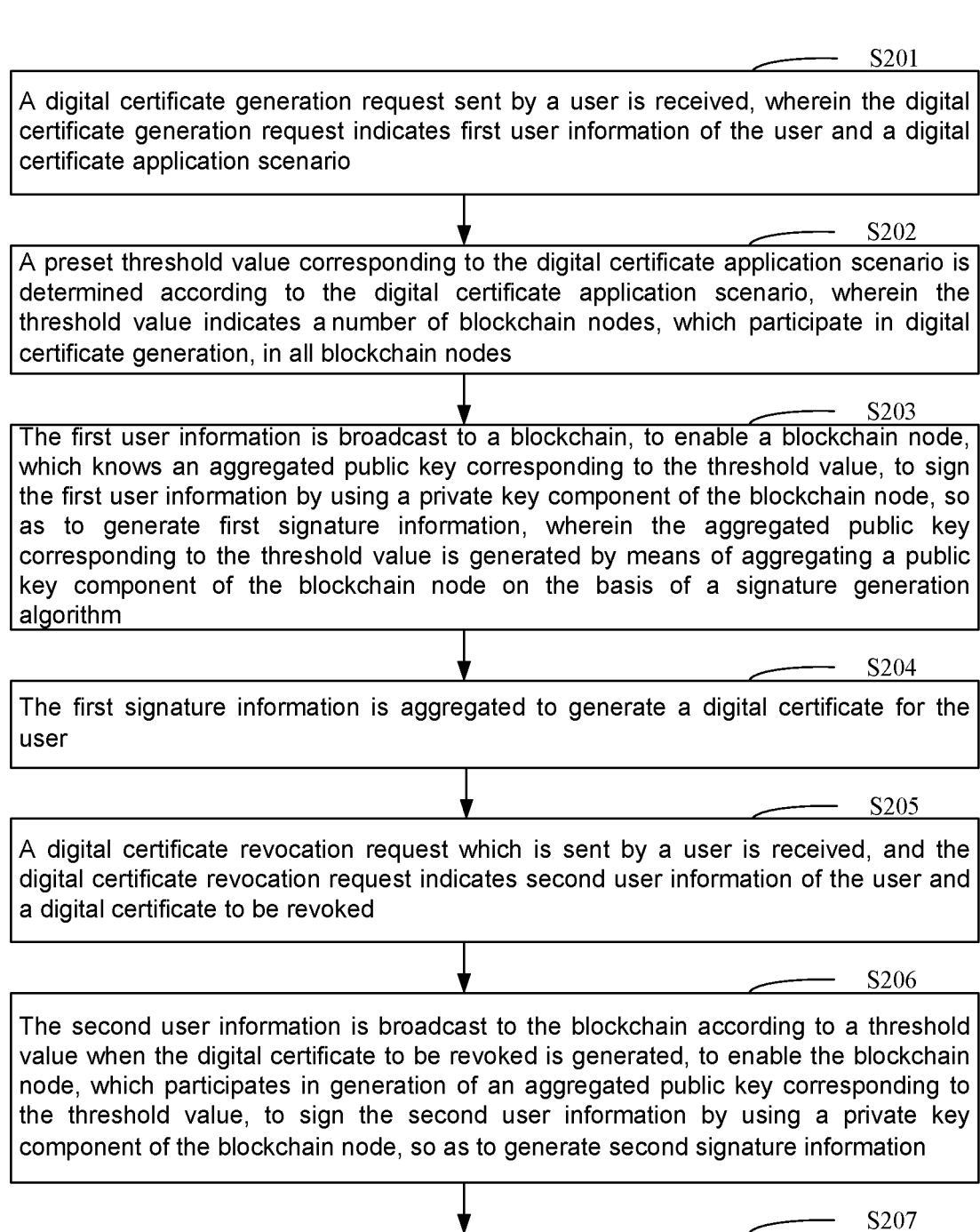
FIG. 2 is a schematic diagram of main processes of another method for managing a digital certificate according to a first aspect of an embodiment of the present application.

Exemplary embodiments of the present application are described in detail below with reference to the drawings, including various details of the embodiments of the present application to facilitate understanding, and should be regarded as merely exemplary. Thus, those of ordinary skilled in the art shall understand that, variations and modifications can be made on the embodiments described herein, without departing from the scope and spirit of the present application. Likewise, for clarity and conciseness, descriptions of well-known functions and structures are omitted in the following description.

FIG. 1 is a schematic diagram of main processes of a method for managing a digital certificate according to a first aspect of an embodiment of the present application. In order to prevent the leakage of private keys for the issuance of digital certificates, so as to improve the security of the digital certificates, the solution that performs multi-party joint management on the basis of a blockchain is provided in this embodiment. In the solution, each party of the management members corresponds to one blockchain node. As shown in FIG. 1, the method for managing the digital certificate may include the following steps.

At S101, a digital certificate generation request sent by a user is received, wherein the digital certificate generation request indicates first user information of the user and a digital certificate application scenario.

A digital certificate is issued by a Certificate Authority (CA) to mark, and the digital certificate is a character string of identity information of each part during communication in Internet communication. The digital certificate is commonly used in commercial websites such as B2B, B2C, P2P and O2O, an information website including private information, and service websites such as government agencies and financial institutions, so as to improve the security of a network. According to different users, common digital certificates may be classified into a personal identity digital certificate, an enterprise or institutional identity digital certificate, a payment gateway digital certificate, a server digital certificate, a secure email digital certificate, a personal code signature digital certificate, etc. The digital certificate at least indicates a digital certificate owner public key, digital certificate owner information, digital certificate issuer information, issuer signature information, and the like. Therefore, in order to generate a digital certificate corresponding to a user, first user information at least includes information for identifying digital certificate owners such as user public keys, user names or user identifiers. In addition, the first user information may further include other information that the user needs to display in the digital certificate.

An application scenario refers to an actual application scenario of the issued digital certificate, and includes, but is not limited to, a financial transaction, a document signature, mail sending, site security, etc. As at least one alternative embodiment, using the financial transaction as an example, a correspondence relationship between a transaction amount and a threshold value may be preset. For example, if a transaction amount is greater, the corresponding threshold value, that is, the number of blockchain nodes participating in generation of aggregated public keys or participating in issuance of the digital certificates is greater, and vice versa. Therefore, the difference in issuance of the digital certificates under different application scenarios may be met, and the security and validity of digital certificate issuance may also be guaranteed, thereby improving the applicability of collaboratively managing the digital certificates.

It is understandable that, before the digital certificate generation request sent by the user is received, the method further includes: according to the threshold value, determining, from all the blockchain nodes, one or more blockchain nodes that participate in generation of the aggregated public key corresponding to the threshold value; aggregating public key components of the determined blockchain nodes on the basis of a signature algorithm, so as to generate, for each blockchain node, the same aggregated public key corresponding to the threshold value; and calculating one blockchain node from the determined blockchain nodes, so as to write the aggregated public key into a genesis block of the blockchain, and to allow other blockchain nodes, which participate generation of the aggregated public key corresponding to the threshold value, to verify the aggregated public key in the genesis block.

The threshold value may be the number m of the blockchain nodes participating in generation of the aggregated public keys, and may also be a ratio p ($p=m/n$, $0.5 \leq p \leq 1$) of the number m of the blockchain nodes participating in generation of the aggregated public keys to a total number n of the blockchain nodes. For example, the total number n of nodes on the blockchain is 10, the threshold value may be any one of 1, 2, 3, 4, 5, 6, 7, 8, 9, and 10, and may also be any one of 0.1, 0.2, 0.3, 0.4, 0.5, 0.6, 0.7, 0.8, 0.9, and 1. However, it is to be noted that, in order to improve the security of the digital certificate, and prevent the blockchain node from being attacked, the ratio of the number of the blockchain nodes participating in generation of the aggregated public keys or participating in issuance of the digital certificates to the total number of the blockchain nodes shall not be less than 0.5.

As at least one alternative embodiment, for example, the total number n of the nodes on the blockchain is 10, and the threshold value corresponding to the application scenario is 7, such that 7 blockchain nodes may be arbitrarily selected from 10 blockchain nodes or 7 blockchain nodes are selected according to actual requirements, to enable the blockchain node to aggregate the public key components of the 7 blockchain nodes by using a signature generation algorithm, so as to generate the aggregated public key corresponding to the threshold value 7.

In addition, it is to be noted that, in a blockchain initialization step, an asymmetric key pair is generated for each blockchain node by using an encryptor. The public key component in the asymmetric key pair may be exchanged by means of offline communication, such as mails and letters, agreed upon by management members, and the respective public key components may also be written into the genesis block of the blockchain. Therefore, the public key components may be mutually known between the management members participating in management of the digital certificate or the blockchain nodes corresponding to the management members, such that each blockchain node may aggregate a global public key by using the signature generation algorithm. The signature generation algorithm that may be used includes, but is not limited to, a Schnorr signature algorithm, a BLS signature algorithm, etc.

When and only when the verification of the aggregated public key is passed, that is, when the aggregated public key aggregated by the blockchain node itself is the same as the aggregated public key in the genesis block, all the blockchain nodes on the blockchain admit the validity of the aggregated public key, such that subsequent steps of digital certificate generation can be continued. Therefore, the reliability of the aggregated public keys stored in the genesis block is improved. It is understandable that, in order to guarantee the validity of the aggregated public key when one or few nodes on the blockchain are attacked, a verification rule for the aggregated public key may be determined according to actual requirements. For example, when 50% or 60% of the blockchain nodes participating in generation of the aggregated public keys passes the verification of the aggregated public keys, it is considered that the aggregated public keys in the genesis block is valid.

In addition, in order to further ensure the reliability of the aggregated public key, the authenticity and validity of the source of the aggregated public key are ensured by means of issuing a root certificate and writing the root certificate into the genesis block. For example, preset root certificate information is broadcast to the blockchain when the verification of the aggregated public key is passed, to enable the blockchain node, which participates in generation of the aggregated public key, to sign the preset root certificate information by using the private key component of the blockchain node, so as to generate third signature information; and the third signature information is aggregated to generate a root certificate corresponding to the aggregated public key, and the root certificate is written into the genesis block of the blockchain.

At S102, a preset threshold value corresponding to the digital certificate application scenario is determined according to the digital certificate application scenario, wherein the threshold value indicates a number of blockchain nodes, which participate in digital certificate generation, in all blockchain nodes.

It is understandable that, since a correspondence relationship between an application scenario and a threshold value is preset according to actual requirements before the digital certificate is issued, when the digital certificate generation request is received, the threshold value may be determined according to the correspondence relationship between the application scenario and the threshold value. Then, the number of the blockchain nodes participating in issuance of the digital certificates is determined from all the blockchain nodes according to the threshold value, so as to enable the corresponding blockchain node to issue the digital certificate. For example, in order to ensure that the issued digital certificate may be verified by using the aggregated public key corresponding to the threshold value and stored in the genesis block, the blockchain nodes participating in issuance of the digital certificates shall be the same as the blockchain nodes participating in generation of the aggregated public keys corresponding to the threshold value.

At S103, the first user information is broadcast to a blockchain, to enable the blockchain node, which participates in generation of the aggregated public key corresponding to the threshold value, to sign the first user information by using a private key component of the blockchain node, so as to generate first signature information. The aggregated public key corresponding to the threshold value is generated by means of aggregating the public key components of blockchain nodes on the basis of the signature generation algorithm.

That is to say, one or more blockchain nodes need to participate together when the aggregated public key is generated through aggregation, and the one or more blockchain nodes also need to participate in generation of the first signature information together when the digital certificate is issued. For example, the first user information merely indicates a user public key and a user name, after the first user information is broadcast to the blockchain, the blockchain nodes participating in generation of the aggregated public keys corresponding to the threshold value may calculate, by means of a hash algorithm, hash values corresponding to the user public key and the user name, and encrypt the hash values by using own private key components, so as to generate the first signature information. Based on this, the first signature information generated by each blockchain node is collected; and all pieces of the first signature information are aggregated to generate signature information in the digital certificate, so as to generate the digital certificate. It is understandable that, the aggregated signature information corresponds to the aggregated public key, which is aggregated above. That is to say, the signature information in the digital certificate may be verified by using the aggregated public key, so as to determine the validity and legality of the digital certificate.

For example, there are four blockchain nodes, which are Node 1, Node 2, Node 3 and Node 4, on the blockchain, if the threshold value corresponding to the application scenario is 3, three out of the four blockchain nodes participate in issuance of the digital certificate. Since the aggregated public key A corresponding to the threshold value 3 at an initialization phase is generated with the participation of the Node 1, the Node 2 and the Node 3, after the first user information is broadcast to the blockchain, the three blockchain nodes participating in generation of the aggregated public key A, which are the Node 1, the Node 2 and the Node 3, still encrypt the hash value of the first user information by using the respective private key components, so as to generate the first signature information; and the first signature information generated by the Node 1, the Node 2 and the Node 3 is aggregated to generate the digital certificate corresponding to the threshold value 3, which is the digital certificate suitable for the application scenario.

At S104, the first signature information is aggregated to generate a digital certificate for the user.

The signature generation algorithm that may be used includes, but is not limited to, a Schnorr signature algorithm, a BLS signature algorithm, etc.

Based on this, the digital certificate is uploaded to the blockchain, so as to allow the blockchain node or a smart contract to verify the digital certificate according to the aggregated public key corresponding to the threshold value. For example, the digital certificate is verified by using the smart contract, first, the smart contract on a chain may acquire the aggregated public key corresponding to the threshold value or the root certificate from the genesis block of the blockchain, to decrypt the signature information in the digital certificate by using the aggregated public key, so as to acquire the hash value; next, a hashing operation is performed, by using the hash algorithm, on plaintext information other than the signature information indicated in the digital certificate, so as to generate a new hash value; and based on this, whether the newly-generated hash value is the same as the hash value acquired after the signature information is decrypted by using the aggregated public key is determined, if so, the verification of the digital certificate is passed, that is, the digital certificate is legal, and if no, the verification of the digital certificate fails, that is, the digital certificate is illegal. Therefore, the security and reliability of the source of the digital certificate are further guaranteed.

It is understandable that, after the digital certificate is generated, the revocation of the digital certificate is also involved during the whole lifecycle of the digital certificate. Based on this, the method further includes: receiving a digital certificate revocation request sent by the user, wherein the digital certificate revocation request indicates second user information of the user and a digital certificate to be revoked; broadcasting the second user information to the blockchain according to a threshold value when the digital certificate to be revoked is generated, to enable the blockchain node, which participates in generation of an aggregated public key corresponding to the threshold value, to sign the second user information by using the private key component of the blockchain node, so as to generate second signature information; and aggregating the second signature information to generate a revocation certificate corresponding to the digital certificate to be revoked.

For example, the second user information only includes a user name and a user public key, after the second user information is broadcast to the blockchain, one or more blockchain nodes participating in generation of the digital certificate to be revoked are notified, so as to enable each of the blockchain nodes to perform the hashing operation on the user name and the user public key by using the hash algorithm, so as to generate the hash value, and then encrypt the hash value by using own private key components, so as to generate the second signature information. Based on this, all pieces of the second signature information are collected and aggregated to generate signature information indicated in the revocation certificate. In addition, the revocation certificate also indicates information such as the user name and the user public key. It is understandable that, the hashing operation may also be performed on information, such as the user name, the user public key, and the serial number of a digital certificate to be revoked, by using the hash algorithm according to actual requirements, so as to generate the hash value and generate the second signature information. Therefore, joint control of digital certificate revocation is implemented by means of joint participation of the one or more blockchain nodes participating in generation of the digital certificate to be revoked, such that the reliability of the digital certificate is improved.

Based on this, the revocation certificate is uploaded to the blockchain, so as to allow the blockchain node or a smart contract to verify the revocation certificate according to the aggregated public key corresponding to the threshold value. For example, the revocation certificate is verified by using the smart contract on the chain, first, the aggregated public key corresponding to the threshold value or the root certificate indicating the aggregated public key is acquired from the blockchain, to decrypt the signature information in the revocation certificate by using the aggregated public key, so as to acquire the hash value; then, the hashing operation is performed, by using the hash algorithm, on the plaintext information other than the signature information indicated in the revocation certificate, so as to generate a new hash value; and based on this, whether the newly-generated hash value is the same as the hash value acquired after the signature information is decrypted by using the aggregated public key is determined, if so, the verification of the revocation certificate is passed, that is, the digital certificate corresponding to the revocation certificate is no longer valid, and if no, the verification of the revocation certificate fails, that is, the source of the revocation certificate is unreliable, such that whether the corresponding digital certificate is revoked is unable to be determined by using the revocation certificate.

Further, in order to determine whether the digital certificate is still valid to determine the validity of the identity of a digital certificate owner, a digital certificate verification party may query, from the blockchain, whether the digital certificate has the corresponding revocation certificate; if no, it indicates that the digital certificate has not been revoked yet; and if so, it indicates that the digital certificate has been revoked. Further, in order to further guaranteed the validity of the revocation certificate stored on the blockchain, the verification party may perform the above verification on the validity of the revocation certificate on the basis of the known aggregated public key.

Based on the above embodiments, by means of presetting the correspondence relationship between the application scenario and the threshold value, the number of the blockchain nodes participating issuance of the digital certificate under the application scenario is determined according to the threshold value. The difference in digital certificate issuance under different application scenarios is met, such that the applicability of a digital certificate management solution is improved. In addition, private keys for issuing the digital certificates are divided into the private key components corresponding to the blockchain nodes by means of using the corresponding private key components to sign the first user information by a plurality of blockchain nodes, so as to generate the first signature information, and aggregating the first signature information by using the signature generation algorithm, so as to generate the digital certificates, such that joint control of a plurality of management members over the private key for issuing the digital certificate is realized, thereby avoiding private key leakage. In addition, when and only when the first signature information, which is generated by all the blockchain nodes participating in generation of the aggregated public keys, is aggregated, a new digital certificate can be successfully generated, such that uncontrollable external risks caused by random issuance of the digital certificates by any management member according to own needs are avoided. Correspondingly, when and only when the second signature information, which is generated by all the blockchain nodes participating in generation of the aggregated public keys, is aggregated, the digital certificate can be successfully revoked, such that the validity and reliability of the digital certificate are further guaranteed.

Referring to FIG. 2, on the basis of the above embodiments related to FIG. 1, an embodiment of the present application provides another method for managing a digital certificate. The method may specifically include the following steps.

At S201, a digital certificate generation request sent by a user is received, wherein the digital certificate generation request indicates first user information of the user and a digital certificate application scenario.

It is understandable that, before the digital certificate generation request sent by the user is received, an asymmetric key pair also needs to be generated for each blockchain node by using an encryptor. A public key component in the asymmetric key pair may be exchanged by means of offline communication, such as mails and letters, agreed upon by management members, and the respective public key components may also be written into a genesis block of a blockchain, so as to allow the public key components to be mutually known between the management members participating in management of a digital certificate or the blockchain nodes corresponding to the management members, such that each blockchain node may aggregate an aggregated public key by using a signature generation algorithm.

Further, according to a preset correspondence relationship between an application scenario and a threshold value, the blockchain nodes corresponding to one or more threshold values are selected from the blockchain nodes, and the public key components of the blockchain nodes are aggregated by using the signature generation algorithm, so as to generate the aggregated public keys corresponding to the one or more threshold values and write the same into the genesis block.

At S202, a preset threshold value corresponding to the digital certificate application scenario is determined according to the digital certificate application scenario, wherein the threshold value indicates a number of blockchain nodes, which participate in digital certificate generation, in all blockchain nodes.

At S203, the first user information is broadcast to a blockchain, to enable the blockchain node, which knows an aggregated public key corresponding to the threshold value, to sign the first user information by using a private key component of the blockchain node, so as to generate first signature information, wherein the aggregated public key corresponding to the threshold value is generated by means of aggregating public key components of the blockchain node on the basis of a signature generation algorithm.

At S204, the first signature information is aggregated to generate a digital certificate for the user.

Based on this, the digital certificate may be uploaded to the blockchain, so as to allow the blockchain node or a smart contract to acquire, from the genesis block, the aggregated public key corresponding to the threshold value or a root certificate to verify the digital certificate, so as to guarantee the legality of the digital certificate.

At S205, a digital certificate revocation request sent by a user is received, wherein the digital certificate revocation request indicates second user information of the user and a digital certificate to be revoked.

At S206, the second user information is broadcast to the blockchain according to a threshold value when the digital certificate to be revoked is generated, to enable the blockchain node, which participates in generation of an aggregated public key corresponding to the threshold value, to sign the second user information by using the private key component of the blockchain node, so as to generate second signature information.

At S207, the second signature information is aggregated to generate a revocation certificate corresponding to the digital certificate to be revoked.

Based on this, the revocation certificate may be uploaded to the blockchain, so as to enable a verification party of the digital certificate to be revoked to determine, according to the digital certificate to be revoked acquired from the blockchain, the validity of the digital certificate to be revoked.

Referring to FIG. 3, on the basis of the above embodiments related to FIG. 1 or FIG. 2, still another method for managing a digital certificate is provided. The method may specifically include the following steps.

At S301, one or more blockchain nodes that participate in generation of the aggregated public key corresponding to the threshold value are determined from all the blockchain nodes according to the threshold value.

At S302, the public key components of the determined blockchain nodes are aggregated on the basis of a signature algorithm, so as to generate, for each blockchain node, the same aggregated public key corresponding to the threshold value.

Before an aggregated public key value is generated, an asymmetric key pair is generated for each blockchain node by using an encryptor. The asymmetric key pair includes a public key component and a private key component.

At S303, one blockchain node is calculated from the determined blockchain nodes, so as to write the aggregated public key into a genesis block of the blockchain, and to allow other blockchain nodes, which participate generation of the aggregated public key corresponding to the threshold value, to verify the aggregated public key in the genesis block.

For example, one blockchain node may be selected, by using a locking mechanism, from the blockchain nodes generating the aggregated public key, to write the aggregated public keys into a genesis block, so as to avoid repeated writing of different blockchain nodes. In addition, when and only when the blockchain node participating in generation of the aggregated public key passes the verification on the aggregated public key in the genesis block, nodes on the blockchain may admit the validity of the aggregated public key, and a subsequent step of issuing the digital certificate is performed.

At S304, preset root certificate information is broadcast to the blockchain when the verification of the aggregated public key is passed, to enable the blockchain node, which participates in generation of the aggregated public key, to sign the preset root certificate information by using the private key component of the blockchain node, so as to generate third signature information.

The preset root certificate information is any information that is pre-determined by a management member participating in management of the digital certificate; and when there are a plurality of aggregated public keys, one root certificate may be correspondingly generated for each aggregated public key.

At S305, the third signature information is aggregated to generate a root certificate corresponding to the aggregated public key, and the root certificate is written into the genesis block of the blockchain.

At S306, a digital certificate generation request sent by a user is received, wherein the digital certificate generation request indicates first user information of the user and a digital certificate application scenario.

At S307, a preset threshold value corresponding to the digital certificate application scenario is determined according to the digital certificate application scenario, wherein the threshold value indicates a number of blockchain nodes, which participate in digital certificate generation, in all blockchain nodes.

At S308, the first user information is broadcast to a blockchain, to enable the blockchain node, which knows an aggregated public key corresponding to the threshold value, to sign the first user information by using a private key component of the blockchain node, so as to generate first signature information, wherein the aggregated public key corresponding to the threshold value is generated by means of aggregating public key components of the blockchain node on the basis of a signature generation algorithm.

At S309, the first signature information is aggregated to generate a digital certificate for the user.

Based on this, the digital certificate may be uploaded to the blockchain, so as to allow a digital certificate verification party to acquire, from the genesis block, the aggregated public key corresponding to the threshold value or the root certificate, so as to verify the validity of the digital certificate.

In addition, when a digital certificate revocation request is received, a revocation certificate may also be generated for a digital certificate to be revoked, and uploaded to the blockchain, so as to allow the digital certificate verification party to query the validity of the digital certificate from the blockchain.

Referring to FIG. 4, on the basis of the above embodiments, an embodiment of the present application provides an apparatus for managing a digital certificate 400 from a first aspect. The apparatus includes a request receiving module 402, a threshold value determination module 403, an information broadcasting module 404, and a signature aggregation module 405.

The request receiving module 402 is configured to receive a digital certificate generation request sent by a user, wherein the digital certificate generation request indicates first user information of the user and a digital certificate application scenario.

The threshold value determination module 403 is configured to, according to the digital certificate application scenario, determine a preset threshold value corresponding to the digital certificate application scenario, wherein the threshold value indicates a number of blockchain nodes, which participate in digital certificate generation, in all blockchain nodes.

The information broadcasting module 404 is configured to broadcast the first user information to a blockchain, to enable the blockchain node, which knows an aggregated public key corresponding to the threshold value, to sign the first user information by using a private key component of the blockchain node, so as to generate first signature information, wherein the aggregated public key corresponding to the threshold value is generated by means of aggregating a public key component of the blockchain node on the basis of a signature generation algorithm.

The signature aggregation module 405 is configured to aggregate the first signature information to generate a digital certificate for the user.

In an optional implementation, the apparatus further includes a digital certificate uploading module 406.

The digital certificate uploading module 406 is configured to upload the digital certificate to the blockchain, so as to allow the blockchain node or a smart contract to verify the digital certificate according to the aggregated public key corresponding to the threshold value.

In an optional implementation, the apparatus further includes a digital certificate revocation module 407.

The digital certificate revocation module 407 is configured to receive a digital certificate revocation request sent by the user, wherein the digital certificate revocation request indicates second user information of the user and a digital certificate to be revoked;

to broadcast the second user information to the blockchain according to a threshold value when the digital certificate to be revoked is generated, to enable the blockchain node, which participates in generation of an aggregated public key corresponding to the threshold value, to sign the second user information by using the private key component of the blockchain node, so as to generate second signature information;

to aggregate the second signature information to generate a revocation certificate corresponding to the digital certificate to be revoked.

In an optional implementation, the digital certificate revocation module 407 is further configured to, upload the revocation certificate to the blockchain, so as to allow the blockchain node or a smart contract to verify the revocation certificate according to the aggregated public key corresponding to the threshold value.

In an optional implementation, the apparatus further includes: an aggregated public key generation module 401.

The aggregated public key generation module 401 is configured to, according to the threshold value, determine, from all the blockchain nodes, one or more blockchain nodes that participate in generation of the aggregated public key corresponding to the threshold value;

to aggregate the public key components of the determined blockchain nodes on the basis of a signature algorithm, so as to generate, for each blockchain node, the same aggregated public key corresponding to the threshold value.

to calculate one blockchain node from the determined blockchain nodes, so as to write the aggregated public key into a genesis block of the blockchain, and to allow other blockchain nodes, which participate generation of the aggregated public key corresponding to the threshold value, to verify the aggregated public key in the genesis block.

In an optional implementation, the aggregated public key generation module 401 is further configured to broadcast preset root certificate information to the blockchain when the verification of the aggregated public key is passed, to enable the blockchain node, which participates in generation of the aggregated public key, to sign the preset root certificate information by using the private key component of the blockchain node, so as to generate third signature information;

to aggregate the third signature information to generate a root certificate corresponding to the aggregated public key, and write the root certificate into the genesis block of the blockchain.

FIG. 5 is a schematic diagram of main processes of a method for managing a digital certificate according to a second aspect of an embodiment of the present application. As shown in FIG. 5, the method for managing the digital certificate may include the following steps.

At S501, a digital certificate generation request sent by a user is received, wherein the digital certificate generation request indicates first user information of the user.

A digital certificate is issued by a CA to mark, and the digital certificate is a character string of identity information of each part during communication in Internet communication. The digital certificate is commonly used in commercial websites such as B2B, B2C, P2P and O2O, an information website including private information, and service websites such as government agencies and financial institutions, so as to improve the security of a network. According to different users, common digital certificates may be classified into a personal identity digital certificate, an enterprise or institutional identity digital certificate, a payment gateway digital certificate, a server digital certificate, a secure email digital certificate, a personal code signature digital certificate, etc. The digital certificate at least indicates a digital certificate owner public key, digital certificate owner information, digital certificate issuer information, issuer signature information, and the like. Therefore, in order to generate a digital certificate corresponding to a user, first user information at least includes information for identifying digital certificate owners such as user public keys, user names or user identifiers. In addition, the first user information may further include other information that the user needs to display in the digital certificate.

It is understandable that, before the digital certificate generation request sent by the user is received, the method further includes: generating an asymmetric key pair for each blockchain node, wherein the asymmetric key pair indicates a public key component and a private key component, corresponding to the blockchain node; aggregating the public key components of one or more blockchain nodes on the basis of the signature generation algorithm, so as to generate the same global public key for each of the blockchain nodes; and calculating one blockchain node from the blockchain nodes, so as to write the global public key into a genesis block of the blockchain, and to allow other blockchain nodes, which know the global public key, to verify the global public key in the genesis block.

In order to prevent the leakage of private keys for the issuance of digital certificates, so as to improve the security of the digital certificates, the solution that performs multi-party joint management on the basis of a blockchain is provided in this embodiment. In the solution, management member of each party all has one blockchain node. For example, in a blockchain initialization step, an asymmetric key pair is generated for each blockchain node by using an encryptor. The public key component in the asymmetric key pair may be exchanged by means of offline communication, such as mails and letters, agreed upon by management members, and the respective public key components may also be written into the genesis block of the blockchain. Therefore, the public key components may be mutually known between the management members or the blockchain nodes corresponding to the management members, such that each blockchain node may aggregate to obtain a global public key by using the signature generation algorithm. The signature generation algorithm that may be used includes, but is not limited to, a Schnorr signature algorithm, a BLS signature algorithm, etc. However, in order to decrease the size of the generated global public key, the BLS signature algorithm is preferred in this embodiment.

For example, there are total 10 management members participating in CA collaborative management, each management member corresponds to one blockchain node, such that the number of the management members when the global public key is generated may be determined according to actual requirements, such as 10, 9, 8, 7, 6, 5, and the like. That is to say, during the process of aggregating the public key components of the blockchain nodes to generate the global public key, it is not necessary that all the blockchain nodes participate, but also some of the blockchain nodes may participate, such that it is ensured that the global public key may still be generated to realize CA collaborative management when the management members are offline or there is an error in some of the blockchain nodes.

Further, for example, the determined blockchain nodes participating in generation of the global public key respectively are BLOCK1, BLOCK2, BLOCK3, and BLOCK4, and the corresponding public key components respectively are Puc1, Puc2, Puc3, and Puc4, since each blockchain node knows the public key components of other blockchain nodes, any one of BLOCK1, BLOCK2, BLOCK3, and BLOCK4 may aggregate the public key components Puc1, Puc2, Puc3, and Puc4 by using the BLS signature algorithm, so as to respectively generate the same global public key.

Based on this, one blockchain node (using BLOCK1 as an example) may be determined, by means of a locking mechanism, from the blockchain nodes BLOCK1, BLOCK2, BLOCK3, and BLOCK4 aggregating the global public key, so as to enable BLOCK1 to write the aggregated global public key into the genesis block of the blockchain, such that other blockchain nodes, which are BLOCK2, BLOCK3, and BLOCK4, having the global public key may verify the global public key in the genesis block, that is, determine whether the aggregated global public key is the same as the global public key in the genesis block. When and only when the verification of the global public key is passed, that is, when the global public key aggregated by the blockchain nodes is the same as the global public key in the genesis block, all the blockchain nodes on the blockchain admit the validity of the global public key, and subsequent steps of generating the digital certificate is able to be continued.

In addition, in order to further ensure the reliability of the global public key, the authenticity and validity of the source of the global public key are ensured by means of issuing a root certificate and writing the root certificate into the genesis block. For example, preset root certificate information is broadcast to the blockchain when the verification of the global public key is passed, to enable the blockchain node, which knows the global public key, to sign the preset root certificate information by using the private key component of the blockchain node, so as to generate third signature information; and the third signature information is aggregated to generate a root certificate corresponding to the global public key, and the root certificate is written into the genesis block of the blockchain. The root certificate indicates the global public key, root certificate issuer information, and root certificate issuer signature information. Therefore, in order to generate the root certificate corresponding to the global public key, the preset root certificate information at least includes information of the management members participating in issuance of the root certificate, such as the global public key, names of the blockchain nodes, or identifiers of the blockchain nodes, and may further include other information that needs to be displayed and agreed upon by multi-party management members.

At S502, the first user information is broadcast to a blockchain, to enable a blockchain node, which knows a global public key, to sign the first user information by using a private key component of the blockchain node, so as to generate first signature information. The global public key is generated by means of aggregating public key components of blockchain nodes on the basis of a signature generation algorithm.

That is to say, one or more blockchain nodes need to participate together when the global public key is generated through aggregation, and the one or more blockchain nodes also need to participate in generation of the first signature information together when the digital certificate is issued. For example, the first user information merely indicates a user public key and a user name, after the first user information is broadcast to the blockchain, each node having the global public key on the blockchain may calculate, by means of a hash algorithm, hash values corresponding to the user public key and the user name, and encrypt the hash values by using own private key components, so as to generate the first signature information. Based on this, the first signature information generated by each blockchain node having the global public key is collected; and all pieces of the first signature information are aggregated to generate signature information in the digital certificate, so as to generate the digital certificate. It is understandable that, the aggregated signature information corresponds to the global public key, which is aggregated above. That is to say, the signature information in the digital certificate may be verified by using the global public key, so as to determine the validity and legality of the digital certificate.

At S503, the first signature information is aggregated to generate a digital certificate for the user.

It is understandable that, when and only when the first signature information of all the blockchain nodes participating in generation of the global public keys is aggregated, the signature information corresponding to the global public keys is generated, so as to successfully generate the digital certificate. Therefore, by means of dividing the private key for issuing the digital certificate into the private key components of the blockchain nodes respectively for control, joint control of the multi-party management members over the private key for issuing the digital certificate is realized, thereby avoiding private key leakage. Meanwhile, uncontrollable external risks caused by random issuance of the digital certificates by any management member according to own needs are avoided.

Based on this, the digital certificate is uploaded to the blockchain, so as to allow the blockchain node or a smart contract to verify the digital certificate according to the global public key or a root certificate indicating the global public key. For example, the digital certificate is verified by using the smart contract, first, the smart contract on a chain may acquire the global public key or the root certificate from the genesis block of the blockchain, to decrypt the signature information in the digital certificate by using the global public key, so as to acquire the hash value; next, a hashing operation is performed, by using the hash algorithm, on plaintext information other than the signature information indicated in the digital certificate, so as to generate a new hash value; and based on this, whether the newly-generated hash value is the same as the hash value acquired after the signature information is decrypted by using the global public key is determined, if so, the verification of the digital certificate is passed, that is, the digital certificate is legal, and if no, the verification of the digital certificate fails, that is, the digital certificate is illegal.

It is understandable that, after the digital certificate is generated, the revocation of the digital certificate is also involved during the whole lifecycle of the digital certificate. Based on this, the method further includes: receiving a digital certificate revocation request sent by the user, wherein the digital certificate revocation request indicates second user information of the user and a digital certificate to be revoked; broadcasting the second user information to the blockchain, to enable the blockchain node, which knows the global public key, to sign the second user information by using the private key component of the blockchain node, so as to generate second signature information; and aggregating the second signature information to generate a revocation certificate corresponding to the digital certificate to be revoked.

For example, the second user information merely includes a user name and a user public key, after the second user information is broadcast to the blockchain, one or more blockchain nodes participating in generation of the digital certificate to be revoked are notified, so as to enable each of the blockchain nodes to perform the hashing operation on the user name and the user public key by using the hash algorithm, so as to generate the hash value, and then encrypt the hash value by using own private key components, so as to generate the second signature information. Based on this, all pieces of the second signature information are collected and aggregated to generate signature information indicated in the revocation certificate. In addition, the revocation certificate also indicates information such as the user name and the user public key. It is understandable that, the hashing operation may also be performed on information, such as the user name, the user public key, and the serial number of a digital certificate to be revoked, by using the hash algorithm according to actual requirements, so as to generate the hash value and generate the second signature information. Therefore, joint control of digital certificate revocation is implemented by means of joint participation of the one or more blockchain nodes participating in generation of the digital certificate to be revoked, such that the reliability of the digital certificate is improved.

Based on this, the revocation certificate is uploaded to the blockchain, so as to allow the blockchain node or a smart contract to verify the revocation certificate according to the global public key or a root certificate indicating the global public key. For example, the revocation certificate is verified by using the smart contract on the chain, first, the global public key or the root certificate indicating the global public key is acquired from the blockchain, to decrypt the signature information in the revocation certificate by using the global public key, so as to acquire the hash value; then, the hashing operation is performed, by using the hash algorithm, on the plaintext information other than the signature information indicated in the revocation certificate, so as to generate a new hash value; and based on this, whether the newly-generated hash value is the same as the hash value acquired after the signature information is decrypted by using the global public key is determined, if so, the verification of the revocation certificate is passed, that is, the digital certificate corresponding to the revocation certificate is no longer valid, and if no, the verification of the revocation certificate fails, that is, the source of the revocation certificate is unreliable, such that whether the corresponding digital certificate is revoked is unable to be determined by using the revocation certificate.

Based on this, in order to determine whether the digital certificate is still valid to determine the validity of the identity of a digital certificate owner, a digital certificate verification party may query, from the blockchain, whether the digital certificate has the corresponding revocation certificate; if no, it indicates that the digital certificate has not been revoked yet; and if so, it indicates that the digital certificate has been revoked. Further, in order to further guaranteed the validity of the revocation certificate stored on the blockchain, the verification party may perform the above verification on the validity of the revocation certificate on the basis of the known global public key.

Based on the above embodiments, the private key for issuing the digital certificate is divided into the private key components corresponding to the blockchain nodes by means of using the corresponding private key components to sign the first user information by a plurality of blockchain nodes, so as to generate the first signature information, and aggregating the first signature information by using the signature generation algorithm, so as to generate the digital certificates, such that joint control of a plurality of management members over the private keys for issuing the digital certificates is realized, thereby avoiding private key leakage. In addition, when and only when the first signature information, which is generated by all the blockchain nodes participating in generation of the global public keys, is aggregated, a new digital certificate can be successfully generated, such that uncontrollable external risks caused by random issuance of the digital certificates by any management member according to own needs are avoided. Correspondingly, when and only when the second signature information, which is generated by all the blockchain nodes participating in generation of the global public keys, is aggregated, the digital certificate can be successfully revoked, such that the validity and reliability of the digital certificate are further guaranteed.

Referring to FIG. 6, on the basis of the above embodiments related to FIG. 5, an embodiment of the present application provides another method for managing a digital certificate. The method may specifically include the following steps.

At S601, a digital certificate generation request sent by a user is received, wherein the digital certificate generation request indicates first user information of the user. The first user information includes, but is not limited to, information such as a user public key, a user name, or a user identifier.

At S602, the first user information is broadcast to a blockchain, to enable a blockchain node, which knows a global public key, to sign the first user information by using a private key component of the blockchain node, so as to generate first signature information. The global public key is generated by means of aggregating public key components of blockchain nodes on the basis of a signature generation algorithm.

At S603, the first signature information is aggregated to generate a digital certificate for the user.

It is understandable that, the signature information in the digital certificate corresponds to the global public key. That is to say, the signature information in the digital certificate may be verified by using the global public key, so as to realize the verification of the digital certificate. In addition, the digital certificate may further be uploaded to the blockchain, such that a digital certificate verification party who knows the global public key may verify the legality of the digital certificate according to the global public key.

At S604, a digital certificate revocation request sent by a user is received, wherein the digital certificate revocation request indicates second user information of the user and a digital certificate to be revoked.

At S605, the second user information is broadcast to the blockchain, to enable the blockchain node, which knows the global public key, to sign the second user information by using the private key component of the blockchain node, so as to generate second signature information.

At S606, the second signature information is aggregated to generate a revocation certificate corresponding to the digital certificate to be revoked.

Based on this, the revocation certificate may be uploaded to the blockchain, so as to enable a verification party of the digital certificate to be revoked to determine, according to the revocation certificate acquired from the blockchain, the validity of the digital certificate to be revoked.

Therefore, by means of dividing the private key for issuing the digital certificate into the private key components of the blockchain nodes, joint control over the private key for issuing the digital certificate during digital certificate issuance and digital certificate revocation is realized. In addition, by means of using, by the blockchain nodes, the respective private keys to respectively generate the signature information through signature, and aggregating the same to generate the digital certificate or the revocation certificate, the presence of a digital certificate issuance private key is avoided, and the problem of leakage of the current digital certificate issuance private key is solved, thereby improving the security and reliability of the digital certificate. Meanwhile, constraints among the multi-party management members corresponding to the blockchain nodes are achieved by collaboratively participating in issuance or revocation of the digital certificate, such that the abuse of the digital certificate issuance private key caused by wrong decision-making or mismanagement of one party is avoided.

Referring to FIG. 7, on the basis of the above embodiments related to FIG. 5 or FIG. 6, an embodiment of the present application provides still another method for managing a digital certificate. The method may include the following steps.

At S701, an asymmetric key pair is generated for each blockchain node, wherein the asymmetric key pair indicates a public key component and a private key component, corresponding to the blockchain node.

At S702, the public key components of one or more blockchain nodes are aggregated on the basis of the signature generation algorithm, so as to generate the same global public key for each of the blockchain nodes.

At S703, one blockchain node is calculated from the blockchain nodes, so as to write the global public key into a genesis block of the blockchain, and to allow other blockchain nodes, which know the global public key, to verify the global public key in the genesis block.

It is understandable that, when and only when other blockchain nodes knowing the global public key or participating in generation of the global public key pass the verification of the global public key in the genesis block, the blockchain nodes admit the legality and validity of the global public key, such that the blockchain node knowing the global public key is able to further issue or revoke the digital certificate. It is to be noted that, since there may be calculation errors in the blockchain node participating in generation of the global public key, the number of the blockchain nodes verifying the global public key may be adjusted according to actual requirements. For example, the number of other blockchain nodes knowing the global public key is 10, it may be determined that, when at least 5 of the 10 blockchain nodes pass the verification of the global public key, the validity of the global public key is admitted.

At S704, preset root certificate information is broadcast to the blockchain when the verification of the global public key is passed, to enable the blockchain node, which knows the global public key, to sign the preset root certificate information by using the private key component of the blockchain node, so as to generate third signature information.

At S705, the third signature information is aggregated to generate a root certificate corresponding to the global public key, and the root certificate is written into the genesis block of the blockchain.

At S706, a digital certificate generation request sent by a user is received, wherein the digital certificate generation request indicates first user information of the user.

At S707, the first user information is broadcast to a blockchain, to enable a blockchain node, which knows a global public key, to sign the first user information by using a private key component of the blockchain node, so as to generate first signature information. The global public key is generated by means of aggregating public key components of blockchain nodes on the basis of a signature generation algorithm.

At S708, the first signature information is aggregated to generate a digital certificate for the user.

Referring to FIG. 8, on the basis of the above embodiments, an embodiment of the present application provides an apparatus for managing a digital certificate 800 from a second aspect. The apparatus includes a request receiving module 802, an information sending module 803, and a signature aggregation module 804.

The request receiving module 802 is configured to receive a digital certificate generation request sent by a user, wherein the digital certificate generation request indicates first user information of the user.

The information sending module 803 is configured to broadcast the first user information to a blockchain, to enable a blockchain node, which knows a global public key, to sign the first user information by using a private key component of the blockchain node, so as to generate first signature information, wherein the global public key is generated by means of aggregating public key components of the blockchain node on the basis of a signature generation algorithm.

The signature aggregation module 804 is configured to aggregate the first signature information to generate a digital certificate for the user.

In an optional implementation, the apparatus further includes a certificate uploading module 805.

The certificate uploading module 805 is configured to upload the digital certificate to the blockchain, so as to allow the blockchain node or a smart contract to verify the digital certificate according to the global public key or a root certificate indicating the global public key.

In an optional implementation, the apparatus further includes a certificate revocation module 806. The certificate revocation module 806 is configured to, receive a digital certificate revocation request sent by the user, wherein the digital certificate revocation request indicates second user information of the user and a digital certificate to be revoked;

broadcast the second user information to the blockchain, to enable the blockchain node, which knows the global public key, to sign the second user information by using the private key component of the blockchain node, so as to generate second signature information;

aggregate the second signature information to generate a revocation certificate corresponding to the digital certificate to be revoked.

In an optional implementation, the certificate revocation module 806 is further configured to, upload the revocation certificate to the blockchain, so as to allow the blockchain node or a smart contract to verify the revocation certificate according to the global public key or a root certificate indicating the global public key.

In an optional implementation, the apparatus further includes a global public key generation module 801. The global public key generation module 801 is configured to, before the digital certificate generation request sent by the user is received, generate an asymmetric key pair for each blockchain node, wherein the asymmetric key pair indicates the public key component and the private key component, which correspond to the blockchain node;

aggregate the public key components of one or more blockchain nodes on the basis of the signature generation algorithm, so as to generate the same global public key for each of the blockchain nodes;

calculate one blockchain node from the blockchain nodes, so as to write the global public key into a genesis block of the blockchain, and to allow other blockchain nodes, which know the global public key, to verify the global public key in the genesis block.

In an optional implementation, the global public key generation module 801 is further configured to broadcast preset root certificate information to the blockchain when the verification of the global public key is passed, to enable the blockchain node, which knows the global public key, to sign the preset root certificate information by using the private key component of the blockchain node, so as to generate third signature information;

aggregate the third signature information to generate a root certificate corresponding to the global public key, and write the root certificate into the genesis block of the blockchain.

In an optional implementation, the global public key generation module 801 is further configured to write the public key component of the blockchain node into a genesis block of the blockchain.

In an optional implementation, the signature generation algorithm is a BLS signature algorithm.

FIG. 9 is a schematic diagram of main processes of a method for managing a digital certificate according to a third aspect of an embodiment of the present application. As shown in FIG. 9, the method for managing the digital certificate may include the following steps.

At S901, a digital certificate generation request sent by a user is received, wherein the digital certificate generation request indicates first user information of the user.

A digital certificate is issued by a CA to mark, and the digital certificate is a character string of identity information of each part during communication in Internet communication. The digital certificate is commonly used in commercial websites such as B2B, B2C, P2P and O2O, an information website including private information, and service websites such as government agencies and financial institutions, so as to improve the security of a network. According to different users, common digital certificates may be classified into a personal identity digital certificate, an enterprise or institutional identity digital certificate, a payment gateway digital certificate, a server digital certificate, a secure email digital certificate, a personal code signature digital certificate, etc. The digital certificate at least indicates a digital certificate owner public key, digital certificate owner information, digital certificate issuer information, issuer signature information, and the like. Therefore, in order to generate a digital certificate corresponding to a user, first user information at least includes information for identifying digital certificate owners such as user public keys, user names or user identifiers. In addition, the first user information may further include other information that the user needs to display in the digital certificate.

At S902, the first user information is broadcast to the blockchain, to enable any one or more blockchain nodes on the blockchain to sign the first user information by using a corresponding private key component, so as to generate first signature information.

That is to say, after the first user information is broadcast to the blockchain, any blockchain node that may obtain the first user information may generate the first signature information on the basis of the first user information, so as to generate the digital certificate for the user by aggregating all pieces of the first signature information. Therefore, the randomness of the blockchain nodes participating in generation of the digital certificate is guaranteed, thereby improving the security of digital certificate issuance.

It is understandable that, in order to ensure that any one or more blockchain nodes on the blockchain may randomly participate in generation of the digital certificate, and may acquire, from the genesis block, the corresponding aggregated public key to verify the validity of the digital certificate. For example, before the digital certificate generation request sent by the user is received, one or more aggregated public keys are written into a genesis block of the blockchain. The aggregated public key is generated by means of aggregating the public key components of any one or more blockchain nodes on the blockchain on the basis of a signature generation algorithm. The signature generation algorithm includes, but is not limited to, a Schnorr signature algorithm, a BLS signature algorithm, etc.

As at least one alternative embodiment, before the digital certificate generation request sent by the user is received, an asymmetric key pair needs to be generated for each blockchain node by using an encryptor. The asymmetric key pair indicates the public key component and the private key component, which correspond to the blockchain node; and nodes on the blockchain may know the public key component of each blockchain node by means of writing the public key component into the genesis block or by means of agreed mail or offline exchange. Based on this, on the basis of the signature generation algorithm such as the Schnorr signature algorithm and the BLS signature algorithm, the public key components corresponding to any one or more blockchain nodes on the blockchain are aggregated, so as to generate one or more aggregated public keys and write the same into the genesis block of the blockchain.

For example, there are total 5 blockchain nodes on the blockchain, and the 5 blockchain nodes respectively are Node 1, Node 2, Node 3, Node 4, and Node 5, at an aggregated public key generation phase, the public key components corresponding to a plurality of any nodes in the 5 nodes may be randomly aggregated, so as to generate the aggregated public key. For example, the public key components corresponding to the Node 1, the Node 2, and the Node 3 are aggregated to generate the aggregated public key, and for another example, the public key components corresponding to the Node 1, the Node 2, the Node 3, and the Node 4 are aggregated to generate the aggregated public key. Therefore, a plurality of aggregated public keys may be generated. More specifically, if not less than 3 blockchain nodes participating in generation of the aggregated public key are required in an actual situation in order to jointly issue or manage the digital certificate by a plurality of blockchain nodes, 16 aggregated public keys may be totally generated.

Based on this, the generated aggregated public keys may be written into the genesis block of the blockchain, so as to allow the blockchain nodes or a smart contract to be able to acquire, from the genesis block, the corresponding aggregated public key to verify the digital certificate after acquiring the digital certificate, so as to guarantee the validity and reliability of the digital certificate. For example, in order to prevent the plurality of blockchain nodes participating in generation of the aggregated public key from repeatedly writing the aggregated public key, one blockchain node is calculated from the plurality of blockchain nodes participating in generation of the aggregated public key by using a locking mechanism, so as to enable the blockchain node to write the aggregated public key into the genesis block of the blockchain. Meanwhile, other blockchain nodes participating in generation of the aggregated public key may verify whether the aggregated public key written into the genesis block is the same as the self-generated aggregated public key, so as to guarantee the correctness of the aggregated public key written into the genesis block. When and only when other blockchain nodes participating in generation of the aggregated public key pass the verification of the aggregated public key, the blockchain nodes admit the validity of the aggregated public key in the genesis block, and subsequent digital certificate generation and revocation are able to be continued.

At S903, the first signature information is aggregated to generate a digital certificate for the user, wherein the digital certificate indicates identifier information of the one or more blockchain nodes.

The identifier information of the blockchain node refers to information such as the serial number of the blockchain node, the public key component corresponding to the blockchain node, and the name of the blockchain node, that may be used for distinguishing the blockchain nodes. The identifier information of the one or more blockchain nodes indicated by the digital certificate refers to information of the blockchain nodes participating in generation of the digital certificate. Therefore, when any blockchain node on the blockchain may participate or not participate in generation of the digital certificate, a digital certificate verification party may determine one or more blockchain nodes specifically participating in generation of the digital certificate according to a blockchain node identifier indicated by the digital certificate, so as to acquire the aggregated public key, which is generated by the public key components corresponding to the one or more blockchain nodes, and verify the validity or source of the digital certificate by using the aggregated public key.

In an optional implementation, the method further includes: uploading the digital certificate to the blockchain, so as to allow the blockchain node or a smart contract to acquire the corresponding aggregated public key from the genesis block according to the identifier information of the one or more blockchain nodes indicated by the digital certificate, and verify the digital certificate by using the aggregated public key.

For example, blockchain node information indicated by the digital certificate is the serial numbers 1, 2 and 3 of the blockchain nodes, it may be determined that the blockchain nodes participating in generation of the digital certificate are the Node 1, the Node 2, and the Node 3, such that the blockchain node or the smart contract that needs to verify the digital certificate may acquire, from the genesis block, the aggregated public key, which is written in advance and generated by the public key components of the Node 1, the Node 2, and the Node 3, and then the digital certificate is able to be verified on the basis of the aggregated public key. For example, the digital certificate is verified by using the smart contract, first, the smart contract on a chain may decrypt the signature information in the digital certificate by using the aggregated public key after acquiring the aggregated public key from the genesis block of the blockchain, so as to acquire a hash value; next, a hashing operation is performed, by using the hash algorithm, on plaintext information other than the signature information indicated in the digital certificate, so as to generate a new hash value; and based on this, whether the newly-generated hash value is the same as the hash value acquired after the signature information is decrypted by using the aggregated public key is determined, if so, the verification of the digital certificate is passed, that is, the digital certificate is legal, and if no, the verification of the digital certificate fails, that is, the digital certificate is illegal.

In an optional implementation, the method further includes: receiving a digital certificate revocation request sent by the user, wherein the digital certificate revocation request indicates second user information of the user and a digital certificate to be revoked; broadcasting the second user information to the blockchain, to enable one or more blockchain nodes, which correspond to the identifier information indicated by the digital certificate to be revoked, on the blockchain to sign the second user information by using the corresponding private key component, so as to generate second signature information; and aggregating the second signature information to generate a revocation certificate corresponding to the digital certificate to be revoked. The revocation certificate indicates the identifier information of the one or more blockchain nodes.

It is understandable that, after the digital certificate is generated, the revocation of the digital certificate is also involved during the whole lifecycle of the digital certificate. For example, when the digital certificate revocation request sent by the user is received, the second user information is broadcast to the blockchain, so as to enable the blockchain nodes indicated by the digital certificate, that is, the blockchain nodes participating in generation of the digital certificate, to respectively perform the hashing operation on the second user information by using the hash algorithm, so as to generate the hash value, and then encrypt the hash value by using own private key components, so as to generate the second signature information, and then the second signature information is aggregated to generate the revocation certificate corresponding to the digital certificate. It is understandable that, the revocation certificate also indicates identifier information of the blockchain node participating in generation of the revocation certificate, such that the specific blockchain node participating in generation of the revocation certificate is determined when any blockchain node on the blockchain may participate or not participate in generation of the revocation certificate. Therefore, other nodes on the blockchain may acquire, from the genesis block according to the identifier information of the blockchain node that is indicated by the revocation certificate, the aggregated public key, which is generated by the public key components of the blockchain node participating in generation of the revocation certificate, so as to verify the validity of the revocation certificate.

In an optional implementation, the method further includes: uploading the revocation certificate to the blockchain, so as to allow the blockchain node or a smart contract to acquire the corresponding aggregated public key from the genesis block according to the identifier information of the one or more blockchain nodes that is indicated by the revocation certificate, and verify the revocation certificate by using the aggregated public key.

For example, blockchain node information indicated by the revocation certificate is the serial numbers 1, 2 and 3 of the blockchain nodes, it may be determined that the blockchain nodes participating in generation of the revocation certificate are the Node 1, the Node 2, and the Node 3, such that the blockchain node or the smart contract that needs to verify the revocation certificate may acquire, from the genesis block, the aggregated public key, which is written in advance and generated by the public key components of the Node 1, the Node 2, and the Node 3, and then the digital certificate is able to be verified on the basis of the aggregated public key. More specifically, for example, the revocation certificate is verified by using the smart contract on the chain, first, the aggregated public key, which is generated by the public key components of the Node 1, the Node 2, and the Node 3, is acquired from the blockchain, to decrypt the signature information in the revocation certificate by using the aggregated public key, so as to acquire the hash value; then, the hashing operation is performed, by using the hash algorithm, on the plaintext information other than the signature information indicated in the revocation certificate, so as to generate a new hash value; and based on this, whether the newly-generated hash value is the same as the hash value acquired after the signature information is decrypted by using the aggregated public key is determined, if so, the verification of the revocation certificate is passed, that is, the digital certificate corresponding to the revocation certificate is no longer valid, and if no, the verification of the revocation certificate fails, that is, the source of the revocation certificate is unreliable, such that whether the corresponding digital certificate is revoked is unable to be determined by using the revocation certificate.

On the basis of the above embodiments, by pre-storing possible aggregated public keys in the genesis block, when the digital certificate generation request sent by the user is received, any one or more blockchain nodes on the blockchain may participate in issuance of the digital certificate. That is, the first user information is signed by using the corresponding private key component, and the first signature information is aggregated to generate the digital certificate. Therefore, by means of dividing the private key for issuing the digital certificate into the private key components of the plurality of blockchain nodes, joint control of the plurality of blockchain nodes over digital certificate issuance is realized. In addition, the attack resistance of the blockchain node issuing the digital certificate is further improved by randomly selecting the blockchain node issuing the digital certificate, thereby improving the security and reliability of the digital certificate.

Referring to FIG. 10, on the basis of the above embodiments related to FIG. 9, the present application provides another method for managing a digital certificate. The method may include the following steps.

At S1001, one or more aggregated public keys are written into a genesis block of the blockchain, wherein the aggregated public key is generated by means of aggregating the private key components of any one or more blockchain nodes on the blockchain on the basis of a signature generation algorithm.

For example, before the digital certificate generation request sent by the user is received, an asymmetric key pair needs to be generated for each blockchain node by using an encryptor. The asymmetric key pair indicates the public key component and the private key component, which correspond to the blockchain node. Nodes on the blockchain may obtain the public key component of each blockchain node by means of writing the public key component into the genesis block or by means of agreed mail or offline exchange. Based on this, on the basis of the signature generation algorithm such as the Schnorr signature algorithm and the BLS signature algorithm, the public key components corresponding to any one or more blockchain nodes on the blockchain are aggregated, so as to generate one or more aggregated public keys and write the same into the genesis block of the blockchain. Therefore, any blockchain node on the blockchain may participate in generation of the digital certificate, and is always able to acquire, from the genesis block, the aggregated public key, which is generated by the public key components of the blockchain nodes participating in generation of the digital certificate, so as to verify the digital certificate.

At S1002, a digital certificate generation request sent by a user is received, wherein the digital certificate generation request indicates first user information of the user.

At S1003, the first user information is broadcast to the blockchain, to enable any one or more blockchain nodes on the blockchain to sign the first user information by using a corresponding private key component, so as to generate first signature information.

At S1004, the first signature information is aggregated to generate a digital certificate for the user, wherein the digital certificate indicates identifier information of the one or more blockchain nodes.

Referring to FIG. 11, on the basis of the above embodiments related to FIG. 9 or FIG. 10, an embodiment of the present application provides another method for managing a digital certificate. The method may include the following steps.

At S1101, a digital certificate generation request sent by a user is received, wherein the digital certificate generation request indicates first user information of the user.

It is understandable that, before the digital certificate generation request sent by the user is received, an asymmetric key pair needs to be generated for each blockchain node by using an encryptor. The asymmetric key pair indicates the public key component and the private key component, which correspond to the blockchain node. Nodes on the blockchain may obtain the public key component of each blockchain node by means of writing the public key component into the genesis block or by means of agreed mail or offline exchange. Based on this, on the basis of the signature generation algorithm such as the Schnorr signature algorithm and the BLS signature algorithm, the public key components corresponding to any one or more blockchain nodes on the blockchain are aggregated, so as to generate one or more aggregated public keys and write the same into the genesis block of the blockchain. Therefore, any blockchain node on the blockchain may participate in generation of the digital certificate, and is always able to acquire, from the genesis block, the aggregated public key, which is generated by the public key components of the blockchain nodes participating in generation of the digital certificate, so as to verify the digital certificate.

At S1102, the first user information is broadcast to the blockchain, to enable any one or more blockchain nodes on the blockchain to sign the first user information by using a corresponding private key component, so as to generate first signature information.

At S1103, the first signature information is aggregated to generate a digital certificate for the user. The digital certificate indicates identifier information of the one or more blockchain nodes.

Based on this, the digital certificate may further be uploaded to the blockchain, so as to allow the blockchain node or a smart contract to acquire the corresponding aggregated public key from the genesis block according to the identifier information of the one or more blockchain nodes indicated by the digital certificate, and verify the digital certificate by using the aggregated public key.

At S1104, a digital certificate revocation request sent by a user is received, wherein the digital certificate revocation request indicates second user information of the user and a digital certificate to be revoked.

At S1105, the second user information is broadcast to the blockchain, to enable one or more blockchain nodes, which correspond to the identifier information indicated by the digital certificate to be revoked, on the blockchain to sign the second user information by using the corresponding private key component, so as to generate second signature information.

At S1106, the second signature information is aggregated to generate a revocation certificate corresponding to the digital certificate to be revoked, wherein the revocation certificate indicates the identifier information of the one or more blockchain nodes.

Based on this, the revocation certificate may further be uploaded to the blockchain, so as to allow the blockchain node or a smart contract to acquire the corresponding aggregated public key from the genesis block according to the identifier information of the one or more blockchain nodes that is indicated by the revocation certificate, and verify the revocation certificate by using the aggregated public key.

Referring to FIG. 12, on the basis of the above embodiments, an embodiment of the present application provides an apparatus for managing a digital certificate 1200 from a third aspect. The apparatus includes a request receiving module 1202, an information broadcasting module 1203, and a signature aggregation module 1204.

The request receiving module 1202 is configured to receive a digital certificate generation request sent by a user, wherein the digital certificate generation request indicates first user information of the user.

The information broadcasting module 1203 is configured to broadcast the first user information to the blockchain, to enable any one or more blockchain nodes on the blockchain to sign the first user information by using a corresponding private key component, so as to generate first signature information.

The signature aggregation module 1204 is configured to aggregate the first signature information to generate a digital certificate for the user, wherein the digital certificate indicates identifier information of the one or more blockchain nodes.

In an optional implementation, the apparatus further includes: an aggregated public key writing module 1201.

The aggregated public key writing module 1201 is configured to, before the digital certificate generation request sent by the user is received, write one or more aggregated public keys into a genesis block of the blockchain. The aggregated public key is generated by means of aggregating the private key components of any one or more blockchain nodes on the blockchain on the basis of a signature generation algorithm.

In an optional implementation, the apparatus further includes a digital certificate uploading module 1205.

The digital certificate uploading module 1205 is configured to upload the digital certificate to the blockchain, so as to allow the blockchain node or a smart contract to acquire the corresponding aggregated public key from the genesis block according to the identifier information of the one or more blockchain nodes indicated by the digital certificate, and verify the digital certificate by using the aggregated public key.

In an optional implementation, the apparatus further includes a digital certificate revocation module 1206.

The digital certificate revocation module 1206 is configured to receive a digital certificate revocation request sent by the user, wherein the digital certificate revocation request indicates second user information of the user and a digital certificate to be revoked.

The second user information is broadcast to the blockchain, to enable one or more blockchain nodes, which correspond to the identifier information indicated by the digital certificate to be revoked, on the blockchain to sign the second user information by using the corresponding private key component, so as to generate second signature information.

The second signature information is aggregated to generate a revocation certificate corresponding to the digital certificate to be revoked, wherein the revocation certificate indicates the identifier information of the one or more blockchain nodes.

In an optional implementation, the digital certificate revocation module 1206 is further configured to, upload the revocation certificate to the blockchain, so as to allow the blockchain node or a smart contract to acquire the corresponding aggregated public key from the genesis block according to the identifier information of the one or more blockchain nodes that is indicated by the revocation certificate, and verify the revocation certificate by using the aggregated public key.

FIG. 13 is a schematic diagram of main processes of a method for managing a digital certificate implemented on the basis of a blockchain according to a fourth aspect of an embodiment of the present application. Each management member participating in digital certificate management corresponds one blockchain node. As shown in FIG. 13, the method for managing the digital certificate may include the following steps.

At S1301, an asymmetric key pair is generated for each blockchain node, wherein the asymmetric key pair indicates a public key component and a private key component, corresponding to the blockchain node.

For example, an asymmetric key pair is generated for each blockchain node by means of using an encryptor. The public key component is configured to generate an aggregated public key on the basis of a signature generation algorithm, so as to verify a digital certificate, which is generated by using the private key component. The private key component is configured to sign user information to generate the digital certificate by aggregating signature information. In addition, when the asymmetric key pair is generated for the blockchain node, the public key components may be mutually exchanged by selecting communication modes such as letters and mails, which are agreed upon by the management member; and the public key component corresponding to a newly-added blockchain node may also be written into a genesis block. Therefore, the blockchain nodes may know the public key components of each other, such that the public key components of a plurality of blockchain nodes are aggregated on the basis of a signature generation algorithm such as a Schnorr signature algorithm and a BLS signature algorithm, so as to generate the aggregated public key.

At S1302, a global key pair is generated, wherein the global key pair indicates a global public key and a global private key, and the global private key is used to sign preset root certificate information, so as to generate a root certificate.

As at least one alternative embodiment, only one global key pair is generated for all the blockchain nodes participating in digital certificate management. For example, the global key pair is generated by a blockchain node encryptor, which is jointly elected by all the blockchain nodes, or the global key pair is generated by a blockchain node encryptor, which is agreed upon in advance by the management member corresponding to the blockchain node, or the global key pair is generated by directly using a preset encryptor.

Further, the root certificate information preset by the management member is signed by using the global private key in the global key pair, so as to generate the corresponding root certificate, and the root certificate indicates the global public key.

At S1303, the private key components of one or more blockchain nodes are aggregated on the basis of a signature generation algorithm, so as to generate one or more aggregated public keys.

For example, Node 1, Node 2, Node 3, and Node 4 are on the blockchain in total, and the aggregated public key is generated by aggregating the public key components of any two, three, or four of the Node 1, the Node 2, the Node 3, and the Node 4 on the basis of a signature generation algorithm. For example, the public key components of the Node 1 and the Node 2 are aggregated to generate one aggregated public key, and the public key components of the Node 1, the Node 2, the Node 3, and the Node 4 are aggregated to generate another aggregated public key. That is to say, when there are a plurality of blockchain nodes, any one of the blockchain nodes may participate or not participate in generation of the aggregated public key, such that there are a plurality of aggregated public keys that may be generated.

It is to be noted that, generally, in order to realize joint control over digital certificate issuance, and avoid the untrustworthy problem of the digital certificate caused by leakage of the public key component or the private key component of a single blockchain node, the aggregated public key is usually aggregated by the public key components of the plurality of blockchain nodes, and the number of the blockchain nodes participating in generation of the aggregated public key is generally not less than half of the total number of the blockchain nodes. However, the aggregated public key may also be generated by only using the public key components of one or few blockchain nodes according to actual requirements.

At S1304, the one or more aggregated public keys, the global public key, and the root certificate are written into a genesis block of a blockchain.

On the basis of the above embodiments, the decoupling between the aggregated public key and the global public key and the root certificate is realized by respectively generating the aggregated public key and the global public key. Further, the blockchain node or the smart contract may acquire, from the genesis block, the corresponding aggregated public key or global public key or the root certificate by means of writing the aggregated public key, the global public key, and the root certificate into the genesis block, so as to verify the digital certificate or the first digital certificate that is temporarily generated during digital certificate issuance. Therefore, during issuance of the digital certificate, a first digital certificate temporarily issued may be first generated on the basis of the private key component, and the first digital certificate is verified by using the aggregated public key, so as to issue the digital certificate for a user by using the global private key when the verification of the first digital certificate is passed. In this way, joint control of a plurality of members over digital certificate issuance is realized, so as to avoid the untrustworthy problem of the digital certificate caused by leakage of the private key component of a single member; and the issued digital certificate may still be verified by using the global public key or the root certificate even in the presence of addition or deletion of the blockchain node.

Referring to FIG. 14, on the basis of the above embodiments related to FIG. 13, an embodiment of the present application provides another method for managing a digital certificate. The method may include the following steps. S1401-S1404 are the same as S1301-1304, such that details are not described herein again.

At S1401, an asymmetric key pair is generated for each blockchain node, wherein the asymmetric key pair indicates a public key component and a private key component, corresponding to the blockchain node.

At S1402, a global key pair is generated, wherein the global key pair indicates a global public key and a global private key. The global private key is used to sign preset root certificate information, so as to generate a root certificate.

At S1403, the private key components of one or more blockchain nodes are aggregated on the basis of a signature generation algorithm, so as to generate one or more aggregated public keys.

At S1404, the one or more aggregated public keys, the global public key, and the root certificate are written into a genesis block of a blockchain.

At S1405, a digital certificate generation request sent by a user is received, wherein the digital certificate generation request indicates first user information.

Since the digital certificate indicates a digital certificate owner, a digital certificate issuer, signature information, and the like, the first user information includes a user name, a user public key, a user identifier, and any other information that needs to be displayed in the digital certificate.

At S1406, the first user information is broadcast to the blockchain, to enable the blockchain node, which participates in generation of the same aggregated public key, on the blockchain to sign the first user information by using the corresponding private key component, so as to generate first signature information.

For example, the blockchain nodes participating in generation of the same aggregated public key on the blockchain may perform a hashing operation on the first user information such as the user name by using a hash algorithm, so as to generate a hash value, and then the hash value is encrypted by using the private key component, so as to generate the first signature information. It is understandable that, since there are a plurality of blockchain nodes participating in generation of the aggregated public key, there are a plurality of pieces of the first signature information generated.

At S1407, the first signature information is aggregated to generate a first digital certificate, wherein the first digital certificate indicates identifier information of the blockchain node.

The identifier information of the blockchain node refers to any information that may distinguish the blockchain nodes, such as the serial number of the blockchain node, the name of the blockchain node, and the public key component of the blockchain node. For example, the first signature information, which is generated by all the blockchain nodes participating in generation of the unified aggregated public key, is collected, and all pieces of the first signature information are aggregated by using the signature generation algorithm such as a Schnorr signature algorithm and a BLS signature algorithm, so as to generate the first digital certificate. Therefore, by means of dividing the private key for issuing the first digital certificate into the private key components of the plurality of blockchain nodes, joint control of the management members corresponding to the blockchain nodes over digital certificate issuance is realized, thereby avoiding the leakage of a digital certificate private key. However, it is to be noted that, the first digital certificate is the digital certificate that is temporarily generated, rather than being directly sent to the user for use, such that the first digital certificate needs to be further verified. When and only when the verification of the first digital certificate is passed, the global private key is further used to generate a second digital certificate for the user that may be used in practice.

At S1408, the first digital certificate is uploaded to the blockchain, so as to allow the blockchain node or a smart contract to acquire the aggregated public key from the genesis block according to the identifier information of the blockchain node that is indicated by the first digital certificate, and verify the first digital certificate by using the aggregated public key.

Since one or more aggregated public keys are written into the genesis block in advance, after the temporarily-generated first digital certificate is uploaded to the blockchain, the blockchain node or smart contract that needs to perform verification on the digital certificate may acquire, from the genesis block, the aggregated public key, which is generated by the public key components corresponding to the blockchain nodes participating in generation of the first digital certificate, and then the first digital certificate is verified by using the aggregated public key, so as to ensure the validity and source reliability of the first digital certificate. Specifically, signature information included in the first digital certificate may be decrypted by using the aggregated public key, so as to acquire the corresponding hash value; and at the same time, the hashing operation is performed on plaintext information included in the first digital certificate, so as to generate a new hash value. Based on this, the newly-generated hash value is compared with the hash value acquired through decryption using the aggregated public key; if the newly-generated hash value is the same as the hash value acquired through decryption using the aggregated public key, the verification of the first digital certificate is passed, such that the second digital certificate that may be used in practice may be continuously generated for the user; and if no, the verification of the first digital certificate fails, such that the second digital certificate that may be used in practice is stopped to be generated for the user. Therefore, although the second digital certificate that may directly be used by the user is not generated on the basis of the private key components of the blockchain nodes, joint control of the blockchain nodes over digital certificate issuance is still realized through the generation and verification of the first digital certificate, such that the security and reliability of the digital certificate are improved.

At S1409, when the verification of the first digital certificate is passed, the first user information is signed by using the global private key in the global key pair, so as to generate a second digital certificate for the user.

For example, the blockchain nodes knowing the global private key may perform the hashing operation on the first user information such as the user name by using the hash algorithm, so as to generate the hash value, to encrypt the hash value by using the global private key, so as to generate the second digital certificate including the signature information for the user; and the second digital certificate may be issued to the user for direct use. It is understandable that, since there is only one global private key, there is only one piece of the generated signature information, such that the second digital certificate may be directly generated on the basis of the signature information without aggregating the signature information.

Based on this, the method further includes: uploading the second digital certificate to the blockchain, so as to allow the blockchain node or the smart contract to acquire the root certificate or the global public key from the genesis block, and verify the second digital certificate by using the global public key or the global public key indicated by the root certificate.

That is to say, during the process of generating the second digital certificate for the user, although it is involved that, by means of temporarily generating the first digital certificate by using the private key component, and verifying the first digital certificate by using the aggregated public key, the second digital certificate that may be directly used by the user is able to be generated by continuously using the global private key, the private key component of the blockchain node does not participate in generation of the second digital certificate. Therefore, when the second digital certificate is verified, the global public key or the root certificate may be directly used. Therefore, joint control of a plurality of members over digital certificate issuance is realized, so as to avoid the untrustworthy problem of the digital certificate caused by leakage of the private key component of a single member; and the issued digital certificate may still be verified by using the global public key or the root certificate even in the presence of addition or deletion of the blockchain node, such that the normal use of the issued digital certificate is guaranteed.

Referring to FIG. 15, on the basis of the above embodiments related to FIG. 13 or FIG. 14, an embodiment of the present application provides still another method for managing a digital certificate. The method may include the following steps. S1501-S1509 are basically the same as S1401-1409, such that details are not described herein again.

At S1501, an asymmetric key pair is generated for each blockchain node, wherein the asymmetric key pair indicates a public key component and a private key component, corresponding to the blockchain node.

At S1502, a global key pair is generated. The global key pair indicates a global public key and a global private key. The global private key is used to sign preset root certificate information, so as to generate a root certificate.

At S1503, the private key components of one or more blockchain nodes are aggregated on the basis of a signature generation algorithm, so as to generate one or more aggregated public keys.

At S1504, the one or more aggregated public keys, the global public key, and the root certificate are written into a genesis block of a blockchain.

At S1505, a digital certificate generation request sent by a user is received, wherein the digital certificate generation request indicates first user information.

At S1506, the first user information is broadcast to the blockchain, to enable the blockchain node, which participates in generation of the same aggregated public key, on the blockchain to sign the first user information by using the corresponding private key component, so as to generate first signature information.

At S1507, the first signature information is aggregated to generate a first digital certificate, wherein the first digital certificate indicates identifier information of the blockchain node.

At S1508, the first digital certificate is uploaded to the blockchain, so as to allow the blockchain node or a smart contract to acquire the aggregated public key from the genesis block according to the identifier information of the blockchain node that is indicated by the first digital certificate, and verify the first digital certificate by using the aggregated public key.

At S1509, when the verification of the first digital certificate is passed, the first user information is signed by using the global private key in the global key pair, so as to generate a second digital certificate for the user.

At S1510, a digital certificate revocation request sent by a user is received, wherein the digital certificate revocation request indicates second user information of the user and a digital certificate to be revoked.

The second user information includes a user name, a user public key, a user identifier, and any other information that needs to be displayed in a revocation certificate.

At S1511, the second user information is broadcast to the blockchain, to enable the blockchain node, which knows the global private key, on the blockchain to sign the second user information by using the global private key, so as to generate a revocation certificate corresponding to the digital certificate to be revoked.

Since the digital certificate that may be revoked by the user is generated on the basis of the global private key, in this embodiment, the global private key is preferably used to directly generate the revocation certificate corresponding to the digital certificate to be revoked. That is, a hashing operation is first performed on the second user information to generate a hash value, and then the hash value is encrypted by using the global private key, so as to generate signature information, such that the revocation certificate including the signature information is generated. However, it is understandable that, the second user information may also be broadcast to the blockchain according to actual situations, to enable a plurality of blockchain nodes participating in generation of a temporary digital certificate of the digital certificate to be revoked to encrypt the second user information by using the corresponding private key component, so as to generate a plurality of pieces of signature information, and the revocation certificate is generated by means of aggregating the plurality of pieces of signature information by using a signature generation algorithm. In addition, the same as the issuance of the digital certificate, the revocation certificate may also be generated by means of successively combining the use of the private key component and the global private key. Therefore, joint control over digital certificate revocation may be realized, and the revocation certificate may also be verified by continuously using the global public key when there are changes in the blockchain nodes, thereby guaranteeing the validity of the revocation certificate.

Based on this, when the revocation certificate is generated by directly using the global private key, the method further includes: uploading the revocation certificate to the blockchain, so as to allow the blockchain node or a smart contract to acquire the root certificate or the global public key from the genesis block, and verify the second digital certificate by using the global public key or the global public key indicated by the root certificate. For example, the revocation certificate is verified by using the smart contract, after the global public key is acquired from the genesis block, the signature information included in the revocation certificate is decrypted by using the global public key, so as to acquire a hash value; meanwhile, a hashing operation is performed on plaintext information included in the revocation certificate, so as to generate a new hash value; based on this, the newly-generated hash value is compared with the hash value acquired after decryption is performed by using the global public key; if the newly-generated hash value is the same as the acquired hash value, the verification of the revocation certificate is passed; and if no, the verification of the revocation certificate fails.

It is understandable that, when the revocation certificate is generated by aggregating the signature information corresponding to the private key components of the plurality of blockchain nodes, the blockchain node or the smart contract may acquire the corresponding aggregated public key from the genesis block, so as to verify the revocation certificate.

On the basis of the above embodiments, by means of directly using the global private key to generate the revocation certificate of the digital certificate to be revoked, the issued digital certificate before the blockchain node is changed may still be normally revoked even if there are changes in the blockchain nodes, such as deletion or addition; and the validity of the revocation certificate may be normally verify, so as to further improve the security and validity of the digital certificate.

Referring to FIG. 16, on the basis of the above embodiments, an embodiment of the present application provides an apparatus for managing a digital certificate 1600 from a fourth aspect. The apparatus includes a key pair generation module 1601, a root certificate generation module 1602, a public key aggregation module 1603, and a public key writing module 1604.

The key pair generation module 1601 is configured to generate an asymmetric key pair for each blockchain node. The asymmetric key pair indicates a public key component and a private key component, corresponding to the blockchain node.

The root certificate generation module 1602 is configured to generate a global key pair, where the global key pair indicates a global public key and a global private key, and use the global private key to sign preset root certificate information, so as to generate a root certificate.

The public key aggregation module 1603 is configured to aggregate private key components of one or more blockchain nodes on the basis of a signature generation algorithm, so as to generate one or more aggregated public keys.

The public key writing module 1604 is configured to write the one or more aggregated public keys, the global public key, and the root certificate into a genesis block of a blockchain.

In an optional implementation, the apparatus further includes a digital certificate generation module 1605.

The digital certificate generation module 1605 is configured to receive a digital certificate generation request sent by a user, wherein the digital certificate generation request indicates first user information;

to broadcast the first user information to the blockchain, to enable the blockchain node, which participates in generation of the same aggregated public key, on the blockchain to sign the first user information by using the corresponding private key component, so as to generate first signature information;

to aggregated the first signature information to generate a first digital certificate, wherein the first digital certificate indicates identifier information of the blockchain node.

In an optional implementation, the apparatus further includes a digital certificate uploading module 1606.

The digital certificate uploading module 1606 is configured to upload the first digital certificate to the blockchain, so as to allow the blockchain node or a smart contract to acquire the aggregated public key from the genesis block according to the identifier information of the blockchain node that is indicated by the first digital certificate, and verify the first digital certificate by using the aggregated public key.

The digital certificate generation module is further configured to, when the verification of the first digital certificate is passed, sign the first user information by using the global private key in the global key pair, so as to generate a second digital certificate for the user.

In an optional implementation, the digital certificate uploading module 1606 is further configured to upload the second digital certificate to the blockchain, so as to allow the blockchain node or the smart contract to acquire the root certificate or the global public key from the genesis block, and verify the second digital certificate by using the global public key or the global public key indicated by the root certificate.

In an optional implementation, the apparatus further includes a digital certificate revocation module 1607. The digital certificate revocation module is configured to receive a digital certificate revocation request sent by the user, wherein the digital certificate revocation request indicates second user information of the user and a digital certificate to be revoked;

to broadcast the second user information to the blockchain, to enable the blockchain node, which knows the global private key, on the blockchain to sign the second user information by using the global private key, so as to generate a revocation certificate corresponding to the digital certificate to be revoked.

In an optional implementation, the apparatus further includes a revocation certificate uploading module 1608. The revocation certificate uploading module 1608 is configured to upload the revocation certificate to the blockchain, so as to allow the blockchain node or a smart contract to acquire the root certificate or the global public key from the genesis block, and verify the second digital certificate by using the global public key or the global public key indicated by the root certificate.

FIG. 17 is a schematic diagram of main processes of a method for managing a digital certificate implemented on the basis of a blockchain according to a fifth aspect of an embodiment of the present application. Each management member participating in digital certificate management corresponds one blockchain node. As shown in FIG. 17, the method for managing the digital certificate may include the following steps.

At S1701, an asymmetric key pair is generated for a newly-added blockchain node when there is one or more newly-added blockchain nodes on a blockchain, wherein the asymmetric key pair indicates a public key component and a private key component, corresponding to the newly-added blockchain node.

That is to say, when a management member participating in digital certificate management is added, a corresponding blockchain node is added for the new management member on a blockchain, and an asymmetric key pair is generated for the newly-added blockchain node by using an encryptor. The asymmetric key pair includes a public key component and a private key component of the blockchain node. The public key component is configured to generate an aggregated public key on the basis of a signature generation algorithm, so as to verify a digital certificate; and the private key component is configured to sign user information to generate the digital certificate by aggregating signature information. It is understandable that, for the blockchain node already present on the blockchain, the corresponding asymmetric key pair has been generated by using the encryptor before, and each blockchain node has known the corresponding public key component of each other.

In addition, when the asymmetric key pair is generated for the blockchain node, the public key components may be mutually exchanged by selecting communication modes such as letters and mails, which are agreed upon by the management member; and the public key component corresponding to a newly-added blockchain node may also be written into a genesis block. Therefore, the blockchain nodes may know the public key components of each other, such that the public key components of a plurality of blockchain nodes are aggregated on the basis of a signature generation algorithm such as a Schnorr signature algorithm and a BLS signature algorithm, so as to generate the aggregated public key.

At S1702, the public key components of the one or more blockchain nodes on the blockchain are aggregated on the basis of a signature generation algorithm, so as to generate one or more first aggregated public keys.

The signature generation algorithm includes, but is not limited to, a Schnorr signature algorithm, a BLS signature algorithm, etc. After the blockchain node is newly added on the blockchain, the public key component of any blockchain node on the blockchain may be aggregated, so as to generate a plurality of first aggregated public keys. For example, there are Node 1, Node 2, Node 3, and Node 4 already on the blockchain, and one blockchain node, which is Node 5, is added, and then the aggregated public key may be generated by aggregating the public key components of any two, three, four, or five of the Node 1, the Node 2, the Node 3, the Node 4, and the Node 5 on the basis of a signature generation algorithm. For example, the public key components of the Node 1, the Node 2 and the Node 3 are aggregated to generate one first aggregated public key, and the public key components of the Node 1, the Node 3, the Node 4, and the Node 5 are aggregated to generate another first aggregated public key. That is to say, the public key component of the newly-added Node 5 participates in generation of one or more first aggregated public keys.

At S1703, one or more second aggregated public keys already present in a genesis block of the blockchain are updated according to the one or more first aggregated public keys, wherein the second aggregated public key is generated by means of aggregating the public key components of the one or more blockchain nodes on the blockchain on the basis of the signature generation algorithm before nodes are newly added to the blockchain.

For example, the step of updating, according to the one or more first aggregated public keys, one or more second aggregated public keys already present in the genesis block of the blockchain includes: aggregating the one or more first aggregated public keys into the genesis block of the blockchain, and reserving the one or more second aggregated public keys already present in the genesis block.

That is to say, while writing the one or more first aggregated public keys in the genesis block, and the one or more second aggregated public keys, which are generated before the blockchain node already present in the genesis block is added, are reserved. For example, there are still the Node 1, the Node 2, the Node 3, and the Node 4 already on the blockchain, and one blockchain node, which is the Node 5, is added, and then the second aggregated public key is generated by aggregating the public key components of any two, three, or four of the Node 1, the Node 2, the Node 3, and the Node 4 on the basis of the signature generation algorithm. For example, the public key components of the Node 1 and the Node 2 are aggregated to generate one second aggregated public key, and the public key components of the Node 1, the Node 2, the Node 3, and the Node 4 are aggregated to generate another second aggregated public key. That is to say, the public key component of the newly-added Node 5 does not participate in generation of one or more second aggregated public keys.

In addition, it is to be noted that, generally, in order to realize joint control over digital certificate issuance or revocation, and avoid the untrustworthy problem of the digital certificate caused by leakage of the public key component or the private key component of a single blockchain node, both the first aggregated public key and the second aggregated public key are usually aggregated by the public key components of the plurality of blockchain nodes, and the number of the blockchain nodes participating in generation of the aggregated public key is generally not less than half of the total number of the blockchain nodes. However, the aggregated public key may also be generated by merely using the public key components of one or few blockchain nodes according to actual requirements.

Based on this, after the aggregated public key in the genesis block is updated, the newly-added blockchain node and other blockchain nodes may all participate in issuance of the digital certificate. For example, the method further includes: receiving a digital certificate generation request sent by a user, wherein the digital certificate generation request indicates first user information of the user; broadcasting the first user information to the blockchain, to enable the blockchain node on the blockchain, which participates in generation of the same first aggregated public key, to sign the first user information by using the corresponding private key component, so as to generate first signature information; and aggregating the first signature information to generate the digital certificate for the user, wherein the digital certificate indicates identifier information of the blockchain node.

The identifier information of the blockchain node refers to any information that may distinguish the blockchain nodes, such as a node serial number corresponding to the blockchain node, a node name, and the public key component. Since the newly-added blockchain node on the blockchain participates in generation of the first aggregated public key, the newly-added blockchain node also directly participates in generation of the digital certificate. Therefore, the private key for issuing the digital certificate is divided into the private key components corresponding to the blockchain nodes on the blockchain, after the nodes are added, by means of using the corresponding private key components to sign the first user information by a plurality of blockchain nodes, so as to generate the first signature information, and aggregating the first signature information by using the signature generation algorithm, so as to generate the digital certificate, such that joint control of a plurality of management members including the management member corresponding to the newly-added blockchain node over the private key for issuing the digital certificate is realized, thereby avoiding private key leakage.

Further, the method further includes: uploading the digital certificate to the blockchain, so as to allow the blockchain node or a smart contract to acquire the first aggregated public key from the genesis block according to the identifier information of the blockchain node that is indicated by the digital certificate, and verify the digital certificate by using the first aggregated public key.

It is understandable that, after the blockchain node is added, the newly-added blockchain node directly participates in issuance of the digital certificate, such that for the newly-generated digital certificate, the blockchain node or the smart contract needs to acquire, from the genesis block, the first aggregated public key, which is generated with the participation of the newly-added blockchain node, so as to verify the validity of the digital certificate. However, it is to be noted that, since the second aggregated public key generated before the blockchain node is added is still reserved in the genesis block, for the digital certificate generated before the blockchain node is added, a digital certificate verification party needs to acquire, from the genesis block, the second aggregated public key, which is generated with the newly-added blockchain node not participating in, so as to verify the validity of the digital certificate. Therefore, even if the blockchain node is added, the normal use of an original digital certificate is guaranteed by reserving an original second aggregated public key in the genesis block.

More specifically, for example, the digital certificate generated after the blockchain node is added is verified by using the smart contract, first, the smart contract on a chain may acquire the first aggregated public key from the genesis block of the blockchain to decrypt the signature information in the digital certificate by using the first aggregated public key, so as to acquire a hash value; next, a hashing operation is performed, by using the hash algorithm, on plaintext information other than the signature information indicated in the digital certificate, so as to generate a new hash value; and based on this, whether the newly-generated hash value is the same as the hash value acquired after the signature information is decrypted by using the first aggregated public key is determined, if so, the verification of the digital certificate is passed, that is, the digital certificate is legal, and if no, the verification of the digital certificate fails, that is, the digital certificate is illegal.

In addition, after the digital certificate is issued, in addition to digital certificate failure due to expiration of validity period, the revocation of the digital certificate is also involved during the whole lifecycle of the digital certificate. For example, the method further includes: receiving a digital certificate revocation request sent by the user, wherein the digital certificate revocation request indicates second user information of the user and a digital certificate to be revoked; broadcasting the second user information to the blockchain, to enable one or more blockchain nodes, which correspond to the identifier information indicated by the digital certificate to be revoked, on the blockchain to sign the second user information by using the corresponding private key component, so as to generate second signature information; and aggregating the second signature information to generate a revocation certificate corresponding to the digital certificate to be revoked. The revocation certificate indicates the identifier information of the one or more blockchain nodes.

Based on this, the method further includes: uploading the revocation certificate to the blockchain, so as to allow the blockchain node or a smart contract to acquire the corresponding first aggregated public key or the second aggregated public key from the genesis block according to the identifier information of the one or more blockchain nodes that is indicated by the revocation certificate, and verify the revocation certificate by using the first aggregated public key or the second aggregated public key.

It is understandable that, when the blockchain node is added, the digital certificate generated before the blockchain node is added may still be used normally, the user may not only revoke the digital certificate which is issued before the blockchain node is added, but also revoke the digital certificate which is issued after the blockchain node is added. The blockchain node participating in revocation of the digital certificate needs to be the same as the blockchain node participating in generation of the digital certificate, such that the revocation certificate is able to be verified by using the aggregated public key, which is generated with the participation of the corresponding blockchain node. Therefore, when the revocation certificate is verified, if the digital certificate generated before the blockchain node is added is involved, the corresponding second aggregated public key needs to be acquired from the genesis block to verify the digital certificate; and if the digital certificate generated after the blockchain node is added is involved, the corresponding first aggregated public key needs to be acquired from the genesis block to verify the digital certificate.

For example, the revocation certificate corresponding to the digital certificate generated before the blockchain node is added is verified by using the smart contract, first, the smart contract on the chain may acquire the second aggregated public key from the genesis block of the blockchain to decrypt the signature information in the revocation certificate by using the second aggregated public key, so as to acquire a hash value; next, a hashing operation is performed, by using the hash algorithm, on plaintext information other than the signature information indicated in the revocation certificate, so as to generate a new hash value; and based on this, whether the newly-generated hash value is the same as the hash value acquired after the signature information is decrypted by using the second aggregated public key is determined, if so, the verification of the revocation certificate is passed, that is, the revocation certificate is legal, and if no, the verification of the revocation certificate fails, that is, the revocation certificate is illegal.

In addition, when there is a newly-added blockchain node, at an aggregated public key updating phase, in order to guarantee the normal use of the digital certificate issued before the blockchain node is added, the second aggregated public key is also reserved while the first aggregated public key is written into the genesis block. With the expiration of the digital certificate issued before the blockchain node is added, the second aggregated public key in the genesis block is no longer used. Therefore, when the digital certificates generated for the user before the blockchain node is added are all invalid, the one or more second aggregated public keys are deleted from the genesis block, so as to save a storage space in the genesis block.

On the basis of the above embodiments, when a management member is added, that is, the blockchain node corresponding to the management member on the blockchain is added, the public key components of the blockchain nodes after the nodes are added are aggregated on the basis of the signature generation algorithm, so as to newly generate one or more first aggregated public keys, and the first aggregated public keys are written into the genesis block, such that the aggregated public keys already present in the genesis block are updated, and joint management of the newly-added blockchain node over digital certificate issuance or revocation is realized. For example, the private key for issuing the digital certificate is divided into the private key components corresponding to the blockchain nodes by means of using the corresponding private key components to sign the first user information by a plurality of blockchain nodes, so as to generate the first signature information, and aggregating the first signature information by using the signature generation algorithm, so as to generate the digital certificate, such that joint control of a plurality of parties over the private key for issuing the digital certificate is realized, thereby avoiding private key leakage. Meanwhile, by reserving the second aggregated public key already present in the genesis block, normal verification of the digital certificate issued before the blockchain node is updated is guaranteed, such that the normal use of the issued digital certificate is realized.

Referring to FIG. 18, on the basis of the above embodiments related to FIG. 17, an embodiment of the present application provides another method for managing a digital certificate. The method may include the following steps.

At S1801, an asymmetric key pair is generated for a newly-added blockchain node when there is one or more newly-added blockchain nodes on a blockchain, wherein the asymmetric key pair indicates a public key component and a private key component, corresponding to the newly-added blockchain node.

At S1802, the public key components of the one or more blockchain nodes on the blockchain are aggregated on the basis of a signature generation algorithm, so as to generate one or more first aggregated public keys.

At S1803, one or more second aggregated public keys already present in a genesis block of the blockchain are updated according to the one or more first aggregated public keys. The second aggregated public key is generated by means of aggregating the public key components of the one or more blockchain nodes on the blockchain on the basis of the signature generation algorithm before nodes are newly added to the blockchain.

For example, the one or more first aggregated public keys are written in the genesis block of the blockchain, and the one or more second aggregated public keys already present in the genesis block are reserved.

At S1804, a digital certificate generation request sent by a user is received, wherein the digital certificate generation request indicates first user information of the user.

At S1805, the first user information is broadcast to the blockchain, to enable the blockchain node on the blockchain, which participates in generation of the same first aggregated public key, to sign the first user information by using the corresponding private key component, so as to generate first signature information.

At S1806, the first signature information is aggregated to generate a digital certificate for the user, wherein the digital certificate indicates identifier information of the blockchain node.

Based on this, the digital certificate may also be uploaded to the blockchain, so as to allow the blockchain node or a smart contract to acquire the first aggregated public key from the genesis block according to the identifier information of the blockchain node that is indicated by the digital certificate, and verify the digital certificate by using the first aggregated public key.

It is understandable that, after the blockchain node is added, the newly-added blockchain node directly participates in issuance of the digital certificate, such that for the newly-generated digital certificate, the blockchain node or the smart contract needs to acquire, from the genesis block, the first aggregated public key, which is generated with the participation of the newly-added blockchain node, so as to verify the validity of the digital certificate. However, it is to be noted that, since the second aggregated public key generated before the blockchain node is added is still reserved in the genesis block, for the digital certificate generated before the blockchain node is added, a digital certificate verification party needs to acquire, from the genesis block, the second aggregated public key, which is generated with the newly-added blockchain node not participating in, so as to verify the validity of the digital certificate. Therefore, even if the blockchain node is added, the normal use of an original digital certificate is guaranteed by reserving an original second aggregated public key in the genesis block.

Referring to FIG. 19, on the basis of the above embodiments related to FIG. 17 or FIG. 18, an embodiment of the present application provides still another method for managing a digital certificate. The method may specifically include the following steps.

At S1901, an asymmetric key pair is generated for a newly-added blockchain node when there is one or more newly-added blockchain nodes on a blockchain, wherein the asymmetric key pair indicates a public key component and a private key component, corresponding to the newly-added blockchain node.

At S1902, the public key components of the one or more blockchain nodes on the blockchain are aggregated on the basis of a signature generation algorithm, so as to generate one or more first aggregated public keys.

At S1903, one or more second aggregated public keys already present in a genesis block of the blockchain are updated according to the one or more first aggregated public keys. The second aggregated public key is generated by means of aggregating the public key components of the one or more blockchain nodes on the blockchain on the basis of the signature generation algorithm before nodes are newly added to the blockchain.

For example, the one or more first aggregated public keys are written in the genesis block of the blockchain, and the one or more second aggregated public keys already present in the genesis block are reserved.

At S1904, a digital certificate generation request sent by a user is received, wherein the digital certificate generation request indicates first user information of the user.

At S1905, the first user information is broadcast to the blockchain, to enable the blockchain node on the blockchain, which participates in generation of the same first aggregated public key, to sign the first user information by using the corresponding private key component, so as to generate first signature information.

At S1906, the first signature information is aggregated to generate a digital certificate for the user. The digital certificate indicates identifier information of the blockchain node.

At S1907, a digital certificate revocation request sent by a user is received, wherein the digital certificate revocation request indicates second user information of the user and a digital certificate to be revoked.

At S1908, the second user information is broadcast to the blockchain, to enable one or more blockchain nodes, which correspond to the identifier information indicated by the digital certificate to be revoked, on the blockchain to sign the second user information by using the corresponding private key component, so as to generate second signature information.

At S1909, the second signature information is aggregated to generate a revocation certificate corresponding to the digital certificate to be revoked, wherein the revocation certificate indicates the identifier information of the one or more blockchain nodes.

Based on this, the method further includes: uploading the revocation certificate to the blockchain, so as to allow the blockchain node or a smart contract to acquire the corresponding first aggregated public key or the second aggregated public key from the genesis block according to the identifier information of the one or more blockchain nodes that is indicated by the revocation certificate, and verify the revocation certificate by using the first aggregated public key or the second aggregated public key.

It is understandable that, when the blockchain node is added, since the digital certificate generated before the blockchain node is added may still be used normally, the user may not only revoke the digital certificate which is issued before the blockchain node is added, but also revoke the digital certificate which is issued after the blockchain node is added. The blockchain node participating in revocation of the digital certificate needs to be the same as the blockchain node participating in generation of the digital certificate, such that the revocation certificate is able to be verified by using the aggregated public key, which is generated with the participation of the corresponding blockchain node. Therefore, when the revocation certificate is verified, if the digital certificate generated before the blockchain node is added is involved, the corresponding second aggregated public key needs to be acquired from the genesis block to verify the digital certificate; and if the digital certificate generated after the blockchain node is added is involved, the corresponding first aggregated public key needs to be acquired from the genesis block to verify the digital certificate.

Referring to FIG. 20, on the basis of the above embodiments, an embodiment of the present application provides an apparatus for managing a digital certificate 2000 from a fifth aspect. The apparatus includes a key pair generation module 2001, a public key aggregation module 2002, and a public key updating module 2003.

The key pair generation module 2001 is configured to generate an asymmetric key pair for a newly-added blockchain node when there is one or more newly-added blockchain nodes on a blockchain. The asymmetric key pair indicates a public key component and a private key component, corresponding to the newly-added blockchain node.

The public key aggregation module 2002 is configured to aggregate the public key components of the one or more blockchain nodes on the blockchain on the basis of a signature generation algorithm, so as to generate one or more first aggregated public keys.

The public key updating module 2003 is configured to update, according to the one or more first aggregated public keys, one or more second aggregated public keys already present in a genesis block of the blockchain. The second aggregated public key is generated by means of aggregating the public key components of the one or more blockchain nodes on the blockchain on the basis of the signature generation algorithm before nodes are newly added to the blockchain.

In an optional implementation, the step of updating, according to the one or more first aggregated public keys, the one or more second aggregated public keys already present in the genesis block of the blockchain includes the following operation.

The one or more first aggregated public keys are written in the genesis block of the blockchain, and the one or more second aggregated public keys already present in the genesis block are reserved.

In an optional implementation, the apparatus further includes a digital certificate generation module 2004.

The digital certificate generation module 2004 is configured to receive a digital certificate generation request sent by a user, wherein the digital certificate generation request indicates first user information of the user;

to broadcast the first user information to the blockchain, to enable the blockchain node on the blockchain, which participates in generation of the same first aggregated public key, to sign the first user information by using the corresponding private key component, so as to generate first signature information;

to aggregate the first signature information to generate a digital certificate for the user, wherein the digital certificate indicates identifier information of the blockchain node.

In an optional implementation, the apparatus further includes a digital certificate uploading module 2005.

The digital certificate uploading module 2005 is configured to upload the digital certificate to the blockchain, so as to allow the blockchain node or a smart contract to acquire the first aggregated public key from the genesis block according to the identifier information of the blockchain node that is indicated by the digital certificate, and verify the digital certificate by using the first aggregated public key.

In an optional implementation, the apparatus further includes a digital certificate revocation module 2006.

The digital certificate revocation module 2006 is configured to receive a digital certificate revocation request sent by the user, wherein the digital certificate revocation request indicates second user information of the user and a digital certificate to be revoked;

to broadcast the second user information to the blockchain, to enable one or more blockchain nodes, which correspond to the identifier information indicated by the digital certificate to be revoked, on the blockchain to sign the second user information by using the corresponding private key component, so as to generate second signature information;

to aggregate the second signature information to generate a revocation certificate corresponding to the digital certificate to be revoked, wherein the revocation certificate indicates the identifier information of the one or more blockchain nodes.

In an optional implementation, the apparatus further includes a revocation certificate uploading module 2007.

The revocation certificate uploading module 2007 is configured to upload the revocation certificate to the blockchain, so as to allow the blockchain node or a smart contract to acquire the corresponding first aggregated public key or the second aggregated public key from the genesis block according to the identifier information of the one or more blockchain nodes that is indicated by the revocation certificate, and verify the revocation certificate by using the first aggregated public key or the second aggregated public key.

In an optional implementation, the public key updating module 2003 is further configured to, when digital certificates generated for the user before the nodes are newly added to the blockchain are all invalid, delete the one or more second aggregated public keys from the genesis block.

In an optional implementation, the key pair generation module 2001 is further configured to, write the public key component corresponding to the newly-added blockchain node into the genesis block.

FIG. 21 is a schematic diagram of main processes of a method for managing a digital certificate implemented on the basis of a blockchain according to a sixth aspect of an embodiment of the present application. Each management member participating in digital certificate management corresponds one blockchain node. As shown in FIG. 21, the method for managing the digital certificate may include the following steps.

At S2101, when one or more blockchain nodes are deleted from a blockchain, public key components of the one or more blockchain nodes on the blockchain are aggregated on the basis of a signature generation algorithm, so as to generate one or more first aggregated public keys.

That is to say, when the management members participating in digital certificate management are reduced, the blockchain node corresponding to the management member is deleted from the blockchain. The signature generation algorithm includes, but is not limited to, a Schnorr signature algorithm, a BLS signature algorithm, etc. It is understandable that, for the blockchain node already present on the blockchain, the corresponding asymmetric key pair has been generated by using the encryptor before, and each blockchain node has known the corresponding public key component of each other. The public key component is configured to generate an aggregated public key on the basis of a signature generation algorithm, so as to verify a digital certificate; and the private key component is configured to sign user information to generate the digital certificate by aggregating signature information.

In addition, when the asymmetric key pair is generated for the blockchain node, the public key components may be mutually exchanged by selecting communication modes such as letters and mails, which are agreed upon by the management member; and the public key component corresponding to a newly-added blockchain node may also be written into a genesis block. Therefore, the blockchain nodes may know the public key components of each other, such that the public key components of a plurality of blockchain nodes are aggregated on the basis of a signature generation algorithm such as a Schnorr signature algorithm and a BLS signature algorithm, so as to generate the aggregated public key.

Further, after the blockchain node is deleted from the blockchain, the public key component of any blockchain node on the blockchain may be aggregated, so as to generate a plurality of first aggregated public keys. For example, there are Node 1, Node 2, Node 3, and Node 4 already on the blockchain, and one of the blockchain nodes, which is Node 4, is deleted, and then the aggregated public key may be generated by aggregating the public key components of any two, or three of the Node 1, the Node 2, and the Node 3 on the basis of a signature generation algorithm. For example, the public key components of the Node 1, the Node 2 and the Node 3 are aggregated to generate one first aggregated public key, and the public key components of the Node 1 and the Node 3 are aggregated to generate another first aggregated public key. That is to say, the public key component of the deleted Node 4 no longer participates in generation of one or more first aggregated public keys.

At S2102, one or more second aggregated public keys already present in a genesis block of the blockchain are updated according to the one or more first aggregated public keys. The second aggregated public key is generated by means of aggregating the public key components of the one or more blockchain nodes on the blockchain on the basis of the signature generation algorithm before the blockchain nodes are deleted.

For example, the step of updating, according to the one or more first aggregated public keys, one or more second aggregated public keys already present in the genesis block of the blockchain includes: writing the one or more first aggregated public keys in the genesis block of the blockchain, and reserving the one or more second aggregated public keys already present in the genesis block.

That is to say, while writing the one or more first aggregated public keys in the genesis block, and the one or more second aggregated public keys, which are generated before the blockchain node already present in the genesis block is deleted, are reserved. For example, there are still the Node 1, the Node 2, the Node 3, and the Node 4 already on the blockchain, and one blockchain node, which is the Node 4, is deleted, and then the second aggregated public key is generated by aggregating the public key components of any two, three, or four of the Node 1, the Node 2, the Node 3, and the Node 4 on the basis of the signature generation algorithm. For example, the public key components of the Node 1 and the Node 2 are aggregated to generate one second aggregated public key, and the public key components of the Node 1, the Node 2, the Node 3, and the Node 4 are aggregated to generate another second aggregated public key. That is to say, the public key component of the deleted Node 4 participates in generation of one or more second aggregated public keys.

It is to be noted that, generally, in order to realize joint control over digital certificate issuance or revocation, and avoid the untrustworthy problem of the digital certificate caused by leakage of the public key component or the private key component of a single blockchain node, both the first aggregated public key and the second aggregated public key are usually aggregated by the public key components of the plurality of blockchain nodes, and the number of the blockchain nodes participating in generation of the aggregated public key is generally not less than half of the total number of the blockchain nodes. However, the aggregated public key may also be generated by merely using the public key components of one or few blockchain nodes according to actual requirements.

Based on this, after the blockchain node is deleted, the remaining blockchain nodes on the blockchain may continue to issue the digital certificate. For example, the method further includes: receiving a digital certificate generation request sent by a user, wherein the digital certificate generation request indicates first user information of the user; broadcasting the first user information to the blockchain, to enable the blockchain node on the blockchain, which participates in generation of the same first aggregated public key, to sign the first user information by using the corresponding private key component, so as to generate first signature information; and aggregating the first signature information to generate the digital certificate for the user, wherein the digital certificate indicates identifier information of the blockchain node.

The identifier information of the blockchain node refers to any information that may distinguish the blockchain nodes, such as a node serial number corresponding to the blockchain node, a node name, and the public key component. Since the blockchain node deleted from the blockchain is unable to continuously participate in generation of the first aggregated public key, the blockchain node is also unable to continuously participate in generation of the digital certificate. Therefore, the private key for issuing the digital certificate is divided into the private key components corresponding to the blockchain nodes on the blockchain, after the nodes are added, by means of using the corresponding private key components to sign the first user information by a plurality of remaining blockchain nodes, so as to generate the first signature information, and aggregating the first signature information by using the signature generation algorithm, so as to generate the digital certificate, such that joint control of a plurality of management members other than the management member corresponding to the deleted blockchain node over the private key for issuing the digital certificate is realized, thereby avoiding private key leakage.

Further, the method further includes: uploading the digital certificate to the blockchain, so as to allow the blockchain node or a smart contract to acquire the first aggregated public key from the genesis block according to the identifier information of the blockchain node that is indicated by the digital certificate, and verify the digital certificate by using the first aggregated public key. It is understandable that, since the blockchain node deleted from the blockchain is unable to continuously participate in generation of the digital certificate, when the digital certificate issued after the blockchain node is deleted is verified, the first aggregated public key, which is generated with the deleted blockchain node not participating in, needs to be acquired from the genesis block, so as to verify the digital certificate.

For example, the digital certificate generated after the blockchain node is deleted is verified by using the smart contract, first, the smart contract on a chain may acquire the first aggregated public key from the genesis block of the blockchain to decrypt the signature information in the digital certificate by using the first aggregated public key, so as to acquire a hash value; next, a hashing operation is performed, by using the hash algorithm, on plaintext information other than the signature information indicated in the digital certificate, so as to generate a new hash value; and based on this, whether the newly-generated hash value is the same as the hash value acquired after the signature information is decrypted by using the first aggregated public key is determined, if so, the verification of the digital certificate is passed, that is, the digital certificate is legal, and if no, the verification of the digital certificate fails, that is, the digital certificate is illegal.

However, it is to be noted that, since the second aggregated public key, which is the aggregated public key generated before the blockchain node is deleted, already present in the genesis block is still reserved when the first aggregated public key is written into the genesis block, for the digital certificate generated before the blockchain node is deleted, verification may still be performed by using the second aggregated public key generated before the blockchain node is deleted, so as to guarantee the normal use of the digital certificate generated before the blockchain node is deleted. Based on this, the blockchain node or the smart contract is also able to acquire the second aggregated public key from the genesis block, so as to verify, by using the second aggregated public key, the digital certificates before the blockchain node is deleted.

In addition, after the digital certificate is issued, in addition to digital certificate failure due to expiration of validity period, the revocation of the digital certificate is also involved during the whole lifecycle of the digital certificate. For example, the method further includes: receiving a digital certificate revocation request sent by the user, wherein the digital certificate revocation request indicates second user information of the user and a digital certificate to be revoked; broadcasting the second user information to the blockchain, to enable one or more blockchain nodes, which correspond to the identifier information indicated by the digital certificate to be revoked, on the blockchain to sign the second user information by using the corresponding private key component, so as to generate second signature information; and aggregating the second signature information to generate a revocation certificate corresponding to the digital certificate to be revoked. The revocation certificate indicates the identifier information of the one or more blockchain nodes. Therefore, joint control of the plurality of management members other than the management member corresponding to the deleted blockchain node over digital certificate revocation is realized, such that the security and reliability of the digital certificate are further improved.

Based on this, the method further includes: uploading the revocation certificate to the blockchain, so as to allow the blockchain node or a smart contract to acquire the corresponding first aggregated public key from the genesis block according to the identifier information of the one or more blockchain nodes that is indicated by the revocation certificate, and verify the revocation certificate by using the first aggregated public key.

More specifically, for example, the revocation certificate corresponding to the digital certificate generated after the blockchain node is deleted is verified by using the smart contract, first, the smart contract on the chain may acquire the first aggregated public key from the genesis block of the blockchain to decrypt the signature information in the revocation certificate by using the first aggregated public key, so as to acquire a hash value; next, a hashing operation is performed, by using the hash algorithm, on plaintext information other than the signature information indicated in the revocation certificate, so as to generate a new hash value; and based on this, whether the newly-generated hash value is the same as the hash value acquired after the signature information is decrypted by using the first aggregated public key is determined, if so, the verification of the revocation certificate is passed, that is, the revocation certificate is legal, and if no, the verification of the revocation certificate fails, that is, the revocation certificate is illegal.

In addition, when there is a deleted blockchain node, at an aggregated public key updating phase, in order to guarantee the normal use of the digital certificate issued before the blockchain node is deleted, the second aggregated public key is also reserved while the first aggregated public key is written into the genesis block. With the expiration of the digital certificate issued before the blockchain node is deleted, the second aggregated public key in the genesis block is no longer used. Therefore, when the digital certificates generated for the user before the blockchain node is deleted are all invalid, the one or more second aggregated public keys are deleted from the genesis block, so as to save a storage space in the genesis block.

Further, when an asymmetric key pair is generated for each blockchain node by using an encryptor, if the public key components are exchanged with each other by means of writing the public key component corresponding to the blockchain node into the genesis block, when the blockchain node is deleted, the public key components corresponding to one or more deleted blockchain nodes also need to be deleted from the genesis block.

On the basis of the above embodiments, when a management member is deleted, that is, the blockchain node corresponding to the management member on the blockchain is deleted, the public key components of the blockchain nodes after the nodes are deleted are aggregated on the basis of the signature generation algorithm, so as to newly generate one or more first aggregated public keys. The first aggregated public keys are written into the genesis block, such that the aggregated public keys already present in the genesis block are updated, and joint management of the blockchain nodes other than the deleted blockchain node over digital certificate issuance or revocation is realized. For example, the private key for issuing the digital certificate is divided into the private key components corresponding to the blockchain nodes by means of using the corresponding private key components to sign the first user information by a plurality of blockchain nodes, so as to generate the first signature information, and aggregating the first signature information by using the signature generation algorithm, so as to generate the digital certificate, such that joint control of a plurality of parties over the private key for issuing the digital certificate is realized, thereby avoiding private key leakage. Meanwhile, by reserving the second aggregated public key already present in the genesis block, normal verification of the digital certificate issued before the blockchain node is updated is guaranteed, such that the normal use of the issued digital certificate is realized.

Referring to FIG. 22, on the basis of the above embodiments related to FIG. 21, an embodiment of the present application provides another method for managing a digital certificate. The method may include the following steps.

At S2201, when one or more blockchain nodes are deleted from a blockchain, public key components of the one or more blockchain nodes on the blockchain are aggregated on the basis of a signature generation algorithm, so as to generate one or more first aggregated public keys.

At S2202, one or more second aggregated public keys already present in a genesis block of the blockchain are updated according to the one or more first aggregated public keys. The second aggregated public key is generated by means of aggregating the public key components of the one or more blockchain nodes on the blockchain on the basis of the signature generation algorithm before the blockchain nodes are deleted.

At S2203, a digital certificate generation request sent by a user is received, wherein the digital certificate generation request indicates first user information of the user.

At S2204, the first user information is broadcast to the blockchain, to enable the blockchain node on the blockchain, which participates in generation of the same first aggregated public key, to sign the first user information by using the corresponding private key component, so as to generate first signature information.

At S2205, the first signature information is aggregated to generate a digital certificate for the user, wherein the digital certificate indicates identifier information of the blockchain node.

Further, the method further includes: uploading the digital certificate to the blockchain, so as to allow the blockchain node or a smart contract to acquire the first aggregated public key from the genesis block according to the identifier information of the blockchain node that is indicated by the digital certificate, and verify the digital certificate by using the first aggregated public key.

In addition, the blockchain node or the smart contract is also able to acquire the second aggregated public key from the genesis block, so as to verify, by using the second aggregated public key, the digital certificates before the blockchain node is deleted.

Referring to FIG. 23, on the basis of the above embodiments related to FIG. 21 or FIG. 22, an embodiment of the present application provides still another method for managing a digital certificate. The method may include the following steps.

At S2301, when one or more blockchain nodes are deleted from a blockchain, public key components of the one or more blockchain nodes on the blockchain are aggregated on the basis of a signature generation algorithm, so as to generate one or more first aggregated public keys.

At S2302, one or more second aggregated public keys already present in a genesis block of the blockchain are updated according to the one or more first aggregated public keys. The second aggregated public key is generated by means of aggregating the public key components of the one or more blockchain nodes on the blockchain on the basis of the signature generation algorithm before the blockchain nodes are deleted.

At S2303, a digital certificate generation request sent by a user is received, wherein the digital certificate generation request indicates first user information of the user.

At S2304, the first user information is broadcast to the blockchain, to enable the blockchain node on the blockchain, which participates in generation of the same first aggregated public key, to sign the first user information by using the corresponding private key component, so as to generate first signature information.

At S2305, the first signature information is aggregated to generate a digital certificate for the user, wherein the digital certificate indicates identifier information of the blockchain node.

Further, the method further includes: uploading the digital certificate to the blockchain, so as to allow the blockchain node or a smart contract to acquire the first aggregated public key from the genesis block according to the identifier information of the blockchain node that is indicated by the digital certificate, and verify the digital certificate by using the first aggregated public key.

In addition, the blockchain node or the smart contract is also able to acquire the second aggregated public key from the genesis block, so as to verify, by using the second aggregated public key, the digital certificates before the blockchain node is deleted.

At S2306, a digital certificate revocation request sent by a user is received, wherein the digital certificate revocation request indicates second user information of the user and a digital certificate to be revoked.

At S2307, the second user information is broadcast to the blockchain, to enable one or more blockchain nodes, which correspond to the identifier information indicated by the digital certificate to be revoked, on the blockchain to sign the second user information by using the corresponding private key component, so as to generate second signature information.

At S2308, the second signature information is aggregated to generate a revocation certificate corresponding to the digital certificate to be revoked, wherein the revocation certificate indicates the identifier information of the one or more blockchain nodes. Therefore, joint control of the blockchain nodes other than the deleted blockchain node over revocation of the newly-generated digital certificate is realized.

Based on this, the method further includes: uploading the revocation certificate to the blockchain, so as to allow the blockchain node or a smart contract to acquire the corresponding first aggregated public key from the genesis block according to the identifier information of the one or more blockchain nodes that is indicated by the revocation certificate, and verify the revocation certificate by using the first aggregated public key.

In addition, when the digital certificates generated for the user before the blockchain node is deleted are all invalid, the one or more second aggregated public keys are deleted from the genesis block, so as to save a storage space in the genesis block.

Referring to FIG. 24, on the basis of the above embodiments, an embodiment of the present application provides an apparatus for managing a digital certificate 2400 from a sixth aspect. The apparatus includes a public key aggregation module 2401 and a public key updating module 2402.

The public key aggregation module 2401 is configured to, when one or more blockchain nodes are deleted from a blockchain, aggregate public key components of the one or more blockchain nodes on the blockchain on the basis of a signature generation algorithm, so as to generate one or more first aggregated public keys.

The public key updating module 2402 is configured to update, according to the one or more first aggregated public keys, one or more second aggregated public keys already present in a genesis block of the blockchain. The second aggregated public key is generated by means of aggregating the public key components of the one or more blockchain nodes on the blockchain on the basis of the signature generation algorithm before the blockchain nodes are deleted.

In an optional implementation, the step of updating, according to the one or more first aggregated public keys, the one or more second aggregated public keys already present in the genesis block of the blockchain includes the following operation.

The one or more first aggregated public keys are written in the genesis block of the blockchain, and the one or more second aggregated public keys already present in the genesis block are reserved.

In an optional implementation, the apparatus further includes a digital certificate generation module 2403.

The digital certificate generation module 2403 is configured to receive a digital certificate generation request sent by a user, wherein the digital certificate generation request indicates first user information of the user;

to broadcast the first user information to the blockchain, to enable the blockchain node on the blockchain, which participates in generation of the same first aggregated public key, to sign the first user information by using the corresponding private key component, so as to generate first signature information;

to aggregate the first signature information to generate a digital certificate for the user, wherein the digital certificate indicates identifier information of the blockchain node.

In an optional implementation, the apparatus further includes a digital certificate uploading module 2404.

The digital certificate uploading module 2404 is configured to upload the digital certificate to the blockchain, so as to allow the blockchain node or a smart contract to acquire the first aggregated public key from the genesis block according to the identifier information of the blockchain node that is indicated by the digital certificate, and verify the digital certificate by using the first aggregated public key.

In an optional implementation, the blockchain node or the smart contract is also able to acquire the second aggregated public key from the genesis block, so as to verify, by using the second aggregated public key, the digital certificates before the blockchain node is deleted.

In an optional implementation, the apparatus further includes a digital certificate revocation module 2405.

The digital certificate revocation module 2405 is configured to receive a digital certificate revocation request sent by the user, wherein the digital certificate revocation request indicates second user information of the user and a digital certificate to be revoked;

to broadcast the second user information to the blockchain, to enable one or more blockchain nodes, which correspond to the identifier information indicated by the digital certificate to be revoked, on the blockchain to sign the second user information by using the corresponding private key component, so as to generate second signature information;

to aggregate the second signature information to generate a revocation certificate corresponding to the digital certificate to be revoked, wherein the revocation certificate indicates the identifier information of the one or more blockchain nodes.

In an optional implementation, the apparatus further includes a revocation certificate uploading module 2406.

The revocation certificate uploading module 2406 is configured to upload the revocation certificate to the blockchain, so as to allow the blockchain node or a smart contract to acquire the corresponding first aggregated public key from the genesis block according to the identifier information of the one or more blockchain nodes that is indicated by the revocation certificate, and verify the revocation certificate by using the first aggregated public key.

In an optional implementation, the public key updating module 2402 is further configured to, when generated digital certificates before the blockchain node is deleted are all invalid, delete the one or more second aggregated public keys from the genesis block.

In an optional implementation, the public key updating module 2402 is further configured to delete the public key components corresponding to the one or more deleted blockchain nodes from the genesis block.

FIG. 25 shows a method for managing a digital certificate according to a seventh aspect of an embodiment of the present application, mainly involving the generation of a collaborative private key. As shown in FIG. 25, the method may include the following steps.

At S2501, a corresponding polynomial is generated for each blockchain node, so as to generate a sub collaborative private key corresponding to the blockchain node according to the polynomial and identifier information of all the blockchain nodes.

Meanwhile, an asymmetric key pair is also generated for each blockchain node by means of an encryptor. The asymmetric key pair indicates a public key component and a private key component of the blockchain node. The identifier information of the blockchain node refers to any information that may distinguish the blockchain nodes, such as a node serial number corresponding to the blockchain node, a node name, and the public key component. In this embodiment, the digest of the public key component is preferably used as the identifier information of the blockchain node.

For example, a polynomial is randomly generated for each blockchain node on the blockchain, with a specific form shown as follows:

$$f_i(x) = a_i * x + b_i$$

Where i is an ith blockchain node on the blockchain; $a_i$ and $b_i$ respectively are polynomial coefficients corresponding to the ith blockchain node, and the values of the polynomials of different blockchain nodes are different; and x is a multi-dimensional vector, a specific dimension indicates the total number of the blockchain nodes on the blockchain, and the specific value of x indicates the identifier information of the blockchain node. Based on this, a corresponding sub collaborative private key may be obtained for each blockchain node through calculation on the basis of the polynomial and the identifier information of all the blockchain nodes.

At S2502, the sub collaborative private key is exchanged between the blockchain nodes, so as to enable each blockchain node to generate the same collaborative private key according to the sub collaborative private keys corresponding to all the blockchain nodes, wherein the collaborative private key is configured to manage a digital certificate.

For example, when the sub collaborative private key is exchanged between the blockchain nodes, the sub collaborative private key is encrypted by using the public key component of the blockchain node receiving the sub collaborative private key, so as to enable the blockchain node to decrypt the sub collaborative private key by using the corresponding private key component after receiving the sub collaborative private key. Therefore, the security of the sub collaborative private key during transmission is guaranteed. For example, the sub collaborative private key SA of the blockchain node A is sent to the blockchain node B, the blockchain node A may use the public key component of the blockchain node B to encrypt the sub collaborative private key SA, and sends the encrypted sub collaborative private key SA to the blockchain node B, such that only the blockchain node B is able to decrypt the sub collaborative private key SA by using the corresponding private key component, thereby guaranteeing the security of the sub collaborative private key SA during transmission.

Based on this, on the basis of the fact that all the blockchain nodes acquire the sub collaborative private keys of other blockchain nodes by means of mutual interaction, the collaborative private key may be generated according to a preset rule, for example, by means of splicing the sub collaborative private keys in order. Therefore, each blockchain node on the blockchain may not only participate in generation of the collaborative private key, so as to improve the difficulty of decryption of the collaborative private key, but also simultaneously participate in management of the collaborative private key.

Based on this, the method further includes: generating a collaborative public key corresponding to the collaborative private key, and writing the collaborative public key into a genesis block of a blockchain. Therefore, when the blockchain node issues the digital certificate by using the collaborative private key, other blockchain nodes or a verification party may acquire the collaborative public key from the genesis block, and verify the validity of the digital certificate by using the collaborative public key.

For example, when a user requests to issue the digital certificate, the method further includes: receiving a digital certificate generation request sent by a user, wherein the digital certificate generation request indicates first user information of the user; broadcasting the first user information to the blockchain, to enable one or more blockchain nodes on the blockchain to sign the first user information by respectively using the collaborative private key, so as to generate first signature information; and collecting the first signature information, and verifying the first signature information, so as to generate a digital certificate for the user according to the first signature information when the verification of the first signature information is passed.

It is understandable that, since the blockchain nodes on the blockchain all participate in generation of the collaborative private key and all know the collaborative private key, when the user requests to issue the digital certificate, each blockchain node on the blockchain may generate the first signature information to issue the digital certificate, such that there are a plurality of pieces of signature information finally collected. Based on this, in order to guarantee the credibility of the first signature information, and joint management of a plurality of blockchain nodes over digital certificate issuance, the collected first signature information needs to be verified.

For example, the step of verifying the first signature information includes: determining whether the number of pieces of the collected first signature information is greater than a first threshold number, and if so, verification is passed; and/or verifying the validity of the first signature information by using the collaborative public key, and determining whether the number of pieces of the valid first signature information is greater than a second threshold number, and if so, verification being passed. That is to say, the number of the blockchain nodes participating in generation of the first signature information may be verified, so as to guarantee joint management of multi-party members over digital certificate issuance, and avoid the untrustworthy problem of the digital certificate caused by the abuse of the collaborative private key to issue the digital certificate by a single member; and the legality of each piece of the first signature information may also be verified, so as to guarantee the legality and security of the blockchain node itself, such that an untrustworthy digital certificate caused when a single or few blockchain nodes are attacked is prevented.

The first threshold number and the second threshold number are integers that are set according to actual situations and are not greater than the total number of the blockchain nodes. For example, the total number of the blockchain nodes is 10, and the first threshold number and the second threshold number respectively are 8 and 5. After the first signature information of the blockchain nodes is collected, whether the number of pieces of the collected first signature information is greater than 8; if so, it indicates that the number of the blockchain nodes participating in generation of the first signature information is greater than 8, that is, most of the blockchain nodes agree with the issuance of the digital certificate, such that the digital certificate has certain credibility, and the digital certificate may be continuously generated; and if no, it indicates that the number of the blockchain nodes participating in generation of the first signature information is less than 8, that is, a significant number of the blockchain nodes disagree with the issuance of the digital certificate, such that there may be a certain risk, and the digital certificate is stopped to be continuously generated. Based on this, when the number of pieces of the first signature information is greater than the first threshold number, the validity of each piece of the collected first signature information may also be verified by continuously using the collaborative public key, to eliminate wrong or invalid first signature information, so as to guarantee the legality and validity of the source of the first signature information. Therefore, whether to issue the digital certificate is determined by determining whether the number of pieces of the valid first signature information is greater than the second threshold number, so as to further guarantee the credibility of the digital certificate.

In an optional implementation, the method further includes: uploading the digital certificate to the blockchain, so as to allow the blockchain node or a smart contract to verify the digital certificate according to the collaborative public key.

For example, the digital certificate generated after the blockchain node is added is verified by using the smart contract, first, the smart contract on the chain may acquire the collaborative public key from the genesis block of the blockchain to decrypt the signature information in the digital certificate by using the collaborative public key, so as to acquire a hash value; next, a hashing operation is performed, by using the hash algorithm, on plaintext information other than the signature information indicated in the digital certificate, so as to generate a new hash value; and based on this, whether the newly-generated hash value is the same as the hash value acquired after the signature information is decrypted by using the collaborative public key is determined, if so, the verification of the digital certificate is passed, that is, the digital certificate is legal, and if no, the verification of the digital certificate fails, that is, the digital certificate is illegal.

In addition, after the digital certificate is generated, the revocation of the digital certificate is also involved during the whole lifecycle of the digital certificate, such that the method further includes: receiving a digital certificate revocation request sent by the user, wherein the digital certificate revocation request indicates second user information of the user and a digital certificate to be revoked; broadcasting the second user information to the blockchain, to enable one or more blockchain nodes on the blockchain to sign the second user information by using the collaborative private key, so as to generate second signature information; and collecting the second signature information, and verifying the second signature information, so as to generate, according to the second signature information, a revocation certificate corresponding to the digital certificate to be revoked when the verification of the second signature information is passed.

It is understandable that, since the blockchain nodes on the blockchain all participate in generation of the collaborative private key and all know the collaborative private key, when the user requests to revoke the digital certificate, each blockchain node on the blockchain may generate the second signature information to revoke the digital certificate, such that there are a plurality of pieces of signature information finally collected. Based on this, in order to guarantee the credibility of the second signature information, and joint management of a plurality of blockchain nodes over digital certificate revocation, the collected second signature information needs to be verified.

For example, the step of verifying the second signature information includes: determining whether the number of pieces of the collected second signature information is greater than a third threshold number, and if so, verification is passed; and/or verifying the validity of the second signature information by using the collaborative public key, and determining whether the number of pieces of the valid second signature information is greater than a fourth threshold number, and if so, verification being passed. That is to say, the number of the blockchain nodes participating in generation of the second signature information may be verified, so as to guarantee joint management of multi-party members over digital certificate revocation, and avoid the untrustworthy problem of the digital certificate caused by the abuse of the collaborative private key to revoke the digital certificate by a single member; and the legality of each piece of the second signature information may also be verified, so as to guarantee the legality and security of the blockchain node itself, such that an untrustworthy revocation certificate of the digital certificate caused when a single or few blockchain nodes are attacked is prevented.

In addition, the method further includes: uploading the revocation certificate to the blockchain, so as to allow the blockchain node or a smart contract to verify the revocation certificate according to the collaborative public key.

For example, the revocation certificate generated after the blockchain node is deleted is verified by using the smart contract, first, the smart contract on the chain may acquire the collaborative public key from the genesis block of the blockchain to decrypt the signature information in the revocation certificate by using the collaborative public key, so as to acquire a hash value; next, a hashing operation is performed, by using the hash algorithm, on plaintext information other than the signature information indicated in the revocation certificate, so as to generate a new hash value; and based on this, whether the newly-generated hash value is the same as the hash value acquired after the signature information is decrypted by using the collaborative public key is determined, if so, the verification of the revocation certificate is passed, that is, the revocation certificate is legal, and if no, the verification of the revocation certificate fails, that is, the revocation certificate is illegal.

On the basis of the above embodiments, a corresponding polynomial is generated for each blockchain node, so as to generate a sub collaborative private key corresponding to the blockchain node according to the polynomial and identifier information of all the blockchain nodes. Then the sub collaborative private key is exchanged between the blockchain nodes, so as to enable each blockchain node to generate the same collaborative private key according to the sub collaborative private keys corresponding to all the blockchain nodes, the difficulty of decryption of the collaborative private key is improved, such that the security of the collaborative private key itself is improved. In addition, since each blockchain node participates in generation of the collaborative private key, each blockchain node may participates in issuance or revocation of the digital certificate. Through the verification of the signature information generated by the blockchain node during the issuance or revocation of the digital certificate, joint management of multiparty members over the digital certificate is realized, so as to avoid the untrustworthy problem of the digital certificate caused by the abuse of the collaborative private key to revoke or issue the digital certificate by a single member, and the legality and security of the blockchain node itself may also be guaranteed, such that an untrustworthy revocation certificate of the digital certificate caused when a single or few blockchain nodes are attacked is prevented.

Referring to FIG. 26, on the basis of the above embodiments related to FIG. 25, an embodiment of the present application provides another method for managing a digital certificate. The method may include the following steps.

At S2601, a corresponding polynomial and an asymmetric key pair are generated for each blockchain node, so as to generate a sub collaborative private key corresponding to the blockchain node according to the polynomial and identifier information of all the blockchain nodes.

The asymmetric key pair indicates a public key component and a private key component of the blockchain node; and the identifier information of the blockchain node is the digest of the public key component of the blockchain node.

At S2602, the sub collaborative private key is exchanged between the blockchain nodes, so as to enable each blockchain node to generate the same collaborative private key according to the sub collaborative private keys corresponding to all the blockchain nodes. The collaborative private key is configured to manage a digital certificate.

For example, when the sub collaborative private key is exchanged between the blockchain nodes, the sub collaborative private key is encrypted by using the public key component of the blockchain node receiving the sub collaborative private key, so as to enable the blockchain node to decrypt the sub collaborative private key by using the corresponding private key component after receiving the sub collaborative private key. Therefore, the security of the sub collaborative private key during transmission is guaranteed.

At S2603, a collaborative public key corresponding to the collaborative private key is generated, and the collaborative public key is written into a genesis block of a blockchain.

At S2604, a digital certificate generation request sent by a user is received, wherein the digital certificate generation request indicates first user information of the user.

At S2605, the first user information is broadcast to the blockchain, to enable one or more blockchain nodes on the blockchain to sign the first user information by respectively using the collaborative private key, so as to generate first signature information.

At S2606, the first signature information is collected, and the first signature information is verified, so as to generate a digital certificate for the user according to the first signature information when the verification of the first signature information is passed.

For example, the step of verifying the first signature information includes: determining whether the number of pieces of the collected first signature information is greater than a first threshold number, and if so, verification is passed; and/or verifying the validity of the first signature information by using the collaborative public key, and determining whether the number of pieces of the valid first signature information is greater than a second threshold number, and if so, verification being passed.

In addition, the method further includes: uploading the digital certificate to the blockchain, so as to allow the blockchain node or a smart contract to verify the digital certificate according to the collaborative public key.

Referring to FIG. 27, on the basis of the above embodiments related to FIG. 25 or FIG. 26, an embodiment of the present application provides still another method for managing a digital certificate. The method may include the following steps.

At S2701, a corresponding polynomial and an asymmetric key pair are generated for each blockchain node, so as to generate a sub collaborative private key corresponding to the blockchain node according to the polynomial and identifier information of all the blockchain nodes.

The asymmetric key pair indicates a public key component and a private key component of the blockchain node; and the identifier information of the blockchain node is the digest of the public key component of the blockchain node.

At S2702, the sub collaborative private key is exchanged between the blockchain nodes, so as to enable each blockchain node to generate the same collaborative private key according to the sub collaborative private keys corresponding to all the blockchain nodes, wherein the collaborative private key is configured to manage a digital certificate.

For example, when the sub collaborative private key is exchanged between the blockchain nodes, the sub collaborative private key is encrypted by using the public key component of the blockchain node receiving the sub collaborative private key, so as to enable the blockchain node to decrypt the sub collaborative private key by using the corresponding private key component after receiving the sub collaborative private key. Therefore, the security of the sub collaborative private key during transmission is guaranteed.

At S2703, a collaborative public key corresponding to the collaborative private key is generated, and the collaborative public key is written into a genesis block of a blockchain.

At S2704, a digital certificate generation request sent by a user is received, wherein the digital certificate generation request indicates first user information of the user.

At S2705, the first user information is broadcast to the blockchain, to enable one or more blockchain nodes on the blockchain to sign the first user information by respectively using the collaborative private key, so as to generate first signature information.

At S2706, the first signature information is collected, and the first signature information is verified, so as to generate a digital certificate for the user according to the first signature information when the verification of the first signature information is passed.

For example, the step of verifying the first signature information includes: determining whether the number of pieces of the collected first signature information is greater than a first threshold number, and if so, verification is passed; and/or verifying the validity of the first signature information by using the collaborative public key, and determining whether the number of pieces of the valid first signature information is greater than a second threshold number, and if so, verification being passed.

In addition, the method further includes: uploading the digital certificate to the blockchain, so as to allow the blockchain node or a smart contract to verify the digital certificate according to the collaborative public key.

At S2707, a digital certificate revocation request sent by a user is received, wherein the digital certificate revocation request indicates second user information of the user and a digital certificate to be revoked.

At S2708, the second user information is broadcast to the blockchain, to enable one or more blockchain nodes on the blockchain to sign the second user information by using the collaborative private key, so as to generate second signature information.

At S2709, the second signature information is collected, and the second signature information is verified, so as to generate, according to the second signature information, a revocation certificate corresponding to the digital certificate to be revoked when the verification of the second signature information is passed.

The step of verifying the second signature information includes: determining whether the number of pieces of the collected second signature information is greater than a third threshold number, and if so, verification is passed; and/or verifying the validity of the second signature information by using the collaborative public key, and determining whether the number of pieces of the valid second signature information is greater than a fourth threshold number, and if so, verification being passed.

In addition, the method further includes: uploading the revocation certificate to the blockchain, so as to allow the blockchain node or a smart contract to verify the revocation certificate according to the collaborative public key.

Figure 28:
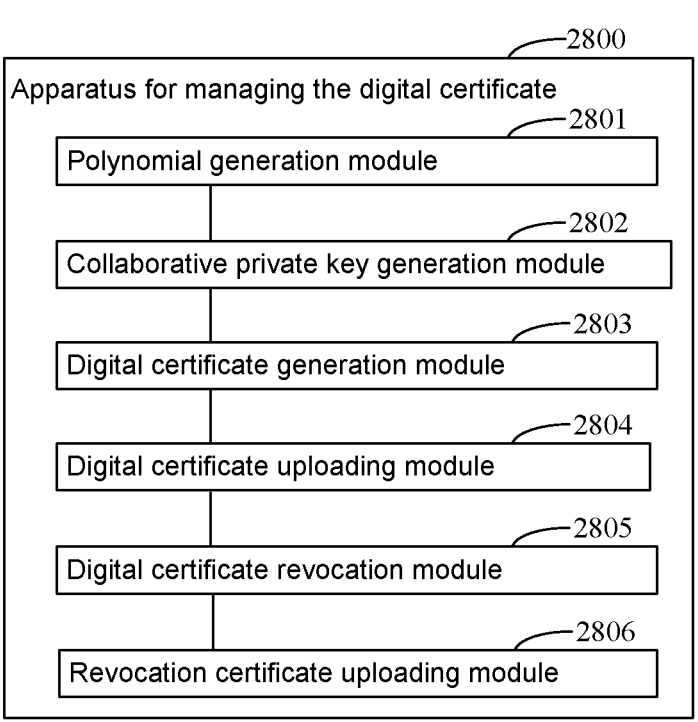
FIG. 28 is a schematic diagram of main modules of an apparatus for managing a digital certificate according to a seventh aspect of an embodiment of the present application.

Referring to FIG. 28, on the basis of the above embodiments, an embodiment of the present application provides an apparatus for managing a digital certificate 2800 from a seventh aspect. The apparatus includes a polynomial generation module 2801 and a collaborative private key generation module 2802.

The polynomial generation module 2801 is configured to generate a corresponding polynomial for each blockchain node, so as to generate a sub collaborative private key corresponding to the blockchain node according to the polynomial and identifier information of all the blockchain nodes.

The collaborative private key generation module 2802 is configured to exchange the sub collaborative private key between the blockchain nodes, so as to enable each blockchain node to generate the same collaborative private key according to the sub collaborative private keys corresponding to all the blockchain nodes, wherein the collaborative private key is configured to manage a digital certificate.

In an optional implementation, the polynomial generation module 2801 is further configured to, generate an asymmetric key pair for each blockchain node, wherein the asymmetric key pair indicates a public key component and a private key component, corresponding to the blockchain node.

In an optional implementation, the collaborative private key generation module 2802 is configured to, when the sub collaborative private key is exchanged between the blockchain nodes, encrypt the sub collaborative private key by using the public key component of the blockchain node receiving the sub collaborative private key, so as to enable the blockchain node to decrypt the sub collaborative private key by using the corresponding private key component after receiving the sub collaborative private key.

In an optional implementation, the collaborative private key generation module 2802 is further configured to generate a collaborative public key corresponding to the collaborative private key, and write the collaborative public key into a genesis block of a blockchain.

In an optional implementation, the apparatus further includes a digital certificate generation module 2803. The digital certificate generation module 2803 is configured to receive a digital certificate generation request sent by a user, wherein the digital certificate generation request indicates first user information of the user; broadcast the first user information to the blockchain, to enable one or more blockchain nodes on the blockchain to sign the first user information by respectively using the collaborative private key, so as to generate first signature information; and collect the first signature information, and verify the first signature information, so as to generate a digital certificate for the user according to the first signature information when the verification of the first signature information is passed.

In an optional implementation, the step of verifying the first signature information includes: determining whether the number of pieces of the collected first signature information is greater than a first threshold number, and if so, verification is passed; and/or verifying the validity of the first signature information by using the collaborative public key, and determining whether the number of pieces of the valid first signature information is greater than a second threshold number, and if so, verification being passed.

In an optional implementation, the apparatus further includes a digital certificate uploading module 2804. The digital certificate uploading module 2804 is configured to upload the digital certificate to the blockchain, so as to allow the blockchain node or a smart contract to verify the digital certificate according to the collaborative public key.

In an optional implementation, the apparatus further includes a digital certificate revocation module 2805. The digital certificate revocation module 2805 is configured to receive a digital certificate revocation request sent by the user, wherein the digital certificate revocation request indicates second user information of the user and a digital certificate to be revoked; broadcast the second user information to the blockchain, to enable one or more blockchain nodes on the blockchain to sign the second user information by using the collaborative private key, so as to generate second signature information; and collect the second signature information, and verify the second signature information, so as to generate, according to the second signature information, a revocation certificate corresponding to the digital certificate to be revoked when the verification of the second signature information is passed.

In an optional implementation, the step of verifying the second signature information includes: determining whether the number of pieces of the collected second signature information is greater than a third threshold number, and if so, verification being passed; and/or verifying the validity of the second signature information by using the collaborative public key, and determining whether the number of pieces of the valid second signature information is greater than a fourth threshold number, and if so, verification being passed.

Figure 29:
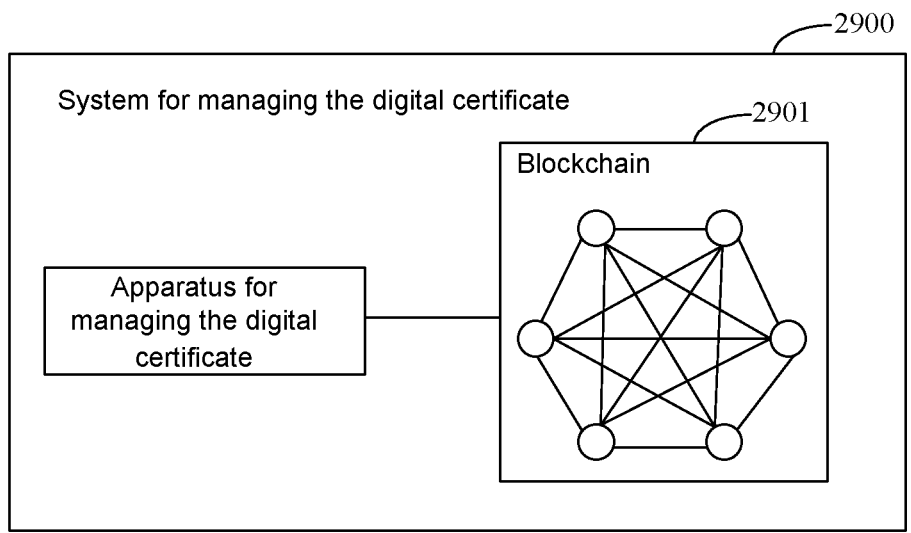
FIG. 29 is a schematic diagram of a main structure of a system for managing a digital certificate according to an embodiment of the present application.

In an optional implementation, the apparatus further includes a revocation certificate uploading module 2806. The revocation certificate uploading module 2806 is configured to upload the revocation certificate to the blockchain, so as to allow the blockchain node or a smart contract to verify the revocation certificate according to the collaborative public key. Referring to FIG. 29, on the basis of the above embodiments, an embodiment of the present application provides system for managing a digital certificate 2900. The system includes an apparatus for managing a digital certificate and a blockchain 2901.

The apparatus for managing the digital certificate is configured to receive a digital certificate generation request sent by a user, wherein the digital certificate generation request indicates first user information of the user and a digital certificate application scenario; according to the digital certificate application scenario, determine a preset threshold value corresponding to the digital certificate application scenario, wherein the threshold value indicates a number of blockchain nodes, which participate in digital certificate generation, in all blockchain nodes; broadcast the first user information to a blockchain, to enable the blockchain node, which knows an aggregated public key corresponding to the threshold value, to sign the first user information by using a private key component of the blockchain node, so as to generate first signature information, wherein the aggregated public key corresponding to the threshold value is generated by means of aggregating public key components of the blockchain node on the basis of a signature generation algorithm; and aggregate the first signature information to generate a digital certificate for the user.

The blockchain 2901 is configured to store the aggregated public key; and the blockchain node participating in generation of the aggregated public key on the blockchain is configured to sign the first user information by using the private key component of the blockchain node, so as to generate the first signature information.

In this embodiment of the present application, the apparatus for managing the digital certificate is further configured to receive a digital certificate generation request sent by a user, wherein the digital certificate generation request indicates first user information of the user; broadcast the first user information to a blockchain, to enable a blockchain node, which knows a global public key, to sign the first user information by using a private key component of the blockchain node, so as to generate first signature information, wherein the global public key is generated by means of aggregating public key components of the blockchain node on the basis of a signature generation algorithm; and aggregate the first signature information to generate a digital certificate for the user.

The blockchain 2901 is further configured to store the global public key; and the blockchain node knowing the global public key on the blockchain is configured to sign the first user information by using the private key component of the blockchain node, so as to generate the first signature information.

In this embodiment of the present application, the apparatus for managing the digital certificate is further configured to receive a digital certificate generation request sent by a user, wherein the digital certificate generation request indicates first user information of the user; broadcast the first user information to the blockchain, to enable any one or more blockchain nodes on the blockchain to sign the first user information by using a corresponding private key component, so as to generate first signature information; and aggregate the first signature information to generate a digital certificate for the user, wherein the digital certificate indicates identifier information of the one or more blockchain nodes.

The blockchain 2901 is further configured to store the aggregated public key; and the blockchain node participating in generation of the aggregated public key on the blockchain is configured to sign the first user information by using the private key component of the blockchain node, so as to generate the first signature information.

In this embodiment of the present application, the apparatus for managing the digital certificate is further configured to generate an asymmetric key pair for each blockchain node, wherein the asymmetric key pair indicates a public key component and a private key component, corresponding to the blockchain node; generate a global key pair, where the global key pair indicates a global public key and a global private key, and use the global private key to sign preset root certificate information, so as to generate a root certificate; aggregate private key components of one or more blockchain nodes on the basis of a signature generation algorithm, so as to generate one or more aggregated public keys; and write the one or more aggregated public keys, the global public key, and the root certificate into a genesis block of a blockchain.

The blockchain 2901 is further configured to store the one or more aggregated public keys, the global public key, and the root certificate.

In this embodiment of the present application, the apparatus for managing the digital certificate is further configured to generate an asymmetric key pair for a newly-added blockchain node when there is one or more newly-added blockchain nodes on a blockchain, wherein the asymmetric key pair indicates a public key component and a private key component, corresponding to the newly-added blockchain node; aggregate the public key components of the one or more blockchain nodes on the blockchain on the basis of a signature generation algorithm, so as to generate one or more first aggregated public keys; and update, according to the one or more first aggregated public keys, one or more second aggregated public keys already present in a genesis block of the blockchain, wherein the second aggregated public key is generated by means of aggregating the public key components of the one or more blockchain nodes on the blockchain on the basis of the signature generation algorithm before nodes are newly added to the blockchain.

The blockchain 2901 is configured to store the first aggregated public key and the second aggregated public key.

In this embodiment of the present application, the apparatus for managing the digital certificate is further configured to, when one or more blockchain nodes are deleted from a blockchain, aggregate public key components of the one or more blockchain nodes on the blockchain on the basis of a signature generation algorithm, so as to generate one or more first aggregated public keys; and update, according to the one or more first aggregated public keys, one or more second aggregated public keys already present in a genesis block of the blockchain, wherein the second aggregated public key is generated by means of aggregating the public key components of the one or more blockchain nodes on the blockchain on the basis of the signature generation algorithm before the blockchain nodes are deleted.

The blockchain 2901 is further configured to store the first aggregated public key and the second aggregated public key.

In this embodiment of the present application, the apparatus for managing the digital certificate is further configured to generate a corresponding polynomial for each blockchain node, so as to generate a sub collaborative private key corresponding to the blockchain node according to the polynomial and identifier information of all the blockchain nodes; and exchange the sub collaborative private key between the blockchain nodes, so as to enable each blockchain node to generate the same collaborative private key according to the sub collaborative private keys corresponding to all the blockchain nodes, wherein the collaborative private key is configured to manage a digital certificate.

Figure 30:
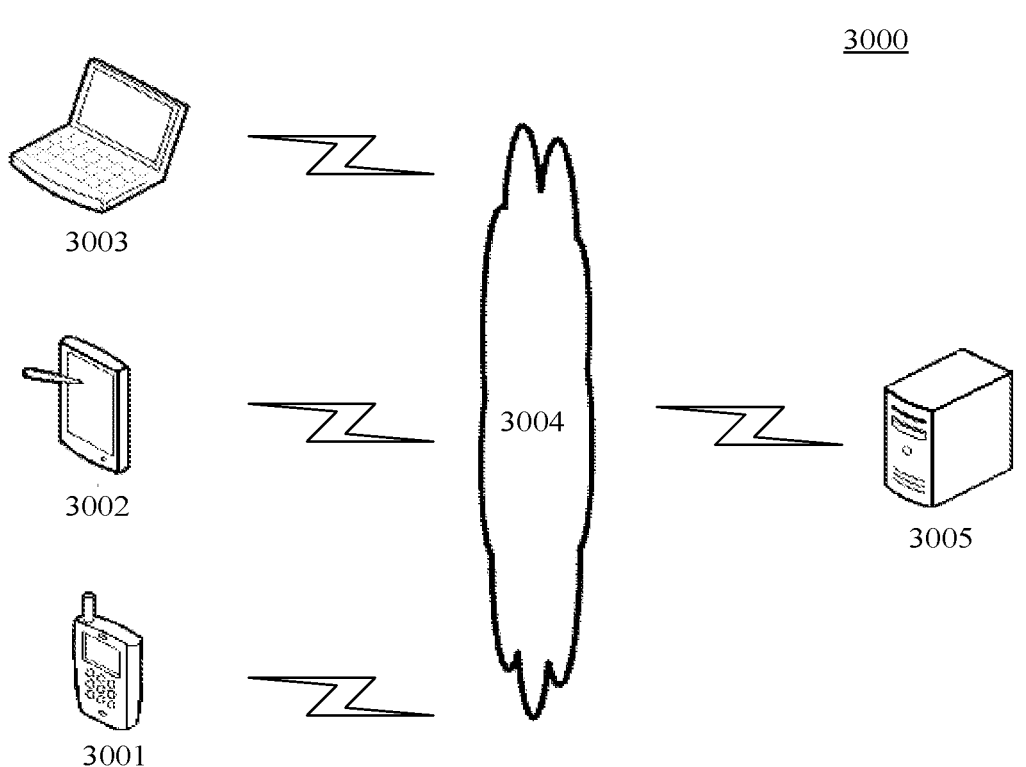
FIG. 30 is an architecture diagram of an exemplary system to which an embodiment of the present application may be applied.

The blockchain 2901 is configured to store the sub collaborative private key and the collaborative private key. FIG. 30 shows an exemplary system architecture 3000 that may use the method for managing the digital certificate or the apparatus for managing the digital certificate according to the embodiments of the present application.

As shown in FIG. 30, a system architecture 3000 may include terminal devices 3001, 3002 and 3003, a network 3004 and a server 3005. The network 3004 is configured to provide a medium for communication links between the terminal devices 3001, 3002 and 3003 and the server 3005. The network 3004 may include various connection types, such as wired or wireless communication links, or fiber optic cables.

A user may use the terminal devices 3001, 3002 and 3003 to interact with the server 3005 by means of the network 3004, so as to receive or sent a message. Various applications may be installed on the terminal devices 3001, 3002 and 3003.

The terminal devices 3001, 3002 and 3003 may be a variety of electronic devices having a display screen and supporting web browsing, including, but is not limited to, smartphones, tablets, laptops, desktops, and the like.

The server 3005 may be a server that provides various services, for example, a background management server that provides support for websites browsed by the user by means of the terminal devices 3001, 3002 and 3003. The background management server may process a received digital certificate generation request, and feed back a processing result (for example, a digital certificate) to the terminal device.

It is to be noted that the method for managing the digital certificate provided in the embodiments of the present application is generally executed by the server 3005, and accordingly, the apparatus for managing the digital certificate is generally provided in the server 3005.

It should be understood that, the number of the terminal devices, the networks and the servers in FIG. 30 is merely schematic. According to an implementation requirement, the terminal device, the network and the server may be in any number.

Figure 31:
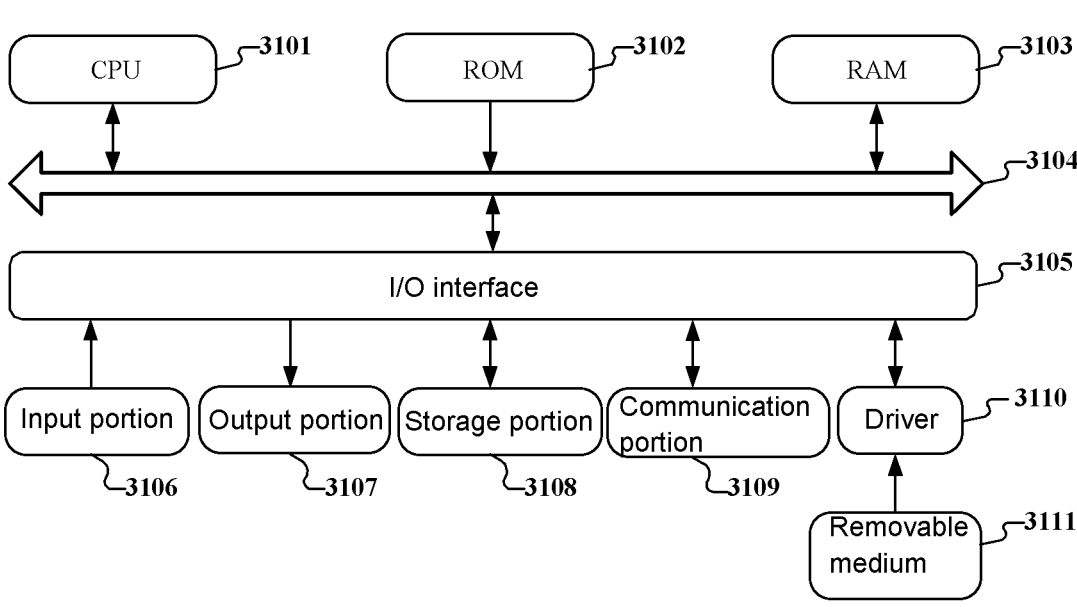
FIG. 31 is a schematic structural diagram of a computer system of a terminal device or a server that adapts to implement the embodiments of the present application.

FIG. 31 is a schematic structural diagram of a computer system 3100 of a terminal device that adapts to implement the embodiments of the present application. The terminal device shown in FIG. 31 is only an example, and should not impose any limitations on the functionality and scope of use of embodiments of the present application.

As shown in FIG. 31, the computer system 3100 includes a Central Processing Unit (CPU) 3101. The CPU may perform various appropriate actions and processing operations according to a program stored in a Read-Only Memory (ROM) 3102 or a computer program loaded from a storage portion 708 into a Random Access Memory (RAM) 3103. In the RAM 3103, various programs and data required for the operation of the system 3100 may also be stored. The CPU 3101, the ROM 3102, and the RAM 3103 are connected to each other by means of a bus 3104. An Input/Output (I/O) interface 3105 is also connected to the bus 3104.

The following components are connected to the I/O interface 3105: an input portion 3106 including a keyboard, a mouse, etc.; an output portion 3107 including a Cathode Ray Tube (CRT), a Liquid Crystal Display (LCD), a speaker, etc.; a storage portion 3108 including a hard disk, etc.; and a communication portion 3109 including a network interface card such as a Local Area Network (LAN) card and a modem. The communication portion 3109 performs communication processing via a network such as Internet. A driver 3110 is also connected to the I/O interface 3105 as needed. A removable medium 3111, such as a magnetic disk, an optical disk, a magneto-optical disk, and a semiconductor memory, is installed on the driver 3110 as needed, such that a computer program read therefrom is installed into the storage portion 3108 as needed.

In particular, the process described above with reference to a flowchart may be implemented as a computer software program according to the disclosed embodiments of the present application. For example, the disclosed embodiments of the present application include a computer program product including a computer program carried on a computer-readable medium, and the computer program includes a program code for executing the method shown in the flowchart. In such an embodiment, the computer program may be downloaded and installed from the network via the communication portion 3109, and/or from the removable medium 3111. The computer program is executed by the CPU 3101 to execute the functions limited in the system of the present application.

It is to be noted that, the computer-readable medium shown in the present application may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or a combination of any of the above. More specific examples of the computer-readable storage medium may include, but are not limited to, an electrical connection member including one or more wires, a portable computer disk, a hard disk, an RAM, an ROM, an Erasable Programmable Read-Only Memory (EPROM), a flash memory, optical fiber, a portable Compact Disc Read-Only Memory (CD-ROM), an optical storage device, a magnetic storage device, or any appropriate combination thereof. In the present application, the computer-readable storage medium may be any tangible medium that includes or stores a program. The program may be used by or in combination with an instruction execution system, an apparatus, or a device. In the present application, the computer-readable signal medium may include a data signal that is propagated in a base band or propagated as a part of a carrier wave, which carries a computer-readable program code therein. The propagated data signal may adopt a plurality of forms including, but not limited to, an electro-magnetic signal, an optical signal, or any suitable combination of the above. The computer-readable signal medium may also be any computer-readable medium other than the computer-readable storage medium. The computer-readable medium may send, propagate or transmit the program that is used by or in combination with the instruction execution system, the apparatus, or the device. The program code in the computer-readable medium may be transmitted with any proper medium, including, but not limited to, radio, a wire, an optical cable, Radio Frequency (RF), etc., or any proper combination thereof.

The flowcharts and block diagrams in the drawings illustrate probably implemented system architectures, functions, and operations of the system, method, and computer program product according to various embodiments of the present application. On this aspect, each block in the flowcharts or block diagrams may represent a module, a program segment, or a portion of a code, which includes one or more executable instructions for implementing the specified logic functions. It is also to be noted that, in certain alternative implementations, the functions marked in the blocks may also be realized in a sequence different from those marked in the drawings. For example, two blocks shown in succession may, in fact, be executed substantially in parallel, and sometimes in a reverse sequence, depending upon the functionality involved. It is further to be noted that, each block in the block diagrams or the flowcharts and a combination of the blocks in the block diagrams or the flowcharts may be implemented by a dedicated hardware-based system configured to execute a specified function or operation, or may be implemented by a combination of special hardware and a computer instruction.

The modules described in the embodiments of the present application may be implemented by means of software or hardware. The modules described may also be provided in a processor, for example, a processor may be described as including a request receiving module, a threshold value determination module, an information broadcasting module, and a signature aggregation module. The names of the modules do not constitute a limitation on the module itself in some cases, for example, the signature aggregation module may also be described as "a module configured to aggregate first signature information to generate a digital certificate for a user".

As another aspect, the present application further provides a computer-readable medium, which may be included in the device described in the above embodiments, or may also be present separately and not fitted into the device. The computer-readable medium carries one or more programs. When the one or more programs are executed by the device, the device is enabled to include performing the following operations: receiving a digital certificate generation request sent by a user, wherein the digital certificate generation request indicates first user information of the user and a digital certificate application scenario; determining a preset threshold value corresponding to the digital certificate application scenario according to the digital certificate application scenario, wherein the threshold value indicates a number of blockchain nodes, which participate in digital certificate generation, in all blockchain nodes; broadcasting the first user information to a blockchain, to enable the blockchain node, which knows an aggregated public key corresponding to the threshold value, to sign the first user information by using a private key component of the blockchain node, so as to generate first signature information, wherein the aggregated public key corresponding to the threshold value is generated by means of aggregating public key components of the blockchain node on the basis of a signature generation algorithm; and aggregating the first signature information to generate a digital certificate for the user.

The computer-readable medium carries one or more programs. When the one or more programs are executed by the device, the device is also enabled to include performing the following operations: receiving a digital certificate generation request sent by a user, wherein the digital certificate generation request indicates first user information of the user; broadcasting the first user information to a blockchain, to enable a blockchain node, which knows a global public key, to sign the first user information by using a private key component of the blockchain node, so as to generate first signature information, wherein the global public key is generated by means of aggregating public key components of the blockchain node on the basis of a signature generation algorithm; and aggregating the first signature information to generate a digital certificate for the user.

The computer-readable medium carries one or more programs. When the one or more programs are executed by the device, the device is also enabled to include performing the following operations: receiving a digital certificate generation request sent by a user, wherein the digital certificate generation request indicates first user information of the user; broadcasting the first user information to the blockchain, to enable any one or more blockchain nodes on the blockchain to sign the first user information by using a corresponding private key component, so as to generate first signature information; and aggregating the first signature information to generate a digital certificate for the user, wherein the digital certificate indicates identifier information of the one or more blockchain nodes.

The computer-readable medium carries one or more programs. When the one or more programs are executed by the device, the device is also enabled to include performing the following operations: generating an asymmetric key pair for each blockchain node, wherein the asymmetric key pair indicates a public key component and a private key component, corresponding to the blockchain node; generating a global key pair, wherein the global key pair indicates a global public key and a global private key, and using the global private key to sign preset root certificate information, so as to generate a root certificate; aggregating private key components of one or more blockchain nodes on the basis of a signature generation algorithm, so as to generate one or more aggregated public keys; and writing the one or more aggregated public keys, the global public key, and the root certificate into a genesis block of a blockchain.

The computer-readable medium carries one or more programs. When the one or more programs are executed by the device, the device is also enabled to include performing the following operations: generating an asymmetric key pair for a newly-added blockchain node when there is one or more newly-added blockchain nodes on a blockchain, wherein the asymmetric key pair indicates a public key component and a private key component, corresponding to the newly-added blockchain node; aggregating the public key components of the one or more blockchain nodes on the blockchain on the basis of a signature generation algorithm, so as to generate one or more first aggregated public keys; and updating, according to the one or more first aggregated public keys, one or more second aggregated public keys already present in a genesis block of the blockchain, wherein the second aggregated public key is generated by means of aggregating the public key components of the one or more blockchain nodes on the blockchain on the basis of the signature generation algorithm before nodes are newly added to the blockchain.

The computer-readable medium carries one or more programs. When the one or more programs are executed by the device, the device is also enabled to include performing the following operations: when one or more blockchain nodes are deleted from a blockchain, aggregating public key components of the one or more blockchain nodes on the blockchain on the basis of a signature generation algorithm, so as to generate one or more aggregated public keys; and updating, according to the one or more first aggregated public keys, one or more second aggregated public keys already present in a genesis block of the blockchain, wherein the second aggregated public key is generated by means of aggregating the public key components of the one or more blockchain nodes on the blockchain on the basis of the signature generation algorithm before the blockchain nodes are deleted.

The computer-readable medium carries one or more programs. When the one or more programs are executed by the device, the device is also enabled to include performing the following operations: generating a corresponding polynomial for each blockchain node, so as to generate a sub collaborative private key corresponding to the blockchain node according to the polynomial and identifier information of all the blockchain nodes; and exchanging the sub collaborative private key between the blockchain nodes, so as to enable each blockchain node to generate the same collaborative private key according to the sub collaborative private keys corresponding to all the blockchain nodes, wherein the collaborative private key is configured to manage a digital certificate.

According to the technical solutions of the embodiments of the present application, by means of presetting the correspondence relationship between the application scenario and the threshold value, determining, according to the threshold value, the number of the blockchain nodes participating issuance of the digital certificate under the application scenario, the difference in digital certificate issuance under different application scenarios is met, such that the applicability of a digital certificate management solution is improved. In addition, private keys for issuing the digital certificates are divided into the private key components corresponding to the blockchain nodes by means of using the corresponding private key components to sign the first user information by a plurality of blockchain nodes, so as to generate the first signature information, and aggregating the first signature information by using the signature generation algorithm, so as to generate the digital certificates, such that joint control of a plurality of management members over the private key for issuing the digital certificate is realized, thereby avoiding private key leakage. In addition, when and only when the first signature information, which is generated by all the blockchain nodes participating in generation of the aggregated public keys, is aggregated, a new digital certificate can be successfully generated, such that uncontrollable external risks caused by random issuance of the digital certificates by any management member according to own needs are avoided. Correspondingly, when and only when the second signature information, which is generated by all the blockchain nodes participating in generation of the aggregated public keys, is aggregated, the digital certificate can be successfully revoked, such that the validity and reliability of the digital certificate are further guaranteed.

According to the technical solutions of the embodiments of the present application, the private key for issuing the digital certificate is divided into the private key components corresponding to the blockchain nodes by means of using the corresponding private key components to sign the first user information by a plurality of blockchain nodes, so as to generate the first signature information, and aggregating the first signature information by using the signature generation algorithm, so as to generate the digital certificates, such that joint control of multi-parties over the private keys for issuing the digital certificates is realized, thereby avoiding private key leakage. In addition, when and only when the first signature information, which is generated by all the blockchain nodes having the global public keys, is aggregated, a new digital certificate can be successfully generated, such that uncontrollable external risks caused by random issuance of the digital certificates by any management member according to own needs are avoided. Correspondingly, when and only when the second signature information, which is generated by all the blockchain nodes having the global public keys, is aggregated, the digital certificate can be successfully revoked, such that the validity and reliability of the digital certificate are further guaranteed.

According to the technical solutions of the embodiments of the present application, by pre-storing possible aggregated public keys in the genesis block, when the digital certificate generation request sent by the user is received, any one or more blockchain nodes on the blockchain may participate in issuance of the digital certificate. That is, the first user information is signed by using the corresponding private key component, and the first signature information is aggregated to generate the digital certificate. Therefore, by means of dividing the private key issuing the digital certificate into the private key components of the plurality of blockchain nodes, joint control of the plurality of blockchain nodes over digital certificate issuance is realized. In addition, the attack resistance of the blockchain node issuing the digital certificate is further improved by randomly selecting the blockchain node issuing the digital certificate, thereby improving the security and reliability of the digital certificate.

According to the technical solutions of the embodiments of the present application, a global key pair is additionally generated when an asymmetric key pair is generated for each blockchain node; the private key components of one or more blockchain nodes are aggregated on the basis of a signature generation algorithm, so as to generate one or more aggregated public keys; and the one or more aggregated public keys, the global public key, and the root certificate are written into a genesis block of a blockchain, such that the decoupling of the aggregated public key and the global public key is realized. Based on this, when a digital certificate is issued, a first digital certificate may be first generated on the basis of the private key component, and the digital certificate is only issued for a user by using the global private key when the verification of the first digital certificate is passed, such that joint control of a plurality of members over digital certificate issuance is realized, and the issued digital certificate may still be verified by using the global public key or a root certificate even in the presence of addition or deletion of the blockchain node.

According to the technical solutions of the embodiments of the present application, when a management member is added, that is, the blockchain node corresponding to the management member on the blockchain is added, the public key components of the blockchain nodes after the nodes are added are aggregated on the basis of the signature generation algorithm, so as to newly generate one or more first aggregated public keys, and the first aggregated public keys are written into the genesis block, such that the aggregated public keys already present in the genesis block are updated, and joint management of the newly-added blockchain node over digital certificate issuance or revocation is realized. Meanwhile, by reserving the second aggregated public key already present in the genesis block, normal verification of the digital certificate issued before the blockchain node is updated is guaranteed, such that the normal use of the issued digital certificate is realized.

According to the technical solutions of the embodiments of the present application, when a management member is deleted, that is, the blockchain node corresponding to the management member on the blockchain is deleted, the public key components of the blockchain nodes after the nodes are deleted are aggregated on the basis of the signature generation algorithm, so as to newly generate one or more first aggregated public keys, and the first aggregated public keys are written into the genesis block, such that the aggregated public keys already present in the genesis block are updated, and joint management of the deleted blockchain node over digital certificate issuance or revocation is may be canceled. Meanwhile, by reserving the second aggregated public key already present in the genesis block, normal verification of the digital certificate issued before the blockchain node is deleted is guaranteed, such that the normal use of the issued digital certificate is realized.

According to the technical solutions of the embodiments of the present application, by means of generating a corresponding polynomial for each blockchain node, so as to generate a sub collaborative private key corresponding to the blockchain node according to the polynomial and identifier information of all the blockchain nodes, and then exchange the sub collaborative private key between the blockchain nodes, so as to enable each blockchain node to generate the same collaborative private key according to the sub collaborative private keys corresponding to all the blockchain nodes, the difficulty of decryption of the collaborative private key is improved, such that the security of the collaborative private key itself is improved. In addition, since each blockchain node participates in generation of the collaborative private key, each blockchain node may participates in issuance or revocation of the digital certificate. Therefore, through the verification of the signature information generated by the blockchain node during the issuance or revocation of the digital certificate, joint management of multiparty members over the digital certificate is realized, so as to avoid the untrustworthy problem of the digital certificate caused by the mismanagement of a third-party manager.

The foregoing specific implementations do not constitute limitations on the scope of protection of the present application. Those skilled in the art should understand that, various modifications, combinations, sub-combinations and substitutions may be made according to design requirements and other factors. Any modifications, equivalent replacements, improvements and the like made within the spirit and principle of this application shall fall within the scope of protection of the present application.

What is claimed is:

1. A method for managing a digital certificate, comprising:

receiving a digital certificate generation request sent by a user, wherein the digital certificate generation request indicates first user information of the user and a digital certificate application scenario;

determining a preset threshold value corresponding to the digital certificate application scenario according to the digital certificate application scenario, wherein the threshold value indicates a number of blockchain nodes, which participate in digital certificate generation, in all blockchain nodes;

broadcasting the first user information to a blockchain, to enable a blockchain node, which knows an aggregated public key corresponding to the threshold value, to sign the first user information by using a private key component of the blockchain node, so as to generate first signature information, wherein the aggregated public key corresponding to the threshold value is generated by means of aggregating a public key component of the blockchain node on the basis of a signature generation algorithm; and aggregating the first signature information to generate the digital certificate for the user.

2. The method for managing the digital certificate as claimed in claim 1, further comprising:

uploading the digital certificate to the blockchain, so as to allow a blockchain node needing to verify the digital certificate or a smart contract to verify the digital certificate according to the aggregated public key corresponding to the threshold value.

3. The method for managing the digital certificate as claimed in claim 1, further comprising:

receiving a digital certificate revocation request sent by the user, wherein the digital certificate revocation request indicates second user information of the user and a digital certificate to be revoked;

broadcasting the second user information to the blockchain according to a threshold value when the digital certificate to be revoked is generated, to enable a blockchain node, which participates in generation of an aggregated public key corresponding to the threshold value, to sign the second user information by using the private key component of the blockchain node, so as to generate second signature information; and aggregating the second signature information to generate a revocation certificate corresponding to the digital certificate to be revoked.

4. The method for managing the digital certificate as claimed in claim 3, further comprising:

uploading the revocation certificate to the blockchain, so as to allow a blockchain node needing to verify the digital certificate or a smart contract to verify the revocation certificate according to the aggregated public key corresponding to the threshold value.

5. The method for managing the digital certificate as claimed in claim 1, wherein before receiving the digital certificate generation request sent by the user, the method further comprises:

according to the threshold value, determining, from all blockchain nodes, one or more blockchain nodes that participate in generation of the aggregated public key corresponding to the threshold value;

aggregating public key components of the determined one or more blockchain nodes on the basis of a signature algorithm, so as to generate, for each blockchain node, the same aggregated public key corresponding to the threshold value; and calculating one blockchain node from the determined blockchain nodes, so as to write the aggregated public key into a genesis block of the blockchain, and to allow other blockchain nodes, which participate generation of the aggregated public key corresponding to the threshold value, to verify the aggregated public key in the genesis block.

6. The method for managing the digital certificate as claimed in claim 5, further comprising:

broadcasting preset root certificate information to the blockchain when a verification of the aggregated public key is passed, to enable the blockchain node, which participates in generation of the aggregated public key, to sign the preset root certificate information by using the private key component of the blockchain node, so as to generate third signature information; and aggregating the third signature information to generate a root certificate corresponding to the aggregated public key, and writing the root certificate into the genesis block of the blockchain.

7. The method for managing the digital certificate as claimed in claim 1, wherein the digital certificate indicates identifier information of the one or more blockchain nodes.

8. The method for managing the digital certificate as claimed in claim 1, further comprising:

generating an asymmetric key pair for each blockchain node, wherein the asymmetric key pair indicates a public key component and a private key component, corresponding to the blockchain node.

9. The method for managing the digital certificate as claimed in claim 1, further comprising:

generating an asymmetric key pair for a newly-added blockchain node when there is one or more newly-added blockchain nodes on a blockchain, wherein the asymmetric key pair indicates a public key component and a private key component, corresponding to the newly-added blockchain node;

aggregating public key components of the one or more blockchain nodes on the blockchain on the basis of a signature generation algorithm, so as to generate one or more first aggregated public keys; and updating, according to the one or more first aggregated public keys, one or more second aggregated public keys already present in a genesis block of the blockchain, wherein the second aggregated public key is generated by means of aggregating public key components of the one or more blockchain nodes on the blockchain on the basis of the signature generation algorithm before the one or more nodes are newly added to the blockchain.

10. The method for managing the digital certificate as claimed in claim 9, wherein updating, according to the one or more first aggregated public keys, the one or more second aggregated public keys already present in the genesis block of the blockchain comprises:

writing the one or more first aggregated public keys in the genesis block of the blockchain, and reserving the one or more second aggregated public keys already present in the genesis block;

wherein the method further comprising:

receiving a digital certificate generation request sent by a user, wherein the digital certificate generation request indicates first user information of the user;

broadcasting the first user information to the blockchain, to enable a blockchain node on the blockchain, which participates in generation of the same first aggregated public key, to sign the first user information by using a corresponding private key component, so as to generate first signature information; and aggregating the first signature information to generate a digital certificate for the user, wherein the digital certificate indicates identifier information of the block-chain node.

11. The method for managing the digital certificate as claimed in claim 1, further comprising:

when one or more blockchain nodes are deleted from a blockchain, aggregating public key components of one or more blockchain nodes on the blockchain on the basis of a signature generation algorithm, so as to generate one or more first aggregated public keys; and updating, according to the one or more first aggregated public keys, one or more second aggregated public keys already present in a genesis block of the block-chain, wherein the second aggregated public key is generated by means of aggregating the public key components of one or more blockchain nodes on the blockchain on the basis of the signature generation algorithm before the one or more blockchain nodes are deleted.

12. An electronic device for managing a digital certificate, comprising:

one or more processors; and a storage apparatus, configured to store one or more programs, wherein when the one or more programs are executed by the one or more processors, the one or more processors are enabled to implement following actions:

receiving a digital certificate generation request sent by a user, wherein the digital certificate generation request indicates first user information of the user and a digital certificate application scenario;

determining a preset threshold value corresponding to the digital certificate application scenario according to the digital certificate application scenario, wherein the threshold value indicates a number of blockchain nodes, which participate in digital certificate generation, in all blockchain nodes;

broadcasting the first user information to a blockchain, to enable a blockchain node, which knows an aggregated public key corresponding to the threshold value, to sign the first user information by using a private key component of the blockchain node, so as to generate first signature information, wherein the aggregated public key corresponding to the threshold value is generated by means of aggregating a public key component of the blockchain node on the basis of a signature generation algorithm; and aggregating the first signature information to generate the digital certificate for the user.

13. A non-transitory computer-readable medium, having a computer program stored thereon, wherein when the program is executed by a processor, the processor is enable to implement following actions: receiving a digital certificate generation request sent by a user, wherein the digital certificate generation request indicates first user information of the user and a digital certificate application scenario; determining a preset threshold value corresponding to the digital certificate application scenario according to the digital certificate application scenario, wherein the threshold value indicates a number of blockchain nodes, which participate in digital certificate generation, in all blockchain nodes; broadcasting the first user information to a blockchain, to enable a blockchain node, which knows an aggregated public key corresponding to the threshold value, to sign the first user information by using a private key component of the blockchain node, so as to generate first signature information, wherein the aggregated public key corresponding to the threshold value is generated by means of aggregating a public key component of the blockchain node on the basis of a signature generation algorithm; and aggregating the first signature information to generate the digital certificate for the user.

* * * * *